United States Patent
Wu et al.

(10) Patent No.: US 11,134,482 B2
(45) Date of Patent: Sep. 28, 2021

(54) METHOD AND APPARATUS FOR TRANSMITTING UPLINK CONTROL INFORMATION

(71) Applicant: HUAWEI TECHNOLOGIES CO., LTD., Guangdong (CN)

(72) Inventors: Zuomin Wu, Shenzhen (CN); Lei Guan, Beijing (CN)

(73) Assignee: Huawei Technologies Co., Ltd., Guangdong (CN)

(*) Notice: Subject to any disclaimer, the term of this patent is extended or adjusted under 35 U.S.C. 154(b) by 28 days.

(21) Appl. No.: 16/673,377

(22) Filed: Nov. 4, 2019

(65) Prior Publication Data
US 2020/0068563 A1 Feb. 27, 2020

Related U.S. Application Data

(63) Continuation of application No. PCT/CN2018/085570, filed on May 4, 2018.

(30) Foreign Application Priority Data

May 4, 2017 (CN) .................. 201710309047.X
Aug. 11, 2017 (CN) .................. 201710686579.5

(51) Int. Cl.
*H04W 72/04* (2009.01)
*H04B 7/0456* (2017.01)
(Continued)

(52) U.S. Cl.
CPC ...... *H04W 72/0413* (2013.01); *H04B 7/0486* (2013.01); *H04B 7/0632* (2013.01);
(Continued)

(58) Field of Classification Search
CPC ............. H03W 72/0453; H03W 72/02; H03W 72/0413; H03W 72/0446; H03W 72/1263;
(Continued)

(56) References Cited

U.S. PATENT DOCUMENTS

| 5,093,928 A | 3/1992 | Kage |
| 5,995,834 A | 11/1999 | Moore |

(Continued)

FOREIGN PATENT DOCUMENTS

| CN | 105072690 A | 11/2015 |
| CN | 105898770 A | 8/2016 |

(Continued)

OTHER PUBLICATIONS

3GPP TS 36.212 V14.2.0 (Mar. 2017), 3rd Generation Partnership Project;Technical Specification Group Radio Access Network, Evolved Universal Terrestrial Radio Access (E-UTRA), Multiplexing and channel coding(Release 14), Mar. 2017, 197 pages.

(Continued)

*Primary Examiner* — Wei Zhao
(74) *Attorney, Agent, or Firm* — Fish & Richardson P.C.

(57) ABSTRACT

The present disclosure relates to methods and apparatus for transmitting uplink control information. One example method includes generating, by a terminal device, an encoded uplink data packet, where the uplink data packet belongs to an uplink channel, the uplink channel is carried on a candidate time-frequency resource in a first time transmission interval (TTI), the candidate time-frequency resource is a first time-frequency resource or a second time-frequency resource, and a second time-domain start point of the second time-frequency resource is later than a first time-domain start point of the first time-frequency resource, performing, by the terminal device, detection on a carrier in which the candidate time-frequency resource is located, and sending, by the terminal device, the uplink channel on the candidate time-frequency resource based on a result of the detection, where the uplink channel includes uplink control information and the encoded uplink data packet.

21 Claims, 9 Drawing Sheets

(51) Int. Cl.
  *H04B 7/06*   (2006.01)
  *H04L 1/18*   (2006.01)
  *H04L 5/00*   (2006.01)
  *H04W 72/02*  (2009.01)

(52) U.S. Cl.
  CPC ......... *H04B 7/0639* (2013.01); *H04L 1/1819* (2013.01); *H04L 5/0082* (2013.01); *H04W 72/02* (2013.01); *H04W 72/0446* (2013.01); *H04W 72/0453* (2013.01)

(58) Field of Classification Search
  CPC .... H03W 72/1278; H03W 16/14; H04L 1/18; H04L 1/0061; H04L 5/0082; H04B 7/0486; H04B 7/0632; H04B 7/0639
  See application file for complete search history.

(56) References Cited

U.S. PATENT DOCUMENTS

| | | | |
|---|---|---|---|
| 2011/0026481 A1 | 2/2011 | Takamatsu | |
| 2012/0076023 A1* | 3/2012 | Ko | H04L 5/0053 370/252 |
| 2013/0294318 A1* | 11/2013 | Amerga | H04W 4/06 370/312 |
| 2017/0265226 A1 | 9/2017 | Yano et al. | |
| 2018/0027589 A1 | 1/2018 | Yang | |
| 2018/0110057 A1 | 4/2018 | Park et al. | |
| 2019/0349919 A1* | 11/2019 | Oh | H04W 72/1268 |

FOREIGN PATENT DOCUMENTS

| | | |
|---|---|---|
| CN | 106559791 A | 4/2017 |
| EP | 0454080 A2 | 10/1991 |
| KR | 101601288 B1 | 3/2016 |
| WO | 2016098262 A1 | 6/2016 |
| WO | 2016167623 A1 | 10/2016 |

OTHER PUBLICATIONS

3GPP TS 36.213 V14.2.0 (Mar. 2017),3rd Generation Partnership Project;Technical Specification Group Radio Access Network;Evolved Universal Terrestrial Radio Access (E-UTRA), Physical layer procedures(Release 14), Mar. 2017, 454 pages.

PCT International Search Report and Written Opinion in International Application No. PCT/CN2018/085,570, dated Jul. 27, 2018, 16 pages (With English Translation).

Extended European Search Report issued in European Application No. 18795158.7 dated Mar. 20, 2020, 11 pages.

\* cited by examiner

Pattern of an uplink channel when a terminal device obtains a first time-frequency resource through contention Pattern of an uplink channel when the terminal device obtains a second time-frequency resource through contention

METHOD AND APPARATUS FOR TRANSMITTING UPLINK CONTROL INFORMATION

CROSS-REFERENCE TO RELATED APPLICATIONS

This application is a continuation of International Application No. PCT/CN2018/085570, filed on May 4, 2018, which claims priority to Chinese Patent Application No. 201710309047.X, filed on May 4, 2017 and Chinese Patent Application No. 201710686579.5, filed on Aug. 11, 2017. The disclosures of the aforementioned applications are hereby incorporated by reference in their entireties.

TECHNICAL FIELD

This application relates to the communications field, and more specifically, to a method and an apparatus for transmitting uplink control information.

BACKGROUND

With development and popularization of communications technologies, a quantity of terminal devices increases greatly. Currently, with licensed spectrum resources that can be provided by a communications system, it is hard to meet requirements. When a large quantity of terminal devices share a same licensed spectrum resource, communication congestion may occur, which severely affects communication reliability and user experience.

To resolve the foregoing problem, a communications technology based on a license-exempt spectrum resource appears. In this technology, a network device allocates, from the license-exempt spectrum resource, a frequency-domain resource (denoted as a frequency-domain resource #1. In the following for ease of understanding) to a terminal device for uplink transmission, and a bandwidth of the frequency-domain resource #1 is 20 megahertz (Mega Hertz, MHz).

In addition, in embodiments of this application, a bandwidth available for detection by the terminal device during one detection on (or contending for or listening on) a license-exempt frequency-domain resource is 20 MHz. Therefore, the terminal device can perform full-bandwidth detection on the frequency-domain resource #1 through one detection. If the terminal device detects that resources in a full-bandwidth range of the frequency-domain resource #1 are available, the terminal device performs uplink transmission with the network device by using the frequency-domain resource #1, for example, transmits uplink control information.

With development of the communications technology based on the license-exempt spectrum resource, a bandwidth of a license-exempt spectrum resource that can be used by the communications system gradually increases, and a bandwidth of a license-exempt spectrum resource (for example, the frequency-domain resource #1) allocated by the network device to the terminal device may also increase. That is, the bandwidth of the frequency-domain resource #1 is greater than 20 MH, for example, the bandwidth of the frequency-domain resource #1 may reach 80 MHz.

In this case, based on the foregoing prior art, the terminal device needs to perform detection on the frequency-domain resource #1 greater than 20 MHz, and only when detecting that resources in the full-bandwidth range of the frequency-domain resource #1 are used, the terminal device can perform wireless communication by using the frequency-domain resource #1, for example, transmit uplink control information. Because the terminal device can use the frequency-domain resource #1 to perform communication only when the resources in the full-bandwidth range of the frequency-domain resource #1 are available, there is a relatively low probability that the terminal device obtains the frequency-domain resource #1 through contention. Further, there is also a relatively low possibility that the terminal device can use the frequency-domain resource #1 to perform wireless communication. Consequently, communication efficiency is reduced, a service transmission latency is increased, and user experience is severely affected.

SUMMARY

This application provides a method and an apparatus for transmitting uplink control information, to improve communication efficiency, reduce a service transmission latency, and improve user experience.

According to a first aspect, a method for transmitting uplink control information is provided, and is applied to a communications system including a network device and a terminal device. A system frequency-domain resource used by the communications system is divided into N subbands, and N≥2. The system frequency-domain resource is a frequency-domain resource used based on a contention mechanism. The method includes: receiving, by the terminal device, scheduling information from the network device, where the scheduling information is used to indicate a time-frequency resource that is allocated by the network device to the terminal device and that is used to carry at least one uplink channel, a first time-frequency resource in the time-frequency resource is used to carry one first uplink channel in the at least one uplink channel, the first uplink channel includes at least uplink control information, the first time-frequency resource occupies M subbands in the N subbands in frequency domain, and M≥2; performing, by the terminal device, detection on the M subbands to determine, from the first time-frequency resource, a second time-frequency resource that can be used by the terminal device, where the second time-frequency resource occupies K subbands in the M subbands in frequency domain, and M>K≥1; and sending, by the terminal device, the first uplink channel by using the second time-frequency resource.

According to the method for transmitting uplink control information in this embodiment of this application, the system frequency-domain resource used based on the contention mechanism is divided into a plurality of subbands. In addition, after determining a first frequency-domain resource allocated by the network device, before uplink transmission needs to be performed, the terminal device performs detection on at least two subbands included in the first frequency-domain resource, so that the terminal device can determine, from the at least two subbands, a second frequency-domain resource that can be used by the terminal device, and transmit an uplink channel by using the second uplink frequency-domain resource. That is, in comparison with the prior art, the terminal device can use the first frequency-domain resource to perform wireless communication with no need to determine that resources in a full-bandwidth range of the first frequency-domain resource are used. Therefore, this can improve a possibility of using, by the terminal device, the first frequency-domain resource (specifically, some subbands of the first frequency-domain resource) to perform wireless communication, thereby improving communication efficiency, reducing a service transmission latency, and improving user experience.

Optionally, the sending, by the terminal device, the first uplink channel by using the second time-frequency resource includes: sending, by the terminal device, channel-coded data or information by using the second time-frequency resource, where the channel-coded data or information is carried on the first uplink channel.

Optionally, the sending, by the terminal device, the uplink channel by using the second time-frequency resource includes: determining, by the terminal device, a third time-frequency resource from the second time-frequency resource based on reference information; and sending, by the terminal device, the uplink control information by using the third time-frequency resource, where the reference information is used to indicate at least one of the following values: a size value of the first time-frequency resource, a value of M, a size value of the second time-frequency resource, a value of K, and a first reference value. In addition, the first reference value is specified by the communications system, or the first reference value is pre-indicated by the network device.

Optionally, the first reference value includes a size value of a fourth time-frequency resource, the fourth time-frequency resource is a time-frequency resource occupied by the first uplink channel in L subbands in the M subbands, and M>L≥1, where a value of L is specified by the communications system, or a value of L is pre-indicated by the network device.

Optionally, the first time-frequency resource includes a fifth time-frequency resource used to carry uplink control information, and the sending, by the terminal device, the uplink channel by using the second time-frequency resource includes: determining, by the terminal device, a third time-frequency resource from the second time-frequency resource; and sending, by the terminal device, the uplink control information by using the third time-frequency resource, where a difference between a size of the third time-frequency resource and a size of the fifth time-frequency resource falls within a preset range.

A size of a time-frequency resource, used to carry uplink control information, in the second time-frequency resource is determined based on a size of the second time-frequency resource (or a time-frequency resource, used to carry uplink data, in the second time-frequency resource). Therefore, when the second time-frequency resource is a part of the first time-frequency resource, in the prior art, the size of the time-frequency resource, used to carry uplink control information, in the second time-frequency resource is less than a size of a time-frequency resource, used to carry uplink control information, in the first resource. In contrast, according to the method for transmitting uplink control information in this embodiment of this application, the size of the third time-frequency resource, used to carry uplink control information, in the second time-frequency resource is determined based on a size of the first time-frequency resource, that is, a difference between the size of the third time-frequency resource and a size of a time-frequency resource, used to carry uplink control information, in the first time-frequency resource falls within a preset range. That is, in comparison with the prior art, increasing the size of the time-frequency resource used to carry uplink control information in this embodiment of this application can ensure transmission reliability of the uplink control information.

Optionally, the determining, by the terminal device, a third time-frequency resource from the second time-frequency resource based on reference information includes: determining, by the terminal device, the third time-frequency resource from the second time-frequency resource based on the reference information and a first coefficient, where the first coefficient is used to determine a size of a time-frequency resource that carries uplink control information.

Optionally, the first time-frequency resource includes a fifth time-frequency resource used to carry uplink control information, a size of the fifth time-frequency resource is determined based on a size of the first time-frequency resource and a first coefficient, and the determining, by the terminal device, a third time-frequency resource from the second time-frequency resource includes: determining, by the terminal device, the third time-frequency resource from the second time-frequency resource based on the size of the first time-frequency resource and the first coefficient.

Optionally, the method further includes: obtaining, by the terminal device, first mapping relationship information, where the first mapping relationship information is used to indicate a mapping relationship between a plurality of values including a value indicated by the reference information and a plurality of coefficients including the first coefficient; and using, by the terminal device based on the first mapping relationship information, a coefficient corresponding to the value indicated by the reference information as the first coefficient.

Optionally, the determining, by the terminal device, a third time-frequency resource from the second time-frequency resource based on reference information includes: determining, by the terminal device, the third time-frequency resource from the second time-frequency resource based on the reference information and a preset first upper limit value, where a size of the third time-frequency resource is less than or equal to the first upper limit value.

Optionally, the method further includes: obtaining, by the terminal device, second mapping relationship information, where the second mapping relationship information is used to indicate a mapping relationship between a plurality of values including a value indicated by the reference information and a plurality of upper limit values including the first upper limit value; and using, by the terminal device based on the second mapping relationship information, an upper limit value corresponding to the value indicated by the reference information as the first upper limit value.

Optionally, the method further includes: obtaining, by the terminal device, a plurality of parameter groups, where each parameter group includes one parameter value and one coefficient, and a difference between a product of a reference value and a coefficient and a product of a reference value and a coefficient that are included in any two parameter groups falls within the preset range; and determining, by the terminal device, the first coefficient based on a parameter value indicated by the reference information, where the parameter value indicated by the reference information and the first coefficient belong to a same parameter group.

Optionally, the receiving, by the terminal device, scheduling information from the network device includes: receiving, by the terminal device, P pieces of scheduling information from the network device, where the P pieces of scheduling information are in a one-to-one correspondence with P uplink channels, each piece of scheduling information is used to indicate a time-frequency resource of a corresponding uplink channel, subbands occupied by time-frequency resources indicated by any two of the P pieces of scheduling information are at least partly different, and P≥2; and the detecting, by the terminal device, the M subbands includes: detecting, by the terminal device, a subband to which a time-frequency resource indicated by each of the P pieces of scheduling information belongs, where the second time-frequency resource includes frequency-domain resources indicated by Q of the P pieces of scheduling information, and 1≤Q<P.

Optionally, frequency-domain resources indicated by the P pieces of scheduling information have a nested structure.

Optionally, frequency-domain resources corresponding to the P uplink channels have a nested structure.

Optionally, frequency-domain resources indicated by any two of the P pieces of scheduling information do not overlap.

Optionally, frequency-domain resources corresponding to any two of the P uplink channels do not overlap.

Optionally, frequency-domain resources indicated by the P pieces of scheduling information include at least one pair of frequency-domain resources that partly overlap in frequency domain.

Optionally, the P uplink channels include at least one pair of uplink channels that partly overlap in frequency domain.

Optionally, the method further includes: sending, by the terminal device, third indication information to the network device, where the third indication information is used to indicate that the second time-frequency resource includes time-frequency resources indicated by the Q pieces of scheduling information.

Optionally, the third indication information has corresponding scheduling information that is used to indicate a subband occupied by the second time-frequency resource.

Optionally, the method further includes: sending, by the terminal device, first indication information to the network device, where the first indication information is used to indicate the second time-frequency resource, or the first indication information is used to indicate a subband occupied by the second time-frequency resource in frequency domain.

The terminal device sends the indication information of the second time-frequency resource to the network device, so that the network device can determine the second time-frequency resource, and the network device can avoid performing, on a resource other than the second time-frequency resource in the first time-frequency resource, detection on uplink information (including uplink data or uplink control information) sent by the terminal device, thereby reducing processing burden of the network device.

Optionally, the second frequency-domain resource is corresponding to a plurality of time-frequency resource elements REs, and the sending, by the terminal device, first indication information to the network device includes: sending, by the terminal device, the first indication information to the network device by using at least one of the plurality of REs.

Optionally, the second time-frequency resource includes at least one first symbol used to carry a reference signal, and the determining, by the terminal device, a third time-frequency resource from the second time-frequency resource includes: determining, by the terminal device based on a location of the at least one first symbol, a location of a symbol corresponding to the third time-frequency resource.

Optionally, the method further includes: sending, by the terminal device, second indication information to the network device, where the second indication information is used to indicate the third time-frequency resource, or the third indication information is used to indicate a subband occupied by the third time-frequency resource in frequency domain.

The terminal device sends the indication information of the third time-frequency resource to the network device, so that the network device can determine the third time-frequency resource, and receive the uplink control information on the third time-frequency resource. Therefore, the network device can avoid performing, on a resource other than the third time-frequency resource in the first time-frequency resource (or the second time-frequency resource), detection on the uplink control information sent by the terminal device, thereby reducing processing burden of the network device.

Optionally, the second frequency-domain resource is corresponding to a plurality of REs, and the sending, by the terminal device, second indication information to the network device includes: sending, by the terminal device, the second indication information to the network device by using at least one of the plurality of REs.

Optionally, the uplink control information includes at least one of the following information: hybrid automatic repeat request HARQ feedback information, downlink channel quality indicator information CQI, rank indication information RI, and precoding matrix indicator information PMI.

According to a second aspect, a method for transmitting uplink control information is provided, and is applied to a communications system including a network device and a terminal device. A system frequency-domain resource used by the communications system is divided into N subbands, and N≥2. The system frequency-domain resource is a frequency-domain resource used based on a contention mechanism. The method includes: sending, by the network device, scheduling information to the terminal device, where the scheduling information is used to indicate a time-frequency resource that is allocated by the network device to the terminal device and that is used to carry at least one uplink channel, a first time-frequency resource in the time-frequency resource is used to carry one first uplink channel in the at least one uplink channel, the first uplink channel includes at least uplink control information, the first time-frequency resource occupies M subbands in the N subbands in frequency domain, and M≥2; and receiving, by the network device, the first uplink channel from the terminal device by using a second time-frequency resource, where the second time-frequency resource occupies K subbands in the M subbands in frequency domain, and M>K≥1.

According to the method for transmitting uplink control information in this embodiment of this application, the system frequency-domain resource used based on the contention mechanism is divided into a plurality of subbands. In addition, after determining a first frequency-domain resource allocated by the network device, before uplink transmission needs to be performed, the terminal device performs detection on at least two subbands included in the first frequency-domain resource, so that the terminal device can determine, from the at least two subbands a second frequency-domain resource that can be used by the terminal device, and transmit an uplink channel by using the second uplink frequency-domain resource. That is, in comparison with the prior art, the terminal device can use the first frequency-domain resource to perform wireless communication with no need to determine that resources in a full-bandwidth range of the first frequency-domain resource are used. Therefore, this can improve a possibility of using, by the terminal device, the first frequency-domain resource (specifically, some subbands of the first frequency-domain resource) to perform wireless communication, thereby improving communication efficiency, reducing a service transmission latency, and improving user experience.

Optionally, the receiving, by the network device, the first uplink channel from the terminal device by using a second time-frequency resource includes: receiving, by the network device, channel-coded data or information from the terminal device by using the second time-frequency resource, where the channel-coded data or information is carried on the first uplink channel, Optionally, the receiving, by the network device, the first uplink channel from the terminal device by using a second time-frequency resource includes: determining, by the network device, a third time-frequency resource from the second time-frequency resource based on reference information; and receiving, by the network device, the uplink control information from the terminal device by using the third time-frequency resource, where the reference information is used to indicate at least one of the following values: a size value of the first time-frequency resource, a value of M, a size value of the second time-frequency resource, a value of K, and a first reference value. In addition, the first reference value is specified by the communications system, or the first reference value is set by the network device.

Optionally, the first reference value includes a size value of a fourth time-frequency resource, the first reference value includes a size value of a fourth time-frequency resource, the fourth time-frequency resource is a time-frequency resource occupied by the first uplink channel in L subbands in the M subbands, and M>L≥1, where a value of L is specified by the communications system, or a value of L is set by the network device.

Optionally, the first time-frequency resource includes a fifth time-frequency resource used to carry uplink control information, and the receiving, by the network device, the first uplink channel from the terminal device by using a second time-frequency resource includes: determining, by the network device, a third time-frequency resource from the second time-frequency resource and receiving, by the network device, the uplink control information from the terminal device by using the third time-frequency resource, where a difference between a size of the third time-frequency resource and a size of the fifth time-frequency resource falls within a preset range.

A size of a time-frequency resource, used to carry uplink control information, in the second time-frequency resource is determined based on a size of the second time-frequency resource (or a time-frequency resource, used to carry uplink data, in the second time-frequency resource). Therefore, when the second time-frequency resource is a part of the first time-frequency resource, in the prior art, the size of the time-frequency resource, used to carry uplink control information, in the second time-frequency resource is less than a size of a time-frequency resource, used to carry uplink control information, in the first resource. In contrast, according to the method for transmitting uplink control information in this embodiment of this application, the size of the third time-frequency resource, used to carry uplink control information, in the second time-frequency resource is determined based on a size of the first time-frequency resource, that is, a difference between the size of the third time-frequency resource and a size of a time-frequency resource, used to carry uplink control information, in the first time-frequency resource falls within a preset range. That is, in comparison with the prior art, increasing the size of the time-frequency resource used to carry uplink control information in this embodiment of this application can ensure transmission reliability of the uplink control information.

Optionally, the determining, by the network device, a third time-frequency resource from the second time-frequency resource based on reference information includes: determining, by the network device, the third time-frequency resource from the second time-frequency resource based on the reference information and a first coefficient, where the first coefficient is used to determine a size of a time-frequency resource that carries uplink control information.

Optionally, the first time-frequency resource includes a fifth time-frequency resource used to carry uplink control information, a size of the fifth time-frequency resource is determined based on a size of the first time-frequency resource and the first coefficient, and the determining, by the network device, a third time-frequency resource from the second time-frequency resource includes: determining, by the network device, the third time-frequency resource from the second time-frequency resource based on the size of the first time-frequency resource and the first coefficient.

Optionally, the method further includes: obtaining, by the network device, first mapping relationship information, where the first mapping relationship information is used to indicate a mapping relationship between a plurality of values including a value indicated by the reference information and a plurality of coefficients including the first coefficient; and using, by the network device based on the first mapping relationship information, a coefficient corresponding to the value indicated by the reference information as the first coefficient.

Optionally, the determining, by the network device, a third time-frequency resource from the second time-frequency resource based on reference information includes: determining, by the network device, the third time-frequency resource from the second time-frequency resource based on the reference information and a preset first upper limit value, where a size of the third time-frequency resource is less than or equal to the first upper limit value.

Optionally, the method further includes: obtaining, by the network device, second mapping relationship information, where the second mapping relationship information is used to indicate a mapping relationship between a plurality of values including a value indicated by the reference information and a plurality of upper limit values including the first upper limit value; and using, by the network device based on the second mapping relationship information, an upper limit value corresponding to the value indicated by the reference information as the first upper limit value.

Optionally, the method further includes: obtaining, by the network device, a plurality of parameter groups, where each parameter group includes one parameter value and one coefficient, and a difference between a product of a reference value and a coefficient and a product of a reference value and a coefficient that are included in any two parameter groups falls within the preset range; and determining, by the network device, the first coefficient based on a parameter value indicated by the reference information, where the parameter value indicated by the reference information and the first coefficient belong to a same parameter group.

Optionally, the sending, by the network device, scheduling information to the terminal device includes: sending, by the network device, P pieces of scheduling information to the terminal device, where the P pieces of scheduling information are in a one-to-one correspondence with P uplink channels, each piece of scheduling information is used to indicate a time-frequency resource of a corresponding uplink channel, subbands occupied by time-frequency resources indicated by any two of the P pieces of scheduling information are at least partly different, and P≥2; and the detecting, by the terminal device, the M subbands includes: detecting, by the terminal device, a subband to which a time-frequency resource indicated by each of the P pieces of scheduling information belongs, where the second time-frequency resource includes frequency-domain resources indicated by Q of the P pieces of scheduling information, and 1≤Q<P.

Optionally, frequency-domain resources corresponding to the P uplink channels have a nested structure.

Optionally, frequency-domain resources corresponding to the P uplink channels have a nested structure.

Optionally, frequency-domain resources indicated by any two of the P pieces of scheduling information do not overlap.

Optionally, frequency-domain resources corresponding to any two of the P uplink channels do not overlap.

Optionally, frequency-domain resources indicated by the P pieces of scheduling information include at least one pair of frequency-domain resources that partly overlap in frequency domain.

Optionally, the P uplink channels include at least one pair of uplink channels that partly overlap in frequency domain.

Optionally, the method further includes: receiving, by the network device, third indication information from the terminal device, where the third indication information is used to indicate that the second time-frequency resource includes time-frequency resources indicated by the Q pieces of scheduling information.

Optionally, the third indication information has corresponding scheduling information that is used to indicate a subband occupied by the second time-frequency resource.

Optionally, the method further includes: receiving, by the network device, first indication information from the terminal device, where the first indication information is used to indicate the second time-frequency resource, or the first indication information is used to indicate a subband occupied by the second time-frequency resource in frequency domain.

The terminal device sends the indication information of the second time-frequency resource to the network device, so that the network device can determine the second time-frequency resource, and the network device can avoid performing, on a resource other than the second time-frequency resource in the first time-frequency resource, detection on uplink information (including uplink data or uplink control information) sent by the terminal device, thereby reducing processing burden of the network device.

Optionally, the second frequency-domain resource is corresponding to a plurality of time-frequency resource elements REs, and the receiving, by the network device, first indication information from the terminal device includes: receiving, by the network device, the first indication information from the terminal device by using at least one of the plurality of REs.

Optionally, the second time-frequency resource includes at least one first symbol used to carry a reference signal, and the determining, by the network device, a third time-frequency resource from the second time-frequency resource includes: determining, by the network device based on a location of the at least one first symbol, a location of a symbol corresponding to the third time-frequency resource.

Optionally, the method further includes: receiving, by the network device, second indication information from the terminal device, where the second indication information is used to indicate the third time-frequency resource, or the third indication information is used to indicate a subband occupied by the third time-frequency resource in frequency domain.

The terminal device sends the indication information of the third time-frequency resource to the network device, so that the network device can determine the third time-frequency resource, and receive the uplink control information on the third time-frequency resource. Therefore, the network device can avoid performing, on a resource other than the third time-frequency resource in the first time-frequency resource (or the second time-frequency resource), detection on the uplink control information sent by the terminal device, thereby reducing processing burden of the network device.

Optionally, the second frequency-domain resource is corresponding to a plurality of REs, and the receiving, by the network device, second indication information from the terminal device includes: receiving, by the network device, the second indication information from the terminal device by using at least one of the plurality of REs.

Optionally, the uplink control information includes at least one of the following information: hybrid automatic repeat request HARQ feedback information, downlink channel quality indicator information CQI, rank indication information RI, and precoding matrix indicator information PMI.

According to a third aspect, a method for transmitting uplink control information is provided. The method includes: generating, by a terminal device, an encoded uplink data packet, where the uplink data packet belongs to an uplink channel, the uplink channel is carried on a candidate time-frequency resource in a first time transmission interval TTI, the candidate time-frequency resource is a first time-frequency resource or a second time-frequency resource, and a second time-domain start point of the second time-frequency resource is later than a first time-domain start point of the first time-frequency resource; and performing, by the terminal device, detection on a carrier in which the candidate time-frequency resource is located, and sending, by the terminal device, the uplink channel on the candidate time-frequency resource based on a result of the detection, where the uplink channel includes uplink control information and the encoded uplink data packet.

According to the method for transmitting uplink control information in this embodiment of this application, a plurality of time-domain start points are set in a TTI used based on a contention mechanism. In addition, before uplink transmission needs to be performed, the terminal device performs detection on a carrier corresponding to the candidate time-frequency resource, so that the terminal device can determine, from the first time-frequency resource or the second time-frequency resource, the candidate time-frequency resource that can be used by the terminal device, and transmit an uplink channel by using the candidate time-frequency resource. That is, in comparison with the prior art, the terminal device can use the candidate time-frequency resource to perform wireless communication with no need to determine that a time-domain start point of the candidate time-frequency resource is located at a start point of a subframe. Therefore, this improves a probability that the terminal device can use the candidate time-frequency resource to perform wireless communication, thereby improving communication efficiency, reducing a service transmission latency, and improving user experience.

Optionally, the sending, by the terminal device, the uplink channel on the candidate time-frequency resource based on a result of the detection includes: when the terminal device determines, before the first time-domain start point, that the carrier in which the candidate time-frequency resource is located is in a sendable state, sending, by the terminal device, the uplink channel on the first time-frequency resource.

Optionally, the sending, by the terminal device, the uplink channel on the first time-frequency resource includes: determining, by the terminal device, a third time-frequency resource from the first time-frequency resource based on a size value of the first time-frequency resource and a first coefficient; and sending, by the terminal device, the uplink control information by using the third time-frequency resource.

Optionally, the sending the uplink channel on the candidate time-frequency resource based on a result of the detection includes: when the terminal device determines, before the first time-domain start point, that the carrier in which the candidate time-frequency resource is located is not in a sendable state, and the terminal device determines, before the second time-domain start point, that the carrier in which the candidate time-frequency resource is located is in a sendable state, sending, by the terminal device, the uplink channel on the second time-frequency resource.

Optionally, the sending, by the terminal device, the uplink channel on the second time-frequency resource includes: determining, by the terminal device, a fourth time-frequency resource from the second time-frequency resource based on a size value of the second time-frequency resource and a second coefficient or determining, by the terminal device, a fourth time-frequency resource from the second time-frequency resource based on a size value of the first time-frequency resource and a first coefficient; and sending, by the terminal device, the uplink control information by using the fourth time-frequency resource.

Optionally, the second coefficient is greater than the first coefficient.

Optionally, a difference between a product of the size value of the second time-frequency resource and the second coefficient, and a product of the size value of the first time-frequency resource and the first coefficient falls within a preset range.

A size of a time-frequency resource, used to carry uplink control information, in the second time-frequency resource is determined based on a size of the second time-frequency resource (or a time-frequency resource, used to carry uplink data, in the second time-frequency resource). Therefore, when the second time-frequency resource is a part of the first time-frequency resource, in the prior art, the size of the time-frequency resource, used to carry uplink control information, in the second time-frequency resource is less than a size of a time-frequency resource, used to carry uplink control information, in the first resource. In contrast, according to the method for transmitting uplink control information in this embodiment of this application, the size of the third time-frequency resource, used to carry uplink control information, in the second time-frequency resource is determined based on a size of the first time-frequency resource, that is, a difference between the size of the third time-frequency resource and a size of a time-frequency resource, used to carry uplink control information, in the first time-frequency resource falls within a preset range. That is, in comparison with the prior art, increasing the size of the time-frequency resource used to carry uplink control information in this embodiment of this application can ensure transmission reliability of the uplink control information.

Optionally, a time-domain resource occupied by the second time-frequency resource is a subset of a time-domain resource occupied by the first time-frequency resource, and a size of a frequency-domain resource occupied by the first time-frequency resource is equal to a size of a frequency-domain resource occupied by the second time-frequency resource.

Optionally, the uplink control information includes at least one of hybrid automatic repeat request HARQ feedback information, downlink channel quality indicator information CQI, rank indication information RI, and precoding matrix indicator information PMI.

Optionally, the first time-frequency resource includes the second time-frequency resource.

Optionally, the second time-frequency resource is a time-frequency resource that is in the first time-frequency resource and that is after the second time-domain start point.

Optionally, the uplink control information is mapped starting from the second time-frequency resource, and the second time-frequency resource is a part of the first time-frequency resource.

Optionally, "the uplink control information is mapped starting from the second time-frequency resource" means that some or all of consecutive bit streams generated by encoding the uplink control information are sequentially mapped starting from the second time-frequency resource.

Optionally, "the uplink control information is mapped starting from the second time-frequency resource" means that some or all of modulation symbols generated by encoding and modulating the uplink control information are sequentially mapped starting from the second time-frequency resource.

Optionally, that the uplink control information is mapped starting from the second time-frequency resource means the following:

The terminal device determines, based on a result of channel detection, that the candidate time-frequency resource is the first time-frequency resource, the terminal device maps the uplink control information starting from the second time-frequency resource in the first time-frequency resource, and the terminal device sends the uplink control information starting from the second time-frequency resource.

Optionally, that the uplink control information is mapped starting from the second time-frequency resource means the following:

The terminal device determines, based on a result of channel detection, that the candidate time-frequency resource is the second time-frequency resource, the terminal device maps the uplink control information starting from the second time-frequency resource, and the terminal device sends the uplink control information on the second time-frequency resource.

Optionally, that the uplink control information is mapped starting from second time-frequency resource means the following:

If a resource that is on the second time-frequency resource and that is used to transmit the uplink control information can meet a performance requirement of transmitting the uplink control information, the terminal device maps the uplink control information only on the second time-frequency resource.

Optionally, that the uplink control information is preferably sent on the second time-frequency resource means the following:

If a resource that is on the second time-frequency resource and that is used to transmit the uplink control information cannot meet a performance requirement of transmitting the uplink control information, the terminal device maps (or sends) a first part of the uplink control information to the second time-frequency resource, and maps (or sends) a second part of the uplink control information to a time-frequency resource other than the second time-frequency resource in the first time-frequency resource.

Optionally, that the uplink control information is mapped starting from the second time-frequency resource means the following:

If a resource that is on the second time-frequency resource and that is used to transmit the uplink control information cannot meet a performance requirement of transmitting the uplink control information, the terminal device maps (or sends) a first part of the uplink control information to the second time-frequency resource, and discards a second part of the uplink control information.

Optionally, that the uplink control information is mapped starting from the second time-frequency resource means the following:

The terminal device is prohibited from sending the uplink control information on a time-frequency resource other than the second time-frequency resource in the first time-frequency resource.

Optionally, the "first part of the uplink control information" may be data including consecutive bit streams that are output first after the uplink control information is encoded, and the "second part of the uplink control information" may be data including consecutive bit streams that are output later after the uplink control information is encoded.

A size of the "first part of the uplink control information" may be the same as a size of a maximum resource, on the second time-frequency resource, that can be used to transmit the uplink control information.

Optionally, a size of the "second part of the uplink control information" may be a size of a remaining part obtained after the size of the first part is subtracted from a size of the fourth time-frequency resource that is allocated by the network device and that is used to carry the uplink control information.

Optionally, an end part of the "first part of the uplink control information" and a start part of the "second part of the uplink control information" are consecutive bit streams.

Optionally, the first TTI includes two slots, the first time-frequency resource is a time-frequency resource in the first slot of the first TTI, and the second time-frequency resource is a time-frequency resource in the second slot of the first TTI.

According to the method for transmitting uplink control information in this embodiment of this application, the terminal device performs detection on the carrier in which the candidate time-frequency resource is located, and selects, based on the result of the detection, the first time-frequency resource or the second time-frequency resource to send an uplink channel, where the uplink channel includes uplink control information and an uplink data packet. In this process, in a feasible manner, an encoded uplink data packet and encoded uplink control information that are generated by the terminal device match the first time-frequency resource. When the result of the detection is that the first time-frequency resource is available, the terminal device sends the encoded uplink data packet and the encoded uplink control information starting from the first time-frequency resource. When the result of the detection is that the second time-frequency resource is available, the terminal device sends the encoded uplink data packet and the encoded uplink control information starting from the second time-frequency resource. It should be noted that the terminal device assembles in advance a data packet and uplink control information that need to be mapped to the first time-frequency resource. Therefore, when the result of the detection is that the first time-frequency resource is unavailable but the second time-frequency resource is available, limited by a processing capability, the terminal device cannot regenerate another encoded uplink data packet and another encoded uplink control information that match the second time-frequency resource. Therefore, the terminal device discards a part that cannot match the second time-frequency resource and that is of the encoded uplink data packet and the encoded uplink control information that are generated in advance and that match the first time-frequency resource. That is, the terminal device punctures the encoded uplink data packet and the encoded uplink control information to match the second time-frequency resource, and transmits, on the second time-frequency resource, the encoded uplink data packet and the encoded uplink control information that are obtained through puncturing. In addition, usually the uplink control information is transmitted only once. Therefore, when the result of the detection is that the second time-frequency resource is available, based on the foregoing implementation, transmission performance of the uplink control information cannot be ensured.

In contrast, the terminal device is enabled to preferably send the uplink control information on the second time-frequency resource. Regardless of whether the terminal device determines, based on the result of channel detection, that the candidate time-frequency resource that can be used for sending the uplink channel is the first time-frequency resource or the second time-frequency resource, the uplink control information carried on the second time-frequency resource can be sent, thereby ensuring performance of the uplink control information.

That is, in this embodiment of this application, the first time-frequency resource includes the second time-frequency resource, or a time period corresponding to the second time-frequency resource belongs to a TTI corresponding to the first time-frequency resource. Therefore, when the first time-frequency resource is available, usually the second time-frequency resource is also available. However, when the second time-frequency resource is available, a resource that is in the first time-frequency resource and that is before the second time-frequency resource in time domain is not necessarily available. Therefore, a possibility that the terminal device obtains the second time-frequency resource through contention is greater than a possibility that the terminal device obtains the complete first time-frequency resource through contention. In this implementation, the uplink control information is preferably mapped to the second time-frequency resource, thereby improving transmission reliability of the uplink control information.

Optionally, the encoded uplink data packet is sent starting from the second time-frequency resource, and the second time-frequency resource is a part of the first time-frequency resource.

Herein, "the encoded uplink data packet is sent starting from the second time-frequency resource" means that some or all of consecutive bit streams generated by encoding the uplink data packet are sequentially mapped starting from the second time-frequency resource.

Optionally, that the encoded uplink data packet is sent starting from the second time-frequency resource means the following:

The terminal device determines, based on the result of channel detection, that the candidate time-frequency resource is the first time-frequency resource. The terminal device maps a first part of the encoded uplink data packet to the second time-frequency resource in the first time-frequency resource. The terminal device maps a second part of the encoded uplink data packet to a resource other than the second time-frequency resource in the first time-frequency resource. The terminal device sends the encoded uplink data packet on the first time-frequency resource.

Optionally, that the encoded uplink data packet is sent starting from the second time-frequency resource means the following:

The terminal device determines, based on the result of channel detection, that the candidate time-frequency resource is the second time-frequency resource. The terminal device maps a first part of the encoded uplink data packet to the second time-frequency resource. The terminal device sends the first part of the encoded uplink data packet on the second time-frequency resource.

Optionally, the "first part of the encoded uplink data packet" may be data including consecutive bit streams that are output first in the encoded uplink data packet, and the "second part of the encoded uplink data packet" may be data including consecutive bit streams that are output later in the encoded uplink data packet.

Optionally, an end part of the "first part of the encoded uplink data packet" and a start part of the "second part of the encoded uplink data packet" are consecutive bit streams.

Optionally, a size of the "first part of the encoded uplink data packet" may be the same as a size of a maximum resource, on the second time-frequency resource, that can be used to transmit the encoded uplink data packet.

Optionally, a size of the "second part of the encoded uplink data packet" may be a size of a remaining part obtained after the size of the first part is subtracted from a size of a resource that is allocated by the network device and that is used to carry the encoded uplink data packet.

Optionally, the "first part of the encoded uplink data packet" is a system bit obtained by encoding the uplink data packet.

Generally, some front bits of the encoded uplink data packet carry relatively important information (for example, system bits). Because a possibility that the terminal device obtains the second time-frequency resource through contention is greater than a possibility that the terminal device obtains the first time-frequency resource through contention, sending front data of the encoded uplink data packet on the second time-frequency resource can improve transmission reliability of the relatively important information and improve communication performance.

The system bit may be a bit other than a check bit formed after the uplink data is encoded. Alternatively, the system bit may be a bit corresponding to original data.

According to a fourth aspect, a method for transmitting uplink control information is provided. The method includes: sending, by a network device, scheduling information to a terminal device, where the scheduling information is used to instruct the terminal device to transmit an uplink channel within a first time transmission interval TTI, the uplink channel includes at least uplink control information, the uplink channel is carried on a candidate time-frequency resource in the first TTI, the candidate time-frequency resource is a first time-frequency resource or a second time-frequency resource, and a second time-domain start point of the second time-frequency resource is later than a first time-domain start point of the first time-frequency resource; and receiving, by the network device by using the candidate time-frequency resource, the uplink channel sent by the terminal device.

According to the method for transmitting uplink control information in this embodiment of this application, a plurality of time-domain start points are set in a TTI used based on a contention mechanism. In addition, before uplink transmission needs to be performed, the terminal device performs detection on a carrier corresponding to the candidate time-frequency resource, so that the terminal device can determine, from the first time-frequency resource or the second time-frequency resource, the candidate time-frequency resource that can be used by the terminal device, and transmit an uplink channel by using the candidate time-frequency resource. That is, in comparison with the prior art, the terminal device can use the candidate time-frequency resource to perform wireless communication with no need to determine that a time-domain start point of the candidate time-frequency resource is located at a start point of a subframe. Therefore, this improves a probability that the terminal device can use the candidate time-frequency resource to perform wireless communication, thereby improving communication efficiency, reducing a service transmission latency, and improving user experience.

Optionally, the receiving, by the network device by using the candidate time-frequency resource, the uplink channel sent by the terminal device includes: when the terminal device determines, before the first time-domain start point, that a carrier in which the candidate time-frequency resource is located is in a sendable state, receiving, by the network device, the uplink channel on the first time-frequency resource.

Optionally, the receiving, by the network device by using the candidate time-frequency resource, the uplink channel sent by the terminal device includes: determining, by the terminal device, a third time-frequency resource from the first time-frequency resource based on a size value of the first time-frequency resource and a first coefficient; and receiving, by the network device, the uplink control information by using the third time-frequency resource.

Optionally, the receiving, by the network device by using the candidate time-frequency resource, the uplink channel sent by the terminal device includes: when the terminal device determines, before the first time-domain start point, that the carrier in which the candidate time-frequency resource is located is not in a sendable state, and the terminal device determines, before the second time-domain start point, that the carrier in which the candidate time-frequency resource is located is in a sendable state, receiving, by the network device, the uplink channel on the second time-frequency resource.

Optionally, the receiving, by the network device by using the candidate time-frequency resource, the uplink channel sent by the terminal device includes: determining, by the terminal device, a fourth time-frequency resource from the second time-frequency resource based on a size value of the second time-frequency resource and a second coefficient; or determining, by the terminal device, a fourth time-frequency resource from the second time-frequency resource based on a size value of the first time-frequency resource and a first coefficient; and receiving, by the network device, the uplink control information by using the fourth time-frequency resource.

Optionally, the second coefficient is greater than the first coefficient.

Optionally, a difference between a product of the size value of the second time-frequency resource and the second coefficient, and a product of the size value of the first time-frequency resource and the first coefficient falls within a preset range.

A size of a time-frequency resource, used to carry uplink control information, in the second time-frequency resource is determined based on a size of the second time-frequency resource a time-frequency resource, used to carry uplink data, in the second time-frequency resource). Therefore, when the second time-frequency resource is a part of the first time-frequency resource, in the prior art, the size of the time-frequency resource, used to carry uplink control information, in the second time-frequency resource is less than a size of a time-frequency resource, used to carry uplink control information, in the first resource. In contrast, according to the method for transmitting uplink control information in this embodiment of this application, the size of the third time-frequency resource, used to carry uplink control information, in the second time-frequency resource is determined based on a size of the first time-frequency resource, that is, a difference between the size of the third time-frequency resource and a size of a time-frequency resource, used to carry uplink control information, in the first time-frequency resource falls within a preset range. That is, in comparison with the prior art, increasing the size of the time-frequency resource used to carry uplink control information in this embodiment of this application can ensure transmission reliability of the uplink control information.

Optionally, a time-domain resource occupied by the second time-frequency resource is a subset of a time-domain resource occupied by the first time-frequency resource, and a size of a frequency-domain resource occupied by the first time-frequency resource is equal to a size of a frequency-domain resource occupied by the second time-frequency resource.

Optionally, the uplink control information includes at least one of hybrid automatic repeat request HARQ feedback information, downlink channel quality indicator information CQI, rank indication information RI, and precoding matrix indicator information PMI.

Optionally, the first time-frequency resource includes the second time-frequency resource.

Optionally, the second time-frequency resource is a time-frequency resource that is in the first time-frequency resource and that is after the second time-domain start point.

Optionally, the uplink control information is mapped starting from the second time-frequency resource, and the second time-frequency resource is a part of the first time-frequency resource.

Herein, "the uplink control information is mapped starting from the second time-frequency resource" means that some or all of consecutive hit streams generated by encoding the uplink control information are sequentially mapped starting from the second time-frequency resource.

Optionally, that the uplink control information is mapped starting from the second time-frequency resource means the following:

If the candidate time-frequency resource is the first time-frequency resource, the uplink control information is mapped starting from the second time-frequency resource in the first time-frequency resource, and transmitted on the second time-frequency resource.

Optionally, that the uplink control information is mapped starting from the second time-frequency resource means the following:

If the candidate time-frequency resource is the second time-frequency resource, the uplink control information is mapped starting from the second time-frequency resource, and transmitted on the second time-frequency resource.

Optionally, that the uplink control information is mapped starting from the second time-frequency resource means the following:

If a resource that is on the second time-frequency resource and that is used to transmit the uplink control information can meet a performance requirement of transmitting the uplink control information, the uplink control information is mapped (or transmitted) only to the second time-frequency resource.

Optionally, that the uplink control information is mapped starting from the second time-frequency resource means the following:

If a resource that is on the second time-frequency resource and that is used to transmit the uplink control information cannot meet a performance requirement of transmitting the uplink control information, a first part of the uplink control information is mapped on the second time-frequency resource, and a second part of the uplink control information is mapped to a time-frequency resource other than the second time-frequency resource in the first time-frequency resource.

Optionally, that the uplink control information is mapped starting from the second time-frequency resource means the following:

If a resource that is on the second time-frequency resource and that is used to transmit the uplink control information cannot meet a performance requirement of transmitting the uplink control information, a first part of the uplink control information is mapped on the second time-frequency resource, and a second part of the uplink control information is discarded.

Optionally, that the uplink control information is mapped starting from the second time-frequency resource means the following:

The uplink control information is prohibited from being mapped to a time-frequency resource other than the second time-frequency resource in the first time-frequency resource.

Optionally, the "first part of the uplink control information" may be data including consecutive bit streams that are output first after the uplink control information is encoded, and the "second part of the uplink control information" may be data including consecutive bit streams that are output later after the uplink control information is encoded.

A size of the "first part of the uplink control information" may be the same as a size of a maximum resource, on the second time-frequency resource, that can be used to transmit the uplink control information.

Optionally, a size of the "second part of the uplink control information" may be a size of a remaining part obtained after the size of the first part is subtracted from a size of the fourth time-frequency resource that is allocated by the network device and that is used to carry the uplink control information.

Optionally, an end part of the "first part of the uplink control information" and a start part of the "second part of the uplink control information" are consecutive bit streams.

Optionally, the first TTI includes two slots, the first time-frequency resource is a time-frequency resource in the first slot of the first TTI, and the second time-frequency resource is a time-frequency resource in the second slot of the first TTI.

According to the method for transmitting uplink control information in this embodiment of this application, the terminal device performs detection on the carrier in which the candidate time-frequency resource is located, and selects, based on the result of the detection, the first time-frequency resource or the second time-frequency resource to send an uplink channel, where the uplink channel includes uplink control information and an uplink data packet. In this process, in a feasible manner, an encoded uplink data packet and encoded uplink control information that are generated by the terminal device match the first time-frequency resource. When the result of the detection is that the first time-frequency resource is available, the terminal device sends the encoded uplink data packet and the encoded uplink control information starting from the first time-frequency resource. When the result of the detection is that the second time-frequency resource is available, the terminal device sends the encoded uplink data packet and the encoded uplink control information starting from the second time-frequency resource. It should be noted that the terminal device assembles in advance a data packet and uplink control information that need to be mapped to the first time-frequency resource. Therefore, when the result of the detection is that the first time-frequency resource is unavailable but the second time-frequency resource is available, limited by a processing capability, the terminal device cannot regenerate another encoded uplink data packet and another encoded uplink control information that match the second time-frequency resource. Therefore, the terminal device discards a part that cannot match the second time-frequency resource and that is of the encoded uplink data packet and the encoded uplink control information that are generated in advance and that match the first time-frequency resource. That is, the terminal device punctures the encoded uplink data packet and the encoded uplink control information to match the second time-frequency resource, and transmits, on the second time-frequency resource, the encoded uplink data packet and the encoded uplink control information that are obtained through puncturing. In addition, usually the uplink control information is transmitted only once. Therefore, when the result of the detection is that the second time-frequency resource is available, based on the foregoing implementation, transmission performance of the uplink control information cannot be ensured.

In contrast, the terminal device is enabled to preferably send the uplink control information on the second time-frequency resource. Regardless of whether the terminal device determines, based on the result of channel detection, that the candidate time-frequency resource that can be used for sending the uplink channel is the first time-frequency resource or the second time-frequency resource, the uplink control information carried on the second time-frequency resource can be sent, thereby ensuring performance of the uplink control information.

That is, in this embodiment of this application, the first time-frequency resource includes the second time-frequency resource, or a time period corresponding to the second time-frequency resource belongs to a TTI corresponding to the first time-frequency resource. Therefore, when the first time-frequency resource is available, usually the second time-frequency resource is also available. However, when the second time-frequency resource is available, a resource that is in the first time-frequency resource and that is before the second time-frequency resource in time domain is not necessarily available. Therefore, a possibility that the terminal device obtains the second time-frequency resource through contention is greater than a possibility that the terminal device obtains the complete first time-frequency resource through contention. In this implementation, the uplink control information is preferably mapped to the second time-frequency resource, thereby improving transmission reliability of the uplink control information.

Optionally, the encoded uplink data packet is mapped starting from the second time-frequency resource, and the second time-frequency resource is a part of the first time-frequency resource.

Optionally, that the encoded uplink data packet is mapped starting from the second time-frequency resource means the following:

If the candidate time-frequency resource is the first time-frequency resource, a first part of the encoded uplink data packet is mapped to the second time-frequency resource in the first time-frequency resource, and a second part of the encoded uplink data packet is mapped to a resource other than the second time-frequency resource in the first time-frequency resource.

Optionally, that the encoded uplink data packet is mapped starting from the second time-frequency resource means the following:

If the candidate time-frequency resource is the second time-frequency resource, a first part of the encoded uplink data packet is mapped to the second time-frequency resource.

Optionally, the "first part of the encoded uplink data packet" may be data including consecutive bit streams that are output first in the encoded uplink data packet, and the "second part of the encoded uplink data packet" may be data including consecutive bit streams that are output later in the encoded uplink data packet.

Optionally, an end part of the "first part of the encoded uplink data packet" and a start part of the "second part of the encoded uplink data packet" are consecutive bit streams.

Optionally, a size of the "first part of the encoded uplink data packet" may be the same as a size of a maximum resource, on the second time-frequency resource, that can be used to transmit the encoded uplink data packet.

Optionally, a size of the "second part of the encoded uplink data packet" may be a size of a remaining part obtained after the size of the first part is subtracted from a size of a resource that is allocated by the network device and that is used to carry the encoded uplink data packet.

Optionally, the "first part of the encoded uplink data packet" is a system bit obtained by encoding the uplink data packet.

Generally, some front bits of the encoded uplink data packet carry relatively important information (for example, system bits). Because a possibility that the terminal device obtains the second time-frequency resource through contention is greater than a possibility that the terminal device obtains the first time-frequency resource through contention, sending front data of the encoded uplink data packet on the second time-frequency resource can improve transmission reliability of the relatively important information and improve communication performance.

The system bit may be a bit other than a check bit formed after the uplink data is encoded. Alternatively, the system bit may be a bit corresponding to original data.

According to a fifth aspect, a method for transmitting uplink control information is provided, and is applied to a communications system including a network device and a terminal device. A frequency-domain resource used by the communications system is a frequency-domain resource used based on a contention mechanism. A transmission time interval TTI used by the communications system includes at least two time-domain start points. The method includes: receiving, by the terminal device, scheduling information from the network device, where the scheduling information is used to indicate a time-frequency resource that is allocated by the network device to the terminal device and that is used to carry at least one uplink channel, one first uplink channel of the at least one uplink channel is carried on a first frequency-domain resource, the first uplink channel is carried in a first TTI, and the first uplink channel includes at least uplink control information; detecting, by the terminal device, the first frequency-domain resource, and determining, based on a result of the detection, a first time-domain start point from at least two time-domain start points included in the first TTI, where a second frequency-domain resource in the first frequency-domain resource is in a state that can be used by the terminal device after the first time-domain start point, and the second frequency-domain resource is a pail or all of the first frequency-domain resource; and sending, by the terminal device, the first uplink channel starting from the first time-domain start point by using the second frequency-domain resource.

According to the method for transmitting uplink control information in this embodiment of this application, a plurality of time-domain start points are set in a TTI used based on the contention mechanism. In addition, before uplink transmission needs to be performed, the terminal device performs detection on the first frequency-domain resource indicated by the network device, so that the terminal device can determine, from the first frequency-domain resource, the second frequency-domain resource that can be used by the terminal device. In addition, the terminal device can determine, from the at least two time-domain start points included in the first TTI, the first time-domain start point of the second frequency-domain resource that can be used by the terminal device, so that the terminal device can transmit the uplink channel starting from the first time-domain start point by using the second frequency-domain resource. That is, in comparison with the prior art, the terminal device can use a candidate time-frequency resource to perform wireless communication with no need to determine that a time-domain start point of the candidate time-frequency resource is located at a start point of a subframe. Therefore, this improves a probability that the terminal device can use the candidate time-frequency resource to perform wireless communication, thereby improving communication efficiency, reducing a service transmission latency, and improving user experience.

Optionally, the scheduling information is specifically used to indicate a first time-frequency resource used to carry the first uplink channel. The detecting, by the terminal device, the first frequency-domain resource includes: detecting, by the terminal device, the first frequency-domain resource to determine, from the first time-frequency resource, a second time-frequency resource that can be used by the terminal device, where a time-domain start point of the second time-frequency resource is the first time-domain start point, and the second time-frequency resource occupies the second frequency-domain resource in frequency domain. The sending, by the terminal device, the first uplink channel starting from the first time-domain start point by using the second frequency-domain resource includes: determining, by the terminal device, a third time-frequency resource from the second time-frequency resource based on reference information; and sending, by the terminal device, the uplink control information by using the third time-frequency resource. The reference information is used to indicate at least one of the following values: a size value of the first time-frequency resource, a size value of the first frequency-domain resource, a size value of the second time-frequency resource, a size value of the second frequency-domain resource, and a first reference value. In addition, the first reference value is specified by the communications system, or the first reference value is pre-indicated by the network device.

A size of a time-frequency resource, used to carry uplink control information, in the second time-frequency resource is determined based on a size of the second time-frequency resource (or a time-frequency resource, used to carry uplink data, in the second time-frequency resource). Therefore, when the second time-frequency resource is a part of the first time-frequency resource, in the prior art, the size of the time-frequency resource, used to carry uplink control information, in the second time-frequency resource is less than a size of a time-frequency resource, used to carry uplink control information, in the first resource. In contrast, according to the method for transmitting uplink control information in this embodiment of this application, the size of the third time-frequency resource, used to carry uplink control information, in the second time-frequency resource is determined based on a size of the first time-frequency resource, that is, a difference between the size of the third time-frequency resource and a size of a time-frequency resource, used to carry uplink control information, in the first time-frequency resource falls within a preset range. That is, in comparison with the prior art, increasing the size of the time-frequency resource used to carry uplink control information in this embodiment of this application can ensure transmission reliability of the uplink control information.

Optionally, the determining, by the terminal device, a third time-frequency resource from the second time-frequency resource based on reference information includes: determining, by the terminal device, the third time-frequency resource from the second time-frequency resource based on the reference information and a first coefficient, where the first coefficient is used to determine a size of a time-frequency resource that carries uplink control information.

Optionally, the method further includes: obtaining, by the terminal device, first mapping relationship information, where the first mapping relationship information is used to indicate a mapping relationship between a plurality of values including a value indicated by the reference information and a plurality of coefficients including the first coefficient; and using, by the terminal device based on the first mapping relationship information, a coefficient corresponding to the value indicated by the reference information as the first coefficient.

Optionally, the determining, by the terminal device, a third time-frequency resource from the second time-frequency resource based on reference information includes: determining, by the terminal device, the third time-frequency resource from the second time-frequency resource based on the reference information and a preset first upper limit value, where a size of the third time-frequency resource is less than or equal to the first upper limit value.

Optionally, the method further includes: obtaining, by the terminal device, second mapping relationship information, where the second mapping relationship information is used to indicate a mapping relationship between a plurality of values including a value indicated by the reference information and a plurality of upper limit values including the first upper limit value; and using, by the terminal device based on the second mapping relationship information, an upper limit value corresponding to the value indicated by the reference information as the first upper limit value.

Optionally, the frequency-domain resource used by the communications system is divided into N subbands, $N \geq 2$, the first frequency-domain resource occupies M subbands in the N subbands, $M \geq 2$, the second frequency-domain resource occupies K subbands in the M subbands in frequency domain, and $M > K \geq 1$.

Optionally, the uplink control information includes at least one of hybrid automatic repeat request HARQ feedback information, downlink channel quality indicator information CQI, rank indication information RI, and precoding matrix indicator information PMI.

Optionally, the first TTI includes a front time-domain start point and a back time-domain start point, where the front time-domain start point is before the back time-domain start point in time domain; and when the second frequency-domain resource is in a state that can be used by the terminal device after both the front time-domain start point and the back time-domain start point, the sending, by the terminal device, the first uplink channel starting from the first time-domain start point by using the second frequency-domain resource includes:

sending, by the terminal device, the uplink control information starting from the second frequency-domain resource after the back time-domain start point.

Optionally, the sending, by the terminal device, the uplink control information starting from the second frequency-domain resource after the back time-domain start point includes:

if the second frequency-domain resource after the back time-domain start point can meet a transmission requirement of the uplink control information, sending, by the terminal device, the uplink control information only on the second frequency-domain resource after the back time-domain start point; or if the second frequency-domain resource after the back time-domain start point cannot meet a transmission requirement of the uplink control information, sending (or mapping), by the terminal device, a first part of the uplink control information on the second frequency-domain resource after the back time-domain start point, and sending (or mapping) a second part of the uplink control information on the second frequency-domain resource after the front time-domain start point; or if the second frequency-domain resource after the back time-domain start point cannot meet a transmission requirement of the uplink control information, sending (or mapping), by the terminal device, a first part of the uplink control information on the second frequency-domain resource after the second time-domain start point of the back time-frequency resource, and discarding a second part of the uplink control information; or prohibiting the terminal device from sending the uplink control information on the second frequency-domain resource after the front time-domain start point Optionally, the "first part of the uplink control information" may be data including consecutive bit streams that are output first after the uplink control information is encoded, and the "second part of the uplink control information" may be data including consecutive bit streams that are output later after the uplink control information is encoded.

The "first part of the uplink control information" may be a part that is of the uplink control information and that can be carried to a maximum extent on the second frequency-domain resource after the back time-domain start point, and the "second part of the uplink control information" may be a remaining part of the uplink control information except the first part.

Optionally, a location of the first part in the uplink control information is located before the second part.

Optionally, an end part of the "first part of the uplink control information" and a start part of the "second part of the uplink control information" are consecutive bit streams.

Optionally, the first TTI includes two slots, the front time-domain start point is a start point of the first slot in the first TTI, and the back time-frequency resource is a start point of the second slot in the first TTI.

According to the method for transmitting uplink control information in this embodiment of this application, the terminal device performs detection on a carrier in which the candidate time-frequency resource is located, and selects, based on a result of the detection, a resource after the back time-domain start point or a resource after the front time-domain start point to send an uplink channel. In this process, in a feasible manner, an encoded uplink data packet generated by the terminal device matches the resource after the front time-domain start point. When the result of the detection is that the resource after the front time-domain start point is available, the terminal device sends the uplink data packet and the uplink control information starting from the resource after the front time-domain start point. When the result of the detection is that the resource after the back time-domain start point is available, the terminal device sends the uplink data packet and the uplink control information starting from the resource after the back time-domain start point. It should be noted that, to reduce a communication latency, the terminal device assembles in advance a data packet and uplink control information that need to be mapped to the resource after the front time-domain start point and the resource after the back time-domain start point. Therefore, when the result of the detection is that the resource after the back time-domain start point is available (or the resources after the front time-domain start point and the back time-domain start point are unavailable), limited by a capability, the terminal device cannot regenerate another encoded uplink data packet and another encoded uplink control information that match the resource after the back time-domain start point. Therefore, the terminal device discards a part (to be specific, the uplink data packet and the uplink control information that need to be mapped to the resource after the front time-domain start point) that cannot match the resource after the back time-domain start point and that is of the uplink data packet or the uplink control information generated in advance. In addition, usually the uplink control information is transmitted only once. Therefore, when the result of the detection is that the resource after the back time-domain start point is available, based on the foregoing implementation, transmission performance of the uplink control information cannot be ensured.

In contrast, the terminal device is enabled to preferably send uplink control information on the resource after the back time-domain start point. Regardless of whether the terminal device determines, based on a result of channel detection, that a candidate time-frequency resource that can be used for sending an uplink channel is the resource after the front time-domain start point or the resource after the back time-domain start point, uplink control information carried on the uplink channel can be sent, thereby ensuring performance of the uplink control information.

That is, in this embodiment of this application, because the first time-frequency resource and the second time-frequency resource belong to a same TTI, when the first time-frequency resource is available, usually the second time-frequency resource is also available. However, when the second time-frequency resource is available, the first time-frequency resource is not necessarily available. Therefore, a possibility that the terminal device obtains the second time-frequency resource through contention is greater than a possibility that the terminal device obtains the first time-frequency resource through contention. In the foregoing implementation, that is, the uplink control information is preferably mapped on the second time-frequency resource, thereby improving transmission reliability of the uplink control information.

Optionally, the first Tri includes a front time-domain start point and a back time-domain start point, where the front time-domain start point is before the back time-domain start point in time domain; and the sending, by the terminal device, the first uplink channel starting from the first time-domain start point by using the second frequency-domain resource includes:

when the second frequency-domain resource is in a state that can be used by the terminal device after both the front time-domain start point and the back time-domain start point, sending (or mapping), by the terminal device, a first part of an encoded uplink data packet on the second frequency-domain resource after the back time-domain start point, and sending (or mapping) a second part of the encoded uplink data packet on the second frequency-domain resource after the front time-domain start point.

Optionally, the "first part of the encoded uplink data packet" may be data including consecutive hit streams that are output first in the encoded uplink data packet, and the "second part of the encoded uplink data packet" may be data including consecutive bit streams that are output later in the encoded uplink data packet.

Optionally, an end part of the "first part of the encoded uplink data packet" and a start part of the "second part of the encoded uplink data packet" are consecutive bit streams.

Optionally, a size of the "first part of the encoded uplink data packet" may be the same as a size of a maximum resource, on the second time-frequency resource, that can be used to transmit the encoded uplink data packet.

Optionally, a size of the "second part of the encoded uplink data packet" may be a size of a remaining part obtained after the size of the first part is subtracted from a size of a resource that is allocated by the network device and that is used to carry the encoded uplink data packet.

Optionally, the "first part of the encoded uplink data packet" is a system bit obtained by encoding the uplink data packet.

The second frequency-domain resource after the front time-domain start point is the second frequency-domain resource in time domain between the front time-domain start point and the back time-domain start point.

Generally, some front bits of the uplink data packet carry relatively important information (for example, system bits). Because a possibility that the terminal device obtains the resource after the back time-domain start point through contention is greater than a possibility that the terminal device obtains the resource after the front time-domain start point through contention, sending front first data of the uplink data packet on the resource after the back time-domain start point can improve transmission reliability of the relatively important information and improve communication performance.

According to a sixth aspect, a method for transmitting uplink control information is provided, and is applied to a communications system including a network device and a terminal device. A frequency-domain resource used by the communications system is a frequency-domain resource used based on a contention mechanism. A transmission time interval TTI used by the communications system includes at least two time-domain start points. The method includes: sending, by the network device, scheduling information to the terminal device, where the scheduling information is used to indicate a time-frequency resource that is allocated by the network device to the terminal device and that is used to carry at least one uplink channel, one first uplink channel of the at least one uplink channel is carried on a first frequency-domain resource, the first uplink channel is carried in a first TTI, and the first uplink channel includes at least uplink control information; and receiving, by the network device, the first uplink channel from the terminal device starting from a first time-domain start point by using the second frequency-domain resource, where the first time-domain start point is determined, from at least two time-domain start points included in the first TTI, by the terminal device after the first frequency-domain resource is detected, the second frequency-domain resource in the first frequency-domain resource is in a state that can be used by the terminal device after the first time-domain start point, and the second frequency-domain resource is a part or all of the first frequency-domain resource.

According to the method for transmitting uplink control information in this embodiment of this application, a plurality of time-domain start points are set in a TTI used based on the contention mechanism. In addition, before uplink transmission needs to be performed, the terminal device performs detection on the first frequency-domain resource indicated by the network device, so that the terminal device can determine, from the first frequency-domain resource, the second frequency-domain resource that can be used by the terminal device. In addition, the terminal device can determine, from the at least two time-domain start points included in the first TTI, the first time-domain start point of the second frequency-domain resource that can be used by the terminal device, so that the terminal device can transmit the uplink channel starting from the first time-domain start point by using the second frequency-domain resource. That is, in comparison with the prior art, the terminal device can use a candidate time-frequency resource to perform wireless communication with no need to determine that a time-domain start point of the candidate time-frequency resource is located at a start point of a subframe. Therefore, this improves a probability that the terminal device can use the candidate time-frequency resource to perform wireless communication, thereby improving communication efficiency, reducing a service transmission latency, and improving user experience.

Optionally, the scheduling information is specifically used to indicate a first time-frequency resource used to carry the first uplink channel, a time-domain start point of the second time-frequency resource is the first time-domain start point, the second time-frequency resource occupies the second frequency-domain resource in frequency domain, and the second time-frequency resource is a time-frequency resource that can be used by the terminal device in the first time-frequency resource. In addition, the receiving, by the network device, the first uplink channel from the terminal device starting from a first time-domain start point by using the second frequency-domain resource includes: determining, by the network device, a third time-frequency resource from the second time-frequency resource based on reference information; and receiving, by the network device, the uplink control information by using the third time-frequency resource. The reference information is used to indicate at least one of the following values: a size value of the first time-frequency resource, a size value of the first frequency-domain resource, a size value of the second time-frequency resource, a size value of the second frequency-domain resource, and a first reference value. In addition, the first reference value is specified by the communications system, or the first reference value is pre-indicated by the network device.

A size of a time-frequency resource, used to carry uplink control information, in the second time-frequency resource is determined based on a size of the second time-frequency resource (or a time-frequency resource, used to carry uplink data, in the second time-frequency resource). Therefore, when the second time-frequency resource is a part of the first time-frequency resource, in the prior art, the size of the time-frequency resource, used to carry uplink control information, in the second time-frequency resource is less than a size of a time-frequency resource, used to carry uplink control information, in the first resource. In contrast, according to the method for transmitting uplink control information in this embodiment of this application, the size of the third time-frequency resource, used to carry uplink control information, in the second time-frequency resource is determined based on a size of the first time-frequency resource, that is, a difference between the size of the third time-frequency resource and a size of a time-frequency resource, used to carry uplink control information, in the first time-frequency resource falls within a preset range. That is, in comparison with the prior art, increasing the size of the time-frequency resource used to carry uplink control information in this embodiment of this application can ensure transmission reliability of the uplink control information.

Optionally, the determining, by the network device, a third time-frequency resource from the second time-frequency resource based on reference information includes: determining, by the network device, the third time-frequency resource from the second time-frequency resource based on the reference information and a first coefficient, where the first coefficient is used to determine a size of a time-frequency resource that carries uplink control information.

Optionally, the method further includes: obtaining, by the network device, first mapping relationship information, where the first mapping relationship information is used to indicate a mapping relationship between a plurality of values including a value indicated by the reference information and a plurality of coefficients including the first coefficient; and using, by the network device based on the first mapping relationship information, a coefficient corresponding to the value indicated by the reference information as the first coefficient.

Optionally, the determining, by the network device, a third time-frequency resource from the second time-frequency resource based on reference information includes: determining, by the network device, the third time-frequency resource from the second time-frequency resource based on the reference information and a preset first upper limit value, where a size of the third time-frequency resource is less than or equal to the first upper limit value.

Optionally, the method further includes: obtaining, by the network device, second mapping relationship information, where the second mapping relationship information is used to indicate a mapping relationship between a plurality of values including a value indicated by the reference information and a plurality of upper limit values including the first upper limit value; and using, by the network device based on the second mapping relationship information, an upper limit value corresponding to the value indicated by the reference information as the first upper limit value.

Optionally, the frequency-domain resource used by the communications system is divided into N subbands, $N \geq 2$, the first frequency-domain resource occupies M subbands in the N subbands, $M \geq 2$, the second frequency-domain resource occupies K subbands in the M subbands in frequency domain, and $M > K \geq 1$.

Optionally, the uplink control information includes at least one of hybrid automatic repeat request HARQ feedback information, downlink channel quality indicator information CQI, rank indication information RI, and precoding matrix indicator information PMI.

Optionally, the first TTI includes a front time-domain start point and a back time-domain start point, where the front time-domain start point is before the back time-domain start point in time domain; and when the second frequency-domain resource is in a state that can be used by the terminal device after both the front time-domain start point and the back time-domain start point, the receiving, by the network device, the first uplink channel from the terminal device starting from a first time-domain start point by using the second frequency-domain resource includes:

receiving, by the network device, the uplink control information starting from the second frequency-domain resource after the back time-domain start point.

Optionally, the receiving, by the network device, the uplink control information starting from the second frequency-domain resource after the back time-domain start point includes:

if the second frequency-domain resource after the back time-domain start point can meet a transmission requirement of the uplink control information, receiving, by the network device, the uplink control information only on the second frequency-domain resource after the back time-domain start point; or if the second frequency-domain resource after the back time-domain start point cannot meet a transmission requirement of the uplink control information, receiving, by the network device, a first part of the uplink control information on the second frequency-domain resource after the back time-domain start point, and receiving a second part of the uplink control information on the second frequency-domain resource after the front time-domain start point; or if the second frequency-domain resource after the back time-domain start point cannot meet a transmission requirement of the uplink control information, receiving, by the network device, a first part of the uplink control information on the second frequency-domain resource after the second time-domain start point of the back time-frequency resource; or prohibiting the network device from receiving the uplink control information on the second frequency-domain resource after the front time-domain start point.

The "first part of the uplink control information" may be data including consecutive hit streams that are output first after the uplink control information is encoded, and the "second part of the uplink control information" may be data including consecutive bit streams that are output later after the uplink control information is encoded.

Optionally, a size of the "first part of the uplink control information" may be the same as a size of a maximum resource, on the second time-frequency resource, that can be used to transmit the uplink control information.

Optionally, a size of the "second part of the uplink control information" may be a size of a remaining part obtained after the size of the first part is subtracted from a size of the fourth time-frequency resource that is allocated by the network device and that is used to carry the uplink control information.

Optionally, an end part of the "first part of the uplink control information" and a start part of the "second part of the uplink control information" are consecutive bit streams.

Optionally, a location of the first part in the uplink control information is located before the second part.

Optionally, the first TTI includes two slots, the front time-domain start point is a start point of the first slot in the first TTI, and the back time-frequency resource is a start point of the second slot in the first TTI.

According to the method for transmitting uplink control information in this embodiment of this application, the terminal device performs detection on a carrier in which the candidate time-frequency resource is located, and selects, based on a result of the detection, a resource after the back time-domain start point or a resource after the front time-domain start point to send an uplink channel. In this process, in a feasible manner, an encoded uplink data packet generated by the terminal device matches the resource after the front time-domain start point. When the result of the detection is that the resource after the front time-domain start point is available, the terminal device sends the uplink data packet and the uplink control information starting from the resource after the front time-domain start point. When the result of the detection is that the resource after the back time-domain start point is available, the terminal device sends the uplink data packet and the uplink control information starting front the resource after the back time-domain start point. It should be noted that, to reduce a communication latency, the terminal device assembles in advance a data packet and uplink control information that need to be mapped to the resource after the front time-domain start point and the resource after the back time-domain start point. Therefore, when the result of the detection is that the resource after the back time-domain start point is available (or the resources after the front time-domain start point and the back time-domain start point are unavailable), limited by a capability, the terminal device cannot regenerate another encoded uplink data packet and another encoded uplink control information that match the resource after the back time-domain start point. Therefore, the terminal device discards a part (to be specific, the uplink data packet and the uplink control information that need to be mapped to the resource after the front time-domain start point) that cannot match the resource after the back time-domain start point and that is of the uplink data packet or the uplink control information generated in advance. In addition, usually the uplink control information is transmitted only once. Therefore, when the result of the detection is that the resource after the back time-domain start point is available, based on the foregoing implementation, transmission performance of the uplink control information cannot be ensured.

In contrast, the terminal device is enabled to preferably send uplink control information on the resource after the back time-domain start point. Regardless of whether the terminal device determines, based on a result of channel detection, that a candidate time-frequency resource that can be used for sending an uplink channel is the resource after the front time-domain start point or the resource after the back time-domain start point, uplink control information carried on the uplink channel can be sent, thereby ensuring performance of the uplink control information.

Optionally, the first TTI includes a front time-domain start point and a back time-domain start point, where the front time-domain start point is before the back time-domain start point in time domain; and the receiving, by the network device, the first uplink channel from the terminal device starting from a first time-domain start point by using the second frequency-domain resource includes:

when the second frequency-domain resource is in a state that can be used by the terminal device after both the front time-domain start point and the back time-domain start point, receiving, by the network device, a first part of the uplink data packet on the second frequency-domain resource after the back time-domain start point, and receiving a second part of the uplink data packet on the second frequency-domain resource after the front time-domain start point, where a location of the first data in the uplink data packet is before the second data.

Optionally, the "first part of the encoded uplink data packet" may be data including consecutive bit streams that are output first in the encoded uplink data packet, and the "second part of the encoded uplink data packet" may be data including consecutive bit streams that are output later in the encoded uplink data packet.

Optionally, an end part of the "first part of the encoded uplink data packet" and a start part of the "second part of the encoded uplink data packet" are consecutive bit streams.

Optionally, a size of the "first part of the encoded uplink data packet" may be the same as a size of a maximum resource, on the second time-frequency resource, that can be used to transmit the encoded uplink data packet.

Optionally, a size of the "second part of the encoded uplink data packet" may be a size of a remaining part obtained after the size of the first part is subtracted from a size of a resource that is allocated by the network device and that is used to carry the encoded uplink data packet.

Optionally, the "first part of the encoded uplink data packet" is a system bit obtained by encoding the uplink data packet.

Generally, some front bits of the uplink data packet carry relatively important information (for example, system bits). Because a possibility that the terminal device obtains the resource after the back time-domain start point through contention is greater than a possibility that the terminal device obtains the resource after the front time-domain start point through contention, sending front first data of the uplink data packet on the resource after the back time-domain start point can improve transmission reliability of the relatively important information and improve communication performance.

According to a seventh aspect, a method for transmitting uplink control information is provided, and is applied to a communications system including a network device and a terminal device. A time-frequency resource used by the communications system is a time-frequency resource used based on a contention mechanism, and each of a plurality of transmission time intervals TTIs used by the communications system includes at least two time-domain start points. The method includes: receiving, by the terminal device, scheduling information from the network device, where the scheduling information is used to indicate a time-frequency resource that is allocated by the network device to the terminal device and that is used to carry at least one uplink channel, and one first uplink channel of the at least one uplink channel is carried on a candidate time-frequency resource, where the first uplink channel includes at least uplink control information, the candidate time-frequency resource is corresponding to a first TTI in time domain, the candidate time-frequency resource includes at least two time-frequency resources, and the at least two time-frequency resources are one-to-one corresponding to at least two time-domain start points included in the first TTI; detecting, by the terminal device, the candidate time-frequency resource, and determining, based on a result of the detection, a target time-frequency resource from the at least two time-frequency resources included in the candidate time-frequency resource, where the target time-frequency resource is a time-frequency resource that can be used by the terminal device; and sending, by the terminal device, the first uplink channel by using the target time-frequency resource.

According to the method for transmitting uplink control information in this embodiment of this application, a plurality of time-domain start points are set in a TTI used based on the contention mechanism. In addition, before uplink transmission needs to be performed, the terminal device performs detection on the candidate time-frequency resource indicated by the network device, so that the terminal device can determine, from at least two time-frequency resources that are different at start points and that are included in the candidate time-frequency resource, the target time-frequency resource that can be used by the terminal device, and transmit an uplink channel by using the target time-frequency resource. That is, in comparison with the prior art, the terminal device can use the candidate time-frequency resource to perform wireless communication with no need to determine that a time-domain start point of the candidate time-frequency resource is located at a start point of a subframe. Therefore, this improves a probability that the terminal device can use the candidate time-frequency resource to perform wireless communication, thereby improving communication efficiency, reducing a service transmission latency, and improving user experience.

Optionally, the at least two time-frequency resources included in the candidate time-frequency resource have a nested structure in time domain.

Optionally, the sending, by the terminal device, the first uplink channel by using the target time-frequency resource includes: determining, by the terminal device, a third time-frequency resource from the target time-frequency resource based on reference information; and sending, by the terminal device, the uplink control information by using the third time-frequency resource. The reference information is used to indicate at least one of the following values: a size value of the candidate time-frequency resource, a size value of a preset time-frequency resource in the at least two time-frequency resources included in the candidate time-frequency resource, a size value of the target time-frequency resource, and a first reference value. In addition, the first reference value is specified by the communications system, or the first reference value is pre-indicated by the network device; and the preset time-frequency resource is specified by the communications system, or the preset time-frequency resource is pre-indicated by the network device.

A size of a time-frequency resource, used to carry uplink control information, in the target time-frequency resource is determined based on a size of the target time-frequency resource (or a time-frequency resource, used to carry uplink data, in the target time-frequency resource). Therefore, when the target time-frequency resource is a part of the candidate time-frequency resource, in the prior art, the size of the time-frequency resource, used to carry uplink control information, in the target time-frequency resource is less than a size of a time-frequency resource, used to carry uplink control information, in the candidate resource. In contrast, according to the method for transmitting uplink control information in this embodiment of this application, a size of the third time-frequency resource, used to carry uplink control information, in the target time-frequency resource is determined based on a size of the candidate time-frequency resource, that is, a difference between the size of the target time-frequency resource and a size of a time-frequency resource, used to carry uplink control information, in the candidate time-frequency resource falls within a preset range. That is, in comparison with the prior art, increasing the size of the time-frequency resource used to carry uplink control information in this embodiment of this application can ensure transmission reliability of the uplink control information.

Optionally, the determining, by the terminal device, a third time-frequency resource from the target time-frequency resource based on reference information includes: determining, by the terminal device, the third time-frequency resource from the target time-frequency resource based on the reference information and a first coefficient, where the first coefficient is used to determine a size of a time-frequency resource that carries uplink control information.

Optionally, the method further includes: obtaining, by the terminal device, first mapping relationship information, where the first mapping relationship information is used to indicate a mapping relationship between a plurality of values including a value indicated by the reference information and a plurality of coefficients including the first coefficient; and using, by the terminal device based on the first mapping relationship information, a coefficient corresponding to the value indicated by the reference information as the first coefficient.

Optionally, the determining, by the terminal device, a third time-frequency resource from the second time-frequency resource based on reference information includes: determining, by the terminal device, the third time-frequency resource from the second time-frequency resource based on the reference information and a preset first upper limit value, where a size of the third time-frequency resource is less than or equal to the first upper limit value.

Optionally, the method further includes: obtaining, by the terminal device, second mapping relationship information, where the second mapping relationship information is used to indicate a mapping relationship between a plurality of values including a value indicated by the reference information and a plurality of upper limit values including the first upper limit value; and using, by the terminal device based on the second mapping relationship information, an upper limit value corresponding to the value indicated by the reference information as the first upper limit value.

Optionally, a frequency-domain resource used by the communications system is divided into N subbands, $N \geq 2$, the candidate time-frequency resource occupies M subbands in the N subbands, $M \geq 2$, the target time-frequency resource occupies K subbands in the M subbands in frequency domain, and $M > K \geq 1$.

Optionally, the uplink control information includes at least one of hybrid automatic repeat request HARQ feedback information, downlink channel quality indicator information CQI, rank indication information RI, and precoding matrix indicator information PMI.

Optionally, the first TTI includes two time-domain start points, and the candidate time-frequency resource includes a first time-frequency resource corresponding to the first time-domain start point in the two time-domain start points, and a second time-frequency resource corresponding to the second time-domain start point in the two time-domain start points.

Optionally, the sending, by the terminal device, the first uplink channel by using t target time-frequency resource includes:

mapping, by the terminal device, the uplink control information starting from the second time-frequency resource.

Optionally, the mapping, by the terminal device, the uplink control information starting from the second time-frequency resource includes:

if the second time-frequency resource can meet a transmission requirement of the uplink control information, mapping, by the terminal device, the uplink control information only on the second time-frequency resource; or if the second time-frequency resource cannot meet a transmission requirement of the uplink control information, mapping, by the terminal device, a first part of the uplink control information to the second time-frequency resource, and mapping a second part of the uplink control information on the first time-frequency resource; or if the second time-frequency resource cannot meet a transmission requirement of the uplink control information, mapping, by the terminal device, a first part of the uplink control information to the second time-frequency resource, and discarding a second part of the uplink control information; or prohibiting the terminal device from mapping the uplink control information on the first time-frequency resource.

"The second time-frequency resource is in an available state" may mean that it is determined that a carrier in which the candidate time-frequency resource is located is in a sendable state after the second time-domain start point.

Optionally, the "first part of the uplink control information" may be data including consecutive bit streams that are output first after the uplink control information is encoded, and the "second part of the uplink control information" may be data including consecutive bit streams that are output later after the uplink control information is encoded.

Optionally, a size of the "first part of the uplink control information" may be the same as a size of a maximum resource, on the second time-frequency resource, that can be used to transmit the uplink control information.

Optionally, a size of the "second part of the uplink control information" may be a size of a remaining part obtained after the size of the first part is subtracted from a size of the fourth time-frequency resource that is allocated by the network device and that is used to carry the uplink control information.

Optionally, an end part of the "first part of the uplink control information" and a start part of the "second part of the uplink control information" are consecutive bit streams.

Optionally, a location of the first part in the uplink control information is located before the second part.

Optionally, the first TTI includes two slots, the first time-domain start point is a start point of the first slot in the first TTI, and the second time-domain start point is a start point of the second slot in the first TTI.

According to the method for transmitting uplink control information in this embodiment of this application, the terminal device performs detection on the carrier in which the candidate time-frequency resource is located, and selects, based on a result of the detection, the first time-frequency resource or the second time-frequency resource to send an uplink channel. In this process, in a feasible manner, an encoded uplink data packet generated by the terminal device matches the first time-frequency resource. When the result of the detection is that the first time-frequency resource is available, the terminal device sends the uplink data packet and the uplink control information starting from the first time-frequency resource. When the result of the detection is that the second time-frequency resource is available, the terminal device sends the uplink data packet and the uplink control information starting from the second time-frequency resource. It should be noted that, to reduce a communication latency, the terminal device assembles in advance a data packet and uplink control information that need to be mapped to the first time-frequency resource and the second time-frequency resource. Therefore, when the result of the detection is that the second time-frequency resource is available (or the first time-frequency resource is unavailable), limited by a capability, the terminal device cannot regenerate another encoded uplink data packet and another encoded uplink control information that match the second time-frequency resource. Therefore, the terminal device discards a part (to be specific, the uplink data packet and the uplink control information that need to be mapped to the first time-frequency resource) that cannot match the second time-frequency resource and that is of the uplink data packet or the uplink control information that is generated in advance. That is, the terminal device punctures the uplink data packet to match the second time-frequency resource, and transmits, on the second time-frequency resource, the uplink data packet obtained through puncturing. In addition, usually the uplink control information is transmitted only once. Therefore, when the result of the detection is that the second time-frequency resource is available, based on the foregoing implementation, transmission performance of the uplink control information cannot be ensured.

In contrast, the terminal device is enabled to preferably send the uplink control information on the second time-frequency resource. Regardless of whether the terminal device determines, based on the result of channel detection, that the candidate time-frequency resource that can be used for sending an uplink channel is the first time-frequency resource or the second time-frequency resource, uplink control information carried on the uplink channel can be sent, thereby ensuring performance of the uplink control information.

That is, in this embodiment of this application, because the first time-frequency resource and the second time-frequency resource belong to a same TTI, when the first time-frequency resource is available, usually the second time-frequency resource is also available. However, when the second time-frequency resource is available, the first time-frequency resource is not necessarily available. Therefore, a possibility that the terminal device obtains the second time-frequency resource through contention is greater than a possibility that the terminal device obtains the first time-frequency resource through contention. In the foregoing implementation, that is, the uplink control information is preferably mapped on the second time-frequency resource, thereby improving transmission reliability of the uplink control information.

Optionally, the sending, by the terminal device, the first uplink channel by using the target time-frequency resource includes:

when both the first time-frequency resource and the second time-frequency resource are in an available state, sending (or mapping), by the terminal device, a first part of the uplink data packet on the second time-frequency resource, and sending (or mapping) a second part of the uplink data packet on the first time-frequency resource.

Optionally, the "first part of the encoded uplink data packet" may be data including consecutive bit streams that are output first in the encoded uplink data packet, and the "second part of the encoded uplink data packet" may be data including consecutive bit streams that are output later in the encoded uplink data packet.

Optionally, an end part of the "first part of the encoded uplink data packet" and a start part of the "second part of the encoded uplink data packet" are consecutive bit streams.

Optionally, a size of the "first part of the encoded uplink data packet" may be the same as a size of a maximum resource, on the second time-frequency resource, that can be used to transmit the encoded uplink data packet.

Optionally, a size of the "second part of the encoded uplink data packet" may be a size of a remaining part obtained after the size of the first part is subtracted from a size of a resource that is allocated by the network device and that is used to carry the encoded uplink data packet.

Optionally, the "first part of the encoded uplink data packet" is a system bit obtained by encoding the uplink data packet.

Generally, some front bits of the uplink data packet carry relatively important information (for example, system bits). Because a possibility that the terminal device obtains the second time-frequency resource through contention is greater than a possibility that the terminal device obtains the first time-frequency resource through contention, sending front first data of the uplink data packet on the second time-frequency resource can improve transmission reliability of the relatively important information and improve communication performance.

According to an eighth aspect, a method for transmitting uplink control information is provided, and is applied to a communications system including a network device and a terminal device. A time-frequency resource used by the communications system is a time-frequency resource used based on a contention mechanism, and each of a plurality of transmission time intervals TTIs used by the communications system includes at least two time-domain start points. The method includes: sending, by the network device, scheduling information to the terminal device, where the scheduling information is used to indicate a time-frequency resource that is allocated by the network device to the terminal device and that is used to carry at least one uplink channel, and one first uplink channel of the at least one uplink channel is carried on a candidate time-frequency resource, where the first uplink channel includes at least uplink control information, the candidate time-frequency resource is corresponding to a first TTI in time domain, the candidate time-frequency resource includes at least two time-frequency resources, and the at least two time-frequency resources are one-to-one corresponding to at least two time-domain start points included in the first TTI; and receiving, by the network device, the first uplink channel by using a target time-frequency resource, where the target time-frequency resource is determined, from the at least two time-frequency resources included in the candidate time-frequency resource, by the terminal device after the terminal device performs detection on the candidate time-frequency resource, and the target time-frequency resource is a time-frequency resource that can be used by the terminal device.

According to the method for transmitting uplink control information in this embodiment of this application, a plurality of time-domain start points are set in a TTI used based on the contention mechanism. In addition, before uplink transmission needs to be performed, the terminal device performs detection on the candidate time-frequency resource indicated by the network device, so that the terminal device can determine, from at least two time-frequency resources that are different at start points and that are included in the candidate time-frequency resource, the target time-frequency resource that can be used by the terminal device, and transmit an uplink channel by using the target time-frequency resource. That is, in comparison with the prior art, the terminal device can use the candidate time-frequency resource to perform wireless communication with no need to determine that a time-domain start point of the candidate time-frequency resource is located at a start point of a subframe. Therefore, this improves a probability that the terminal device can use the candidate time-frequency resource to perform wireless communication, thereby improving communication efficiency, reducing a service transmission latency, and improving user experience.

Optionally, the at least two time-frequency resources included in the candidate time-frequency resource have a nested structure in time domain.

Optionally, the receiving, by the network device, the first uplink channel by using a target time-frequency resource includes: determining, by the network device, a third time-frequency resource from the target time-frequency resource based on reference information; and receiving, by the network device, the uplink control information by using the third time-frequency resource. The reference information is used to indicate at least one of the following values: a size value of the candidate time-frequency resource, a size value of a preset time-frequency resource in the at least two time-frequency resources included in the candidate time-frequency resource, a size value of the target time-frequency resource, and a first reference value. In addition, the first reference value is specified by the communications system, or the first reference value is pre-indicated by the network device; and the preset time-frequency resource is specified by the communications system, or the preset time-frequency resource is pre-indicated by the network device.

A size of a time-frequency resource, used to carry uplink control information, in the target time-frequency resource is determined based on a size of the target time-frequency resource (or a time-frequency resource, used to carry uplink data, in the target time-frequency resource). Therefore, when the target time-frequency resource is a part of the candidate time-frequency resource, in the prior art, the size of the time-frequency resource, used to carry uplink control information, in the target time-frequency resource is less than a size of a time-frequency resource, used to carry uplink control information, in the candidate resource. In contrast, according to the method for transmitting uplink control information in this embodiment of this application, a size of the third time-frequency resource, used to carry uplink control information, in the target time-frequency resource is determined based on a size of the candidate time-frequency resource, that is, a difference between the size of the target time-frequency resource and a size of a time-frequency resource, used to carry uplink control information, in the candidate time-frequency resource falls within a preset range. That is, in comparison with the prior art, increasing the size of the time-frequency resource used to carry uplink control information in this embodiment of this application can ensure transmission reliability of the uplink control information.

Optionally, the determining, by the network device, a third time-frequency resource from the target time-frequency resource based on reference information includes: determining, by the network device, the third time-frequency resource from the target time-frequency resource based on the reference information and a first coefficient, where the first coefficient is used to determine a size of a time-frequency resource that carries uplink control information.

Optionally, the method further includes: obtaining, by the network device, first mapping relationship information, where the first mapping relationship information is used to indicate a mapping relationship between a plurality of values including a value indicated by the reference information and a plurality of coefficients including the first coefficient; and using, by the network device based on the first mapping relationship information, a coefficient corresponding to the value indicated by the reference information as the first coefficient.

Optionally, the determining, by the network device, a third time-frequency resource from the second time-frequency resource based on reference information includes: determining, by the network device, the third time-frequency resource from the second time-frequency resource based on the reference information and a preset first upper limit value, where a size of the third time-frequency resource is less than or equal to the first upper limit value.

Optionally, the method further includes: obtaining, by the network device, second mapping relationship information, where the second mapping relationship information is used to indicate a mapping relationship between a plurality of values including a value indicated by the reference information and a plurality of upper limit values including the first upper limit value; and using, by the network device based on the second mapping relationship information, an upper limit value corresponding to the value indicated by the reference information as the first upper limit value.

Optionally, a frequency-domain resource used by the communications system is divided into N subbands, N≥2, the candidate time-frequency resource occupies M subbands in the N subbands, M≥2, the target time-frequency resource occupies K subbands in the M subbands in frequency domain, and M>K≥1.

Optionally, the uplink control information includes at least one of hybrid automatic repeat request HARQ feedback information, downlink channel quality indicator information CQI, rank indication information RI, and preceding matrix indicator information PMI.

Optionally, the first TTI includes two time-domain start points, and the candidate time-frequency resource includes a first time-frequency resource corresponding to the first time-domain start point in the two time-domain start points, and a second time-frequency resource corresponding to the second time-domain start point in the two time-domain start points.

Optionally, the receiving, by the network device, the first uplink channel by using a target time-frequency resource includes:

obtaining, by the network device, the uplink control information starting from the second time-frequency resource.

Optionally, the obtaining, by the network device, the uplink control information starting from the second time-frequency resource includes:

when the second time-frequency resource is in an available state, if the second time-frequency resource can meet a transmission requirement of the uplink control information, receiving, by the network device, the uplink control information only on the second time-frequency resource; or when the second time-frequency resource is in an available state, if the second time-frequency resource cannot meet a transmission requirement of the uplink control information, receiving (or mapping), by the network device, a first part of the uplink control information on the second time-frequency resource, and receiving a second part of the uplink control information on the first time-frequency resource; or when the second time-frequency resource is in an available state, if the second time-frequency resource cannot meet a transmission requirement of the uplink control information, receiving, by the network device, a first part of the uplink control information on the second time-frequency resource; or prohibiting the network device from receiving the uplink control information on the first time-frequency resource.

"The second time-frequency resource is in an available state" may mean that it is determined that a carrier in which the candidate time-frequency resource is located is in a sendable state after the second time-domain start point.

The "first part, of the uplink control information" may be data including consecutive bit streams that are output first after the uplink control information is encoded, and the "second part of the uplink control information" may be data including consecutive bit streams that are output later after the uplink control information is encoded.

Optionally, a size of the "first part of the uplink control information" may be the same as a size of a maximum resource, on the second time-frequency resource, that can be used to transmit the uplink control information.

Optionally, a size of the "second part of the uplink control information" may be a size of a remaining part obtained after the size of the first part is subtracted from a size of the fourth time-frequency resource that is allocated by the network device and that is used to carry the uplink control information.

Optionally, an end part of the "first part of the uplink control information" and a start part of the "second part of the uplink control information" are consecutive bit streams.

Optionally, a location of the first part in the uplink control information is located before the second part.

Optionally, the first TTI includes two slots, the first time-domain start point is a start point of the first slot in the first TTI, and the second time-domain start point is a start point of the second slot in the first TTI.

According to the method for transmitting uplink control information in this embodiment of this application, the terminal device performs detection on the carrier in which the candidate time-frequency resource is located, and selects, based on a result of the detection, the first time-frequency resource or the second time-frequency resource to send an uplink channel. In this process, in a feasible manner, an encoded uplink data packet generated by the terminal device matches the first time-frequency resource. When the result of the detection is that the first time-frequency resource is available, the terminal device sends the uplink data packet and the uplink control information starting from the first time-frequency resource. When the result of the detection is that the second time-frequency resource is available, the terminal device sends the uplink data packet and the uplink control information starting from the second time-frequency resource. It should be noted that, to reduce a communication latency, the terminal device assembles in advance a data packet and uplink control information that need to be mapped to the first time-frequency resource and the second time-frequency resource. Therefore, when the result of the detection is that the second time-frequency resource is available (or the first time-frequency resource is unavailable), limited by a capability, the terminal device cannot regenerate another encoded uplink data packet and another encoded uplink control information that match the second time-frequency resource. Therefore, the terminal device discards a part (to be specific, the uplink data packet and the uplink control information that need to be mapped to the first time-frequency resource) that cannot match the second time-frequency resource and that is of the uplink data packet or the uplink control information that is generated in advance. That is, the terminal device punctures the uplink data packet to match the second time-frequency resource, and transmits, on the second time-frequency resource, the uplink data packet obtained through puncturing. In addition, usually the uplink control information is transmitted only once. Therefore, when the result of the detection is that the second time-frequency resource is available, based on the foregoing implementation, transmission performance of the uplink control information cannot be ensured.

In contrast, the terminal device is enabled to preferably send the uplink control information on the second time-frequency resource. Regardless of whether the terminal device determines, based on the result of channel detection, that the candidate time-frequency resource that can be used for sending an uplink channel is the first time-frequency resource or the second time-frequency resource, uplink control information carried on the uplink channel can be sent, thereby ensuring performance of the uplink control information.

That is, in this embodiment of this application, because the first time-frequency resource and the second time-frequency resource belong to a same TTI, when the first time-frequency resource is available, usually the second time-frequency resource is also available. However, when the second time-frequency resource is available, the first time-frequency resource is not necessarily available. Therefore, a possibility that the terminal device obtains the second time-frequency resource through contention is greater than a possibility that the terminal device obtains the first time-frequency resource through contention. In the foregoing implementation, that is, the uplink control information is preferably mapped on the second time-frequency resource, thereby improving transmission reliability of the uplink control information.

Optionally, the receiving, by the network device, the first uplink channel by using a target time-frequency resource includes:

when both the first time-frequency resource and the second time-frequency resource are in an available state, receiving, by the network device, a first part of the uplink data packet on the second time-frequency resource, and receiving a second part of the uplink data packet on the first time-frequency resource.

Optionally, the "first part of the encoded uplink data packet" may be data including consecutive bit streams that are output first in the encoded uplink data packet, and the "second part of the encoded uplink data packet" may be data including consecutive bit streams that are output later in the encoded uplink data packet.

Optionally, an end part of the "first part of the encoded uplink data packet" and a start part of the "second part of the encoded uplink data packet" are consecutive bit streams.

Optionally, a size of the "first part of the encoded uplink data packet" may be the same as a size of a maximum resource, on the second time-frequency resource, that can be used to transmit the encoded uplink data packet.

Optionally, a size of the "second part of the encoded uplink data packet" may be a size of a remaining part obtained after the size of the first part is subtracted from a size of a resource that is allocated by the network device and that is used to carry the encoded uplink data packet.

Optionally, the "first part of the encoded uplink data packet" is a system bit obtained by encoding the uplink data packet.

Generally, some front bits of the uplink data packet carry relatively important information (for example, system bits). Because a possibility that the terminal device obtains the second time-frequency resource through contention is greater than a possibility that the terminal device obtains the first time-frequency resource through contention, sending front first data of the uplink data packet on the second time-frequency resource can improve transmission reliability of the relatively important information and improve communication performance.

According to a ninth aspect, an apparatus for transmitting uplink control information is provided and includes units configured to perform the steps in the implementations of any one of the first aspect to the eighth aspect.

According to a tenth aspect, a device for transmitting uplink control information is provided and includes a memory and a processor. The memory is configured to store a computer program, and the processor is configured to invoke the computer program from the memory and run the computer program, so that the device performs the method in the implementations of any one of the first aspect to the eighth aspect.

According to an eleventh aspect, a computer program product is provided, and the computer program product includes computer program code. When the computer program code is run by a communications unit and a processing unit, or a transceiver and a processor of a communications device (such as a network device or a terminal device), the communications device is enabled to perform the method in the implementations of any one of the first aspect to the eighth aspect.

According to a twelfth aspect, a computer readable storage medium is provided, and the computer readable storage medium stores a program. The program enables a communications device (such as a network device or a terminal device) to perform the method in the implementations of any one of the first aspect to the eighth aspect.

With reference to the foregoing aspects and the foregoing implementations, in another implementation, each subband includes a plurality of subcarriers.

With reference to the foregoing aspects and the foregoing implementations, in another implementation, a bandwidth of each subband is determined based on a bandwidth that can be detected by the network device or the terminal device in one detection (or contention) process.

With reference to the foregoing aspects and the foregoing implementations, in another implementation, the bandwidth of each subband is less than or equal to a bandwidth that can be detected by the network device or the terminal device in one detection (or contention) process.

With reference to the foregoing aspects and the foregoing implementations, in another implementation, the bandwidth of each subband is 20 MHz.

According to the method for transmitting uplink control information in the embodiments of this application, the terminal device can contend for a plurality of time-frequency resources scheduled by the network device, and the terminal device transmits the uplink channel by using a time-frequency resource obtained through contention. That is, in comparison with the prior art, the terminal device can use the first frequency-domain resource to perform wireless communication with no need to successfully contend for all time-frequency resources allocated by the network device, thereby improving communication efficiency, reducing a service transmission latency, and improving user experience.

DESCRIPTION OF EMBODIMENTS

Figure 1:
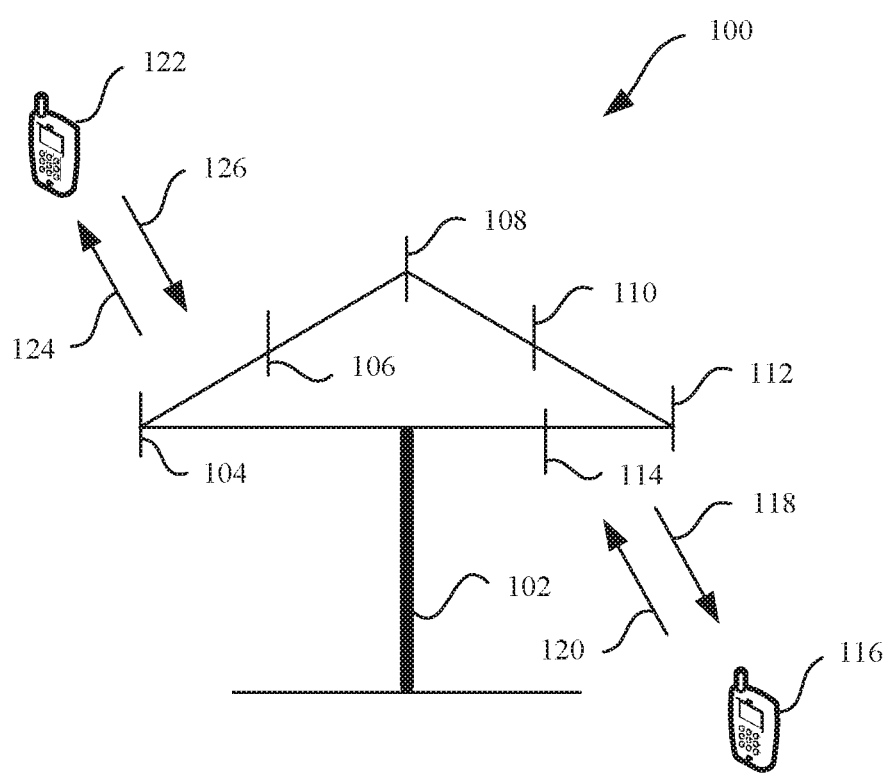
FIG. 1 is a schematic diagram of an example of a communications system that is applicable to a method and an apparatus for transmitting uplink control information according to an embodiment of this application.

The following describes technical solutions of this application with reference to accompanying drawings.

Terms such as "component", "module", and "system" used in this specification are used to indicate computer-related entities, hardware, firmware, combinations of hardware and software, software, or software being executed. For example, a component may be, but not limited to, a process that runs on a processor, a processor, an object, an executable tile, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that the embodiments of this application may be applied to various communications systems, such as a global system for mobile communications (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, a long term evolution advanced (Advanced long term evolution, LTE-A) system, a universal mobile telecommunications system (Universal Mobile Telecommunication System, UMTS), a wireless local area network (Wireless Local Area Networks, WLAN), wireless fidelity (Wireless Fidelity, Wi-Fi), or a next-generation communications system.

Usually, a quantity of connections supported by a conventional communications system is limited and is also easy to implement. However, with development of communications technologies, a mobile communications system not only supports conventional communication but also supports, for example, device to device (Device to Device, D2D) communication, machine to machine (Machine to Machine, M2M) communication, machine type communication (Machine Type Communication, MTC), and vehicle to vehicle (Vehicle to Vehicle, V2V) communication.

In the embodiments of this application, the embodiments are described with reference to a network device and a terminal device.

The terminal device may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a station (STAION, ST) in a WLAN, and may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device having a wireless communication function, a computing device, another processing device connected to a wireless modem, a vehicle-mounted device, a wearable device, or a terminal device in a next-generation communications system, for example, a terminal device in a fifth-generation (fifth-generation, 5G) network or a terminal device in a future evolved public land mobile network (Public Land Mobile Network, PLMN).

As an example rather than a limitation, in the embodiments of this application, the terminal device may be alternatively a wearable device. The wearable device may also be referred to as a wearable intelligent device, and is a generic term of wearable devices, such as glasses, gloves, watches, clothes, and shoes, developed by performing intelligent design on daily wear by using a wearable technology. The wearable device is a portable device directly worn on a body or integrated into clothes or an accessory of a user. The wearable device is more than a hardware device, and implements powerful functions through software support, data interaction, and cloud-based interaction. In a broad sense, wearable intelligent devices include a large-sized device, for example, a smartwatch or smart glasses, that provide comprehensive functions and that can implement a complete or partial function independent of a smartphone; and include a device, for example, various types of smart bands and smart jewelry for physical sign monitoring, that is intended for only a specific type of application functions and that needs to be used along with another device such as a smartphone.

In addition, the network device may be a device configured to communicate with a mobile device. The network device may be an access point (Access Point, AP) in a WLAN or a base transceiver station (Base Transceiver Station, BTS) in GSM or CDMA or may be a NodeB (NodeB, NB) in WCDMA; or may be an evolved NodeB (Evolutional NodeB, eNB or eNodeB) in LTE, or a relay node or an access point, or a vehicle mounted device, a wearable device, a network device in a future 5G network, a network device in a future evolved PLMN network, or the like.

Furthermore, in the embodiments of this application, the network device provides a service for a cell, and the terminal device communicates with the network device by using a transmission resource (for example, a frequency-domain resource, in other words, a spectrum resource) used in the cell. The cell may be a cell corresponding to the network device (for example, a base station). The cell may belong to a macro base station or may belong to a base station corresponding to a small cell (Small cell). The small cell herein may include a metro cell (Metro cell), a micro cell (Micro cell), a pico cell (Pico cell), a femto cell (Femto cell), and the like. These small cells are characterized by a small coverage area, low transmit power, and the like, and are suitable for providing a high-rate data transmission service.

In addition, in the LTE system or the 5G system, a plurality of intra-frequency cells may simultaneously work on a carrier. In some special scenarios, it may also be considered that concepts of the carrier and the cell are equivalent. For example, in a carrier aggregation (Carrier Aggregation, CA) scenario, when a secondary component carrier is configured for UE, a carrier index of the secondary component carrier and a cell identity (Cell Indentify, Cell ID) of a secondary serving cell working on the secondary component carrier are both carried. In this case, it may be considered that the concepts of the carrier and the cell are equivalent. For example, for the UE, accessing a carrier is equivalent to accessing a cell.

A method and an apparatus that are provided in the embodiments of this application may be applied to the terminal device or the network device. The terminal device or the network device includes a hardware layer, an operating system layer running above the hardware layer, and an application layer running above the operating system layer. The hardware layer includes hardware such as a central processing unit (Central Processing Unit, CPU), a memory management unit (Memory Management Unit, MMU), and a memory (also referred to as a main memory). The operating system may be any one or more types of computer operating systems that implement service processing by using a process (Process), for example, the Linux operating system, the Unix operating system, the Android operating system, the iOS operating system, or the Windows operating system. The application layer includes applications such as a browser, an address book, word processing software, and instant messaging software. In addition, the embodiments of this application do not particularly limit a specific structure of an execution body of the method provided in the embodiments of this application, provided that a program recording code of the method provided in the embodiments of this application can be run to implement communication according to the method provided in the embodiments of this application. For example, the execution body of the method provided in the embodiments of this application may be the terminal device or the network device, or may be a function module capable of invoking and executing a program in the terminal device or the network device.

In addition, aspects or features in the embodiments of this application may be implemented as a method, an apparatus, or a product that uses standardized programming and/or engineering technologies. The term "product" used in this application covers a computer program that can be accessed from any computer readable component, carrier, or medium. For example, the computer-readable medium may include but is not limited to a magnetic storage component (for example, a hard disk, a floppy disk, or a magnetic tape), an optical disc (for example, a compact disc (Compact Disc, CD), or a digital versatile disc (Digital Versatile Disc, DVD)), a smartcard, and a flash memory component (for example, an erasable programmable read-only memory (Erasable Programmable Read-Only Memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a wireless communications system according to an embodiment of this application. As shown in FIG. 1, the communications system 100 includes a network device 102. The network device 102 may include one or more antennas, for example, antennas 104, 106, 108, 110, 112, and 114. In addition, the network device 102 may additionally include a transmitter chain and a receiver chain. A person of ordinary skill in the art may understand that the transmitter chain and the receiver chain may include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it can be understood that the network device 102 may communicate with any quantity of terminal devices similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antennas 112 and 114. The antennas 112 and 114 send information to the terminal device 116 through a forward link (also referred to as a downlink) 118, and receive information from the terminal device 116 through a reverse link (also referred to as an uplink) 120. In addition, the terminal device 122 communicates with the antenna 104 and the antenna 106. The antenna 104 and the antenna 106 each send information to the terminal device 122 over a forward link 124, and receive information from the terminal device 122 over a reverse link 126.

For example, in a frequency division duplex (Frequency Division Duplex, FDD) system, for example, the forward link 118 may use a frequency band different from that used by the reverse link 120, and the forward link 124 may use a frequency band different from that used by the reverse link 126.

For another example, in a time division duplex (Time Division Duplex, TDD) system and a full duplex (Full Duplex) system, the forward link 118 and the reverse link 120 may use a same frequency band, and the forward link 124 and the reverse link 126 may use a same frequency band.

Each antenna (or an antenna group including a plurality of antennas) and/or area designed for communication are/is referred to as a sector of the network device 102. For example, the antenna group may be designed to communicate with a terminal device in a sector of coverage of the network device 102. The network device may send signals to all terminal devices in a corresponding sector by using a single antenna or multi-antenna transmit diversity. In a process of communicating with the terminal devices 116 and 122 by the network device 102 by respectively using the forward links 118 and 124, transmit antennas of the network device 102 tray use beamforming to improve signal-to-noise ratios of the forward links 118 and 124. In addition, compared with a manner in which a network device uses a single antenna or multi-antenna transmit diversity to send signals to all terminal devices served by the network device, when the network device 102 uses beamforming to send signals to the terminal devices 116 and 122 that are randomly distributed in the related coverage area, less interference is caused to a mobile device in a neighboring cell.

Within a given time, the network device 102, the terminal device 116, or the terminal device 122 may be a wireless communication sending apparatus and/or a wireless communication receiving apparatus. When sending data, the wireless communication sending apparatus may encode the data for transmission. Specifically, the wireless communication sending apparatus may obtain (for example, generate, receive from another communications apparatus, or store in a memory) a specific quantity of data bits that need to be sent to the wireless communication receiving apparatus through a channel. The data bits tray be included in a transport block (or a plurality of transport blocks) of the data, and the transport block may be segmented into a plurality of code blocks.

In addition, the communications system 100 may be a PLMIN network, a D2D network, an M2M network, or another network. FIG. 1 is merely a simplified schematic diagram of an example. The network may further include another network device that is not shown in FIG. 1.

The following describes in detail a frequency-domain resource used for wireless communication in the embodiments of this application.

In the embodiments of this application, frequency-domain resources used by a network device and a terminal device for wireless communication (for example, uplink transmission or downlink transmission) are frequency-domain resources used based on a contention mechanism.

For example, the network device and/or the terminal device may detect whether a frequency-domain resource with a specific bandwidth (for example, 20 MHz) is currently in an idle state, or whether the frequency-domain resource is used by another device.

If the frequency-domain resource is in an idle state, or the frequency-domain resource is not used by another device, the network device and/or the terminal device may use the frequency-domain resource to perform communication, for example, perform uplink transmission or downlink transmission.

If the frequency-domain resource is not in an idle state, or the frequency-domain resource is already used by another device, the network device and/or the terminal device cannot use the frequency-domain resource.

It should be noted that in the embodiments of this application, a specific method and a specific process of the contention mechanism may be similar to those in the prior art. To avoid repetition, detailed description thereof is omitted herein.

As an example rather than a limitation, in the embodiments of this application, frequency-domain resources used by the communications system 100 (or the frequency-domain resources used by the network device and the terminal device based on the contention mechanism) may alternatively be licensed spectrum resources. That is, the communications system 100 in the embodiments of this application is a communications system that can use a licensed frequency band, and each communications device (the network device and/or the terminal device) in the system 100 may use a frequency-domain resource of the licensed frequency band in a contention manner.

"A licensed frequency-domain resource" may also be referred to as "a licensed spectrum resource" or "a licensed carrier", and refers to a frequency-domain resource that can be used only after being approved by a national or local radio committee. Different systems such as an LTE system and a Wi-Fi system, or systems included in different operators cannot share a licensed frequency-domain resource.

The licensed spectrum resource may be a spectrum resource allocated by a radio regulatory commission of a government for a particular purpose, for example, a spectrum resource used by a mobile operator or a dedicated spectrum resource for civil aviation, railways, and police. Because of policy exclusivity, quality of service of the licensed spectrum resource usually can be ensured, and it is relatively easy to schedule and control the licensed spectrum resource.

Alternatively, in the embodiments of this application, the frequency-domain resources used by the communications system 100 (or the frequency-domain resources used by the network device and the terminal device based on the contention mechanism) may be license-exempt frequency-domain resources.

"The license-exempt frequency-domain resource" may also be referred to as "a license-exempt spectrum resource" or "a license-exempt carrier", and refers to a resource on a license-exempt frequency band that can be shared by all communications devices. "Sharing a resource on a license-exempt frequency band" means that for use of a particular spectrum, limitations are posed only on indicators such as transmit power and out-of-band emission, to ensure that a plurality of devices sharing the frequency band meet a basic coexistence requirement. An operator can implement network capacity offloading by using a license-exempt band resource, but needs to comply with regulatory requirements of different regions and different spectrums on the license-exempt band resource. These requirements are usually posed to protect a public system such as radar and to ensure that a plurality of systems fairly coexist and cause as little negative impact to each other as possible, and include a transmit power limit, an out-of-band emission indicator, indoor and outdoor use restrictions. In addition, some regions further have some additional coexistence policies and the like. For example, each communications device can use a frequency-domain resource through contention or listening, for example, listen before talk (Listen Before Talk, "LBT" for short).

The license-exempt spectrum resource may be a spectrum resource allocated by a related government department; however, a radio technology, an operating enterprise, and a service life are not limited, and quality of service of such a frequency band is not ensured either. A communications device can use the license-exempt spectrum resource for free, as long as requirements of indicators such as transmit power and out-of-band emission are met. The license-exempt spectrum resource is commonly used for communication.

As an example rather than a limitation, in the embodiments of this application, the license-exempt spectrum resource may include a frequency band near 5 gigahertz (Giga Hertz, GHz), a frequency band near 2.4 GHz, a frequency band near 3.5 GHz, and a frequency band near 60 GHz.

As an example rather than a limitation, for example, the communications system 100 may use a licensed-assisted access using long term evolution (Licensed-Assisted Access Using LTE, LAA-LTE) technology of the license-exempt carrier, or may use a technology that supports independent deployment of the communications system on a license-exempt frequency band, such as standalone LTE over unlicensed spectrum, or may use an (LTE Advanced in Unlicensed Spectrums, LTE-U) technology on the license-exempt carrier. In other words, for the communications system 100, the LTE system may be independently deployed on the license-exempt frequency band, to complete communication on the license-exempt frequency band by using an LTE air interface protocol. The system does not include a licensed frequency band. A technology such as centralized scheduling, interference coordination, or hybrid automatic request retransmission (Hybrid Automatic Repeat request, HARQ) may be used in the LIE system deployed on the license-exempt frequency band. Compared with an access technology such as Wi-Fi, the technology has better robustness, and can obtain higher spectral efficiency, and provide a larger coverage area and better user experience.

In addition, as an example rather than a limitation, in the embodiments of this application, the communications system 100 may use, for example, a licensed-assisted access (Licensed-Assisted Access, LAA) technology, a dual connectivity (Dual Connectivity, DC) technology, or a license-exempt assisted access (Standalone) technology. The LAA includes: using a carrier aggregation (Carrier Aggregation, CA) configuration and structure in an existing LTE system, and based on communication performed by configuring a carrier (licensed carrier) on a licensed frequency band of an operator, configuring a plurality of carriers (license-exempt carriers) on a license-exempt frequency band and performing communication by using the license-exempt carriers with help of the licensed carrier. In other words, an LTE device may use, through CA, a licensed carrier as a primary component carrier (Primary Component Carrier, PCC) or a primary serving cell (Primary Cell, PCell), and a license-exempt carrier as a secondary component carrier (Secondary Component Carrier, SCC) or a secondary serving cell (Secondary Cell, SCell). The dual connectivity DC technology includes a technology of jointly using a licensed carrier and a license-exempt carrier in a non-CA or non-ideal backhaul (backhaul) manner, or may include a technology of jointly using a plurality of license-exempt carriers in a non-CA manner. The LTE device may alternatively be directly deployed on a license-exempt carrier through independent deployment.

In addition, it should be noted that there may be no fixed frame structure for information transmission in the LTE system on the license-exempt frequency band. In summary, an access network device such as a base station or a cell may determine transmission duration of downlink information and/or transmission duration of uplink information after determining to preempt a license-exempt spectrum resource based on downlink service load and/or uplink service load, or another consideration factor. Further, after preempting the license-exempt spectrum resource, the access network device may flexibly adjust a quantity of time units including downlink information (namely, downlink time units), a quantity of time units including uplink information (namely, uplink time units), transmission duration of downlink information included in each downlink time unit, and transmission duration of uplink information included in each uplink time unit.

In addition, a concept of a transmission opportunity (Transmission Opportunity, TxOP) is introduced into a frame structure of the LTE system on the license-exempt frequency band. The transmission opportunity may also be referred to as a transmission burst (Transmission Burst), and one TxOP may include a downlink transmission burst (Downlink Transmission Burst, DL Transmission Burst) and/or an uplink transmission burst (Uplink Transmission Burst, UL Transmission Burst).

The downlink transmission burst (which may also be referred to as "downlink data transmission burst" or "downlink information transmission burst") may include information transmission (or data transmission) performed by the access network device (such as an eNB) or a cell (Cell) of the access network device by using the license-exempt band resource in a manner of no longer using the contention mechanism (such as LBT) after the license-exempt band resource is preempted. A time length of a downlink transmission burst is not greater than maximum duration of continuous transmission performed by the access network device (or the cell) on the license-exempt band resource without using the contention mechanism. The maximum duration may also be referred to as maximum channel occupancy time (MCOT, Maximum Channel Occupied Time). A length of the MCOT may be related to regional regulation constraints. For example, in Japan, the MCOT may be equal to 4 ms, and in Europe, the MCOT may be equal to 8 ms, or 10 ms, or 13 ms. Alternatively, the length of the MCOT may be related to a contention mechanism used by a listening device (for example, an access network device or a terminal device). Generally, a shorter listening time indicates a shorter MCOT. Alternatively, the length of the MCOT may be related to a transmission service level. In the embodiments of this application, the MCOT may be further determined based on another factor. This is not specifically limited.

It should be noted that, in the foregoing description, the "performing information transmission by using the license-exempt band resource with no need to use the contention mechanism" may include: After preempting the license-exempt band resource, the access network device or the cell does not need to evaluate, by using the contention mechanism within the MCOT or within a time in which information is actually sent on the license-exempt band resource, whether the license-exempt band resource is available. For example, using a downlink transmission burst included in the first TxOP as an example, starting from the second subframe in the downlink transmission burst, the base station no longer needs to evaluate, by using the contention mechanism, whether the license-exempt band resource is available. In other words, before the downlink data transmission burst, it needs to be first determined that the license-exempt spectrum resource is available. Once the downlink transmission burst starts, availability of the license-exempt spectrum resource may be no longer evaluated until the downlink data transmission burst ends.

Alternatively, the "performing information transmission by using the license-exempt band resource with no need to use the contention mechanism" may further include: After the access network device or the cell preempts the license-exempt band resource, the contention mechanism may not be used within the MCOT or within a time in which information is actually sent on the license-exempt band resource, with no need to consider coexistence with a different system. However, the contention mechanism may be used in consideration of coexistence with a same system. Herein, the contention mechanism used for coexistence of a same system may include: After the license-exempt band resource is preempted, within the MCOT or within an information sending time, a specific time unit (or referred to as an idle time unit) may be included. In this specific time unit, the base station or the cell may stop information transmission (or may stop sending information). In this specific time unit, the base station or the cell may perform channel listening to evaluate again whether the license-exempt spectrum resource is available, or may continue to send information within the MCOT or within an information sending time in the specific time unit without performing channel listening. For example, the access network device may suspend information sending at any time for a time period within a time range from the start to the end of the downlink transmission burst. Herein, for an LTE system, a non-LTE system may be considered as a different system, such as a WLAN system or a system using a Wi-Fi technology; an LTE system may be considered as a same system, and both an LTE system belonging to a same operator and an LTE system belonging to a different operator may be considered as same systems. Herein, the LTE system includes a network device and/or a terminal device.

Similarly, an uplink transmission burst (which may also be referred to as "uplink data transmission burst" or "uplink information transmission burst") may include information transmission performed by the terminal device by using a license-exempt band resource in a manner of no longer using the contention mechanism (for example, LBT) after the terminal device preempts the license-exempt band resource. A time length of an uplink transmission burst of a single terminal device may be not greater than an MCOT on the license-exempt band resource, or there may be another limitation on the time length of the uplink transmission burst. The uplink transmission burst may include information transmission of a single user, or may include information transmission of a plurality of users. On the access network device side, the uplink transmission burst may be uplink information transmission included in the TxOP.

In addition, an understanding of the "performing information transmission by using the license-exempt band resource with no need to use the contention mechanism" on the terminal device side is the same as that on the access network device side, and details are not described herein again.

For the terminal device, a same system may further be understood as a terminal device that has a same serving cell or a same serving access network device as the terminal device. The uplink transmission burst further includes information transmission performed, based on a specific time latency (for example, based on a time latency of 4 ms), by the terminal device from the first uplink subframe that can be scheduled to the last uplink subframe that can be scheduled. The information transmission is performed within a time range in which the access network device does not need to perform information transmission by using a license-exempt band by using the contention mechanism after the access network device preempts the license-exempt band resource. For example, a time range from the first uplink subframe to the last uplink subframe is a time range corresponding to the uplink transmission burst. In the embodiments of this application, a time length in which an uplink subframe that can be scheduled is used for uplink information transmission may be less than 1 ms.

In the embodiments of this application, a time length of a TxOP may be not greater than a maximum transmission time length allowed for a downlink transmission burst, or not greater than a maximum transmission time length allowed for an uplink transmission burst, or not greater than a sum of a maximum transmission time length allowed for a downlink transmission burst and a maximum time length allowed for an uplink transmission burst, or a time length of a transmission burst may be not greater than an MCOT on the license-exempt band resource. For example, for a given device regardless of an access network device, a terminal device, or another device, after a license-exempt band resource is preempted, a maximum time length that can be used for transmission without using the contention mechanism is 8 ms (corresponding to the MCOT mentioned above), that is, a maximum transmission time length of a TxOP (or a Transmission Burst) is 8 ms even if the TxOP includes both a DL transmission burst and a UL transmission burst. Therefore, the uplink transmission burst may use some contention mechanisms that make the terminal device easily preempt (or successfully contend for) the license-exempt band resource.

As described above, the information transmission of the LTE system on the license-exempt band has no fixed frame structure, and may include at least one of the following: Duration of different downlink transmission bursts may be different, duration of different uplink transmission bursts may be different, duration of downlink transmission bursts included in different TxOPs (may be adjacent or not) may be different, duration of uplink transmission bursts included in different TxOPs may be different, and duration of different TxOPs may be different. In the embodiments of this application, the duration of the downlink transmission burst includes a time length from a start moment of the downlink burst to an end moment of the downlink burst. The duration of the uplink transmission burst includes a time length from a start moment of the uplink burst to an end moment of the uplink burst.

In the following, for ease of understanding and description, a transmission burst is referred to as "a burst", an uplink transmission burst is referred to as "an uplink burst", and a downlink transmission burst is referred to as "a downlink burst".

In the embodiments of this application, one transmission burst (uplink transmission burst or downlink transmission burst) may include one or more time units.

In addition, when one transmission burst includes a plurality of time units, the plurality of time units in the transmission burst may be consecutive or inconsecutive (for example, there is a time interval between some adjacent time units). This is not particularly limited in this application.

Optionally, a plurality of consecutive time units included in each transmission burst each have a same time length.

That is, in the embodiments of this application, each time unit in a transmission burst may be a complete time unit. The complete time unit means that a time length used for downlink information transmission or uplink information transmission in the time unit is equal to a time length of the time unit.

For example, each time unit in a downlink transmission burst may be a complete time unit, that is, each time unit in a downlink transmission burst has a same time length for downlink information transmission. For another example, each time unit in an uplink transmission burst is a complete time unit, that is, each time unit in an uplink transmission burst has a same time length for uplink information transmission.

Alternatively, optionally, at least two of a plurality of consecutive time units included in each transmission burst have different time lengths.

That is, in the embodiments of this application, some time units in a transmission burst may be incomplete time units.

For example, the first time unit in a downlink transmission burst may be an incomplete time unit. It may be understood that a time length used for downlink information transmission in the first time unit may be less than a length of the first time unit. For example, if the time unit is represented by using a subframe, a time used for downlink information transmission in the first subframe in a downlink transmission burst may be less than 1 ms. Alternatively, the last time unit in a downlink transmission burst may be an incomplete time unit. It may be understood that a time length used for downlink information transmission in the last time unit may be less than a length of the last time unit. For example, if the time unit is represented by using a subframe, a time used for downlink information transmission in the last subframe in a downlink transmission burst may be less than 1 ms. Alternatively, both the first time unit and the last time unit in a downlink transmission burst are incomplete time units.

For another example, the first time unit in an uplink transmission burst may be an incomplete time unit. It may be understood that a time length used for uplink information transmission in the first time unit may be less than a length of the first time unit. For example, if the time unit is represented by using a subframe, a time used for uplink information transmission in the first subframe in an uplink transmission burst may be less than 1 ms. Alternatively, the last time unit in an uplink transmission burst may be an incomplete time unit. It may be understood that a time length used for uplink information transmission in the last time unit may be less than a length of the last time unit. For example, if the time unit is represented by using a subframe, a time used for uplink information transmission in the last subframe in an uplink transmission burst may be less than 1 ms. Alternatively, both the first time unit and the last time unit in an uplink transmission burst are incomplete time units.

In addition, in the embodiments of this application, adjacent transmission bursts may be separated from each other by a time interval. For example, because an access network device may need to evaluate again whether a license-exempt spectrum resource is available after a downlink burst ends, there may be one or more time units between adjacent transmission bursts.

In the embodiments of this application, a time unit in a transmission burst may be used to transmit data of one terminal device, or may be used to transmit data of a plurality of terminal devices. This is not particularly limited in this application. For example, a plurality of terminal devices served by a same access network device may receive, by using a time unit in a transmission burst in a manner such as frequency division multiplexing, time division multiplexing, or space division multiplexing, data sent by the access network device. For another example, a plurality of terminal devices served by a same access network device may send data to the access network device by using a time unit in a transmission burst in a manner such as frequency division multiplexing, time division multiplexing, or space division multiplexing.

In the embodiments of this application, each transmission burst may be pre-divided (or statically or semi-statically configured), that is, each transmission burst is divided and notified to each access network device by a high-level management device of the communications system. Alternatively, a division manner of each transmission burst may be specified in a communication protocol, or a division manner of each transmission burst is pre-stored in each access network device in a factory setting or an administrator setting manner. For example, for a same license-exempt spectrum resource, each access network device may use the license-exempt spectrum resource in a time division multiplexing manner. A specific corresponding time usage range may be divided by a high-level management device. Within a time usage range obtained by division, channel evaluation is also required to use the license-exempt spectrum resource.

Alternatively, in the embodiments of this application, each transmission burst may be independently determined by each access network device (or dynamically changed), that is, each access network device may determine an available time unit in a contention manner, and use one or more time units obtained through contention as one or more transmission bursts. For example, the access network device may configure a plurality of time units obtained through contention in a same transmission burst.

Before performing downlink transmission, the network device needs to first determine, for example, through LBT, whether a frequency-domain resource scheduled by the network device (for example, a resource on a license-exempt band scheduled by the network device) is available. A specific location at which LBT is performed is not specifically limited in this application.

Before performing uplink transmission, the terminal device needs to first determine, for example, through LBT, whether a frequency-domain resource scheduled by the network device (for example, a resource on a license-exempt band scheduled by the network device) is available. A specific location at which LBT is performed is not specifically limited in this application.

In the embodiments of this application, time units in a transmission burst may be time units that include a same quantity of symbols.

For example, a length of each time unit in a transmission burst is one subframe.

For another example, a length of each time unit in a transmission burst is two symbols.

Alternatively, optionally, at least two of a plurality of consecutive time units included in each transmission burst have different time lengths.

In other words, in the embodiments of this application, at least two of time units in a transmission burst include different quantities of symbols.

For example, a time unit, in a transmission burst, other than the first time unit and/or the last time unit has a time length of 1 ms (namely, one subframe). In addition, a time length of the first time unit in the transmission burst may be less than 1 ms; a time length of the last time unit in the transmission burst may be less than 1 ms; or time lengths of both the first time unit and the last time unit in the transmission burst are less than 1 ms. It should be noted that the length times of the first time unit and the last time unit may be the same or different.

For another example, a time length of a time unit in a transmission burst may be a quantity of symbols that is any positive integer less than 8. For example, a transmission burst includes six time units, and the time units are corresponding to a time length of three symbols, two symbols, two symbols, two symbols, two symbols, and three symbols.

In the embodiments of this application, a time unit in a transmission burst may be used to transmit data of one terminal device, or may be used to transmit data of a plurality of terminal devices. This is not particularly limited in the embodiments of this application. For example, a plurality of terminal devices served by a same access network device may receive, by using a time unit in a transmission burst in a manner such as frequency division multiplexing, time division multiplexing, space division multiplexing, or code division multiplexing, data sent by the access network device. For another example, a plurality of terminal devices served by a same access network device may send data to the access network device by using a time unit in a transmission burst in a manner such as frequency division multiplexing, time division multiplexing, space division multiplexing, or code division multiplexing.

In the embodiments of this application, each transmission burst may be pre-divided. (or statically or semi-statically configured), that is, each transmission burst is divided and notified to each access network device by a high-level management device of the communications system. Alternatively, a division manner of each transmission burst may be specified in a communication protocol, or a division manner of each transmission burst is pre-stored in each access network device in a factory setting or an administrator setting manner. For example, for a same license-exempt spectrum resource, each access network device may use the license-exempt spectrum resource in a time division multiplexing manner. A specific corresponding time usage range may be divided by a high-level management device. Within a time usage range obtained by division, channel evaluation is also required to use the license-exempt spectrum resource.

Alternatively, in the embodiments of this application, each transmission burst may be independently determined by each access network device (or dynamically changed), that is, each access network device may determine an available time unit in a contention manner, and use one or more time units obtained through contention as one or more transmission bursts. For example, the access network device may configure a plurality of time units obtained through contention in a same transmission burst.

In addition, in some of the embodiments of this application, the network device may provide only one or more license-exempt cells (or may also be referred to as license-exempt carriers), or the network device may provide only one or more licensed cells (or may also be referred to as licensed carriers), or the network device may provide both a license-exempt cell and a licensed cell. This is not particularly limited in this application.

The following describes a data transmission mode in the embodiments of this application.

In the embodiments of this application, each communications device (for example, the network device or the terminal device) in the communications system 100 may use a resource (for example, a frequency-domain resource) for communication based on a scheduling-free transmission solution, or may use a resource (for example, a frequency-domain resource) for communication based on a scheduling mode. This is not particularly limited in the embodiments of this application. The following separately describes a scheduling mode and a scheduling-free mode.

A. Scheduling Mode

Specifically, in the embodiments of this application, data transmission (for example, uplink transmission or downlink transmission) may be performed based on scheduling by a network device. As an example rather than a limitation, a scheduling period may be, for example, a transmission time interval (Transmission Time Interval, TTI) or a short transmission time interval (short Transmission Time Interval, sTTI).

A specific scheduling procedure is as follows: A base station sends a control channel, for example, a physical downlink control channel (Physical Downlink Control Channel, PDCCH), an enhanced physical downlink control channel (Enhanced Physical Downlink Control Channel, EPDCCH), or a physical downlink control channel used to schedule an sTTI for transmission (sTTI Physical Downlink Control Channel, sPDCCH). The control channel may carry scheduling information that is in different downlink control information (Downlink Control Information, DCI) formats and that is used to schedule a physical downlink shared channel (Physical Downlink Shared Channel, PDSCH) or a physical uplink shared channel (Physical Uplink Shared Channel, PDSCH). The scheduling information includes control information such as resource allocation information and a modulation and coding scheme. A terminal device performs detection on the control channel, and receives a downlink data channel or sends an uplink data channel based on the scheduling information carried on the detected control channel. After the sTTI technology is introduced, the scheduling information carried on the control channel may instruct to receive a downlink data channel at a TTI with a length 1 ms or less than 1 ms or send an uplink data channel at a TTI with a length 1 ms or less than 1 ms.

B. Scheduling-Free Mode

Specifically, to support a large quantity of MTC services in a future network and implement low-latency and high-reliability service transmission, a scheduling-free transmission scheme may be used. In the embodiments of this application, data transmission may alternatively be performed in a scheduling-free mode. Scheduling-free transmission may be expressed as grant free in English. The scheduling-free transmission herein may be for uplink data transmission or downlink data transmission. The scheduling-free transmission may be understood as any one or more of the following meanings, a combination of some technical features in a plurality of meanings, or another similar meaning.

The scheduling-free transmission may mean that a network device pre-allocates a plurality of transmission resources, and notifies a terminal device of the plurality of transmission resources; when needing to transmit uplink data, the terminal device selects at least one transmission resource from the plurality of transmission resources pre-allocated by the network device, and sends the uplink data by using the selected transmission resource; and the network device performs, on one or more transmission resources in the plurality of pre-allocated transmission resources, detection on the uplink data sent by the terminal device. The detection may be blind detection, may be detection performed based on a control field in the uplink data, or may be detection performed in another manner.

The scheduling-free transmission may mean that a network device pre-allocates a plurality of transmission resources, and notifies a terminal device of the plurality of transmission resources, so that when needing to transmit uplink data, the terminal device selects at least one transmission resource from the plurality of transmission resources pre-allocated by the network device, and sends the uplink data by using the selected transmission resource.

The scheduling-free transmission may mean that information about a plurality of pre-allocated transmission resources is obtained; and when uplink data needs to be transmitted, at least one transmission resource is selected from the plurality of transmission resources, and the uplink data is sent by using the selected transmission resource. The information may be obtained from a network device.

The scheduling-free transmission may refer to a method in which uplink data of a terminal device can be transmitted without dynamic scheduling by a network device. The dynamic scheduling may be a scheduling mode in which the network device indicates a transmission resource for each uplink data transmission of the terminal device by using signaling. Optionally, transmitting uplink data of a terminal device may be understood as allowing uplink data of two or more terminal devices to be transmitted on a same time-frequency resource. Optionally, the transmission resource may be a transmission resource of one or more transmission time units after a moment at which the terminal device receives the signaling. A transmission time unit may be a minimum time unit, such as a TTI, of one transmission.

The scheduling-free transmission may mean that a terminal device transmits uplink data without scheduling by a network device. The scheduling may mean that the terminal device sends an uplink scheduling request to the network device, and the network device sends an uplink grant to the terminal device after receiving the scheduling request. The uplink grant indicates an uplink transmission resource allocated to the terminal device.

The scheduling-free transmission may refer to a contention-based transmission mode, and specifically may mean that a plurality of terminals simultaneously transmit uplink data on a same pre-allocated time-frequency resource without scheduling by a base station.

The data may include service data or signaling data.

The blind detection may be understood as detection performed on possible arrival of data when whether data has arrived is unknown, on data that may arrive. Alternatively, the blind detection may be understood as detection performed without an explicit signaling indication.

As an example rather than a limitation, in the embodiments of this application, a basic time unit for scheduling-free transmission may be a TTI (for example, includes the sTTI). After the sTTI technology is introduced, the scheduling-free transmission may include receiving a downlink data channel at a TTI with a length 1 ms or less than 1 ms or sending an uplink data channel at a TTI with a length 1 ms or less than 1 ms.

In the embodiments of this application, a system frequency-domain resource used by the communications system 100 may be a resource with a specified bandwidth in the foregoing licensed frequency-domain resource or license-exempt frequency-domain resource. As an example rather than a limitation, the system frequency-domain resource may be a spectrum resource with a bandwidth such as 80 MHz in the foregoing licensed frequency-domain resource or license-exempt frequency-domain resource. It should be understood that the foregoing enumerated size of the system frequency-domain resource is merely an example for description, and this application is not limited thereto.

In the embodiments of this application, the entire system frequency-domain resource may be a licensed frequency-domain resource, or the entire system frequency-domain resource may be a license-exempt frequency-domain resource, or a part of the system frequency-domain resources may be a licensed frequency-domain resource, and another part of the system frequency-domain resource may be a license-exempt frequency-domain resource. This is not particularly limited in this application.

In addition, as an example rather than a limitation, in the embodiments of this application, the system frequency-domain resource may be divided into a plurality of subbands. In addition, as an example rather than a limitation, each subband may include one or more subcarriers.

In the embodiments of this application, bandwidths of a plurality of subbands in the system frequency-domain resource may be the same. As an example rather than a limitation, for example, a bandwidth of each subband may be, for example, 20 MHz. It should be understood that the foregoing enumerated size of the subband is merely an example for description. This application is not limited thereto, and a size of each integral sub-bandwidth may be arbitrarily adjusted based on an actual requirement.

Alternatively, bandwidths of some subbands in the system frequency-domain resource may be different. For example, bandwidths of some (one or more) subbands in the system frequency-domain resource may be, for example, 20 MHz, and bandwidths of some (one or more) subbands in the system frequency-domain resource may be, for example, 10 MHz. It should be understood that the foregoing enumerated sizes of the subbands are merely examples for description. This application is not limited thereto, and a size of each sub-bandwidth may be arbitrarily adjusted based on an actual requirement.

As an example rather than a limitation, in the embodiments of this application, a size of a sub-bandwidth may be determined based on a unit a size of an object detected or contended for by the terminal device in one detection or contention process) used when the terminal device performs detection on (or contends for) a resource.

For example, in the embodiments of this application, it is assumed that a unit used when the terminal device performs detection on (or contends for) a resource is $\alpha$, and a size of the sub-bandwidth is $\beta$. Then, a relationship between $\alpha$ and $\beta$ may meet: $\beta \leq \alpha$.

In addition, in the embodiments of this application, a size of each subband may be determined by the network device, and is notified to the terminal device by using signaling or the like. Alternatively, in the embodiments of this application, a size of each subband may be specified by a communications system or a communication protocol. This is not particularly limited in this application.

As an example rather than a limitation, in the embodiments of this application, each TTI in the communications system may include X (at least two) time-domain start points, where $X \geq 2$.

In addition, as an example rather than a limitation, for example, a quantity of time-domain start points included in each TTI may be the same as a quantity of slots included in each TTI.

Specifically, in the embodiments of this application, the network device or the terminal device may use a start point of any slot in a TTI (or any time-domain start point of the TTI) as a transmission start moment of the TTI.

In the prior art, each TTI includes only one time-domain start point, namely, a start point of the first slot in the TTI. That is, if the network device or the terminal device cannot determine, before a time-domain start point of a TTI (denoted as a TTI #1 in the following for ease of understanding and description), that the TTI #1 can be obtained through contention (specifically, a frequency-domain resource used based on a contention mechanism in the TTI #1), the network device or the terminal device cannot use the TTI #1.

In contrast, in the embodiments of this application, if the network device or the terminal device obtains the TTI #1 (specifically, a frequency-domain resource used based on a contention mechanism in the TTI #1) before a time-domain start point of the TTI #1 (denoted as a time-domain start point #1 in the following for ease of understanding and description), the network device may perform communication by using the TTI #1 (specifically, the frequency-domain resource used based on the contention mechanism in the TTI #1) starting from the time-domain start point #1.

The following describes an example of a transmission object, namely, uplink control information in the embodiments of this application.

As an example rather than a limitation, in the embodiments of this application, the uplink control information may include but is not limited to one or more of the following information:

1. HARQ Feedback Information

In the embodiments of this application, the uplink control information may include feedback information for downlink data.

Specifically, in the embodiments of this application, a feedback technology may be used for downlink data transmission. As an example rather than a limitation, the feedback technology may include, for example, a hybrid automatic repeat request (HARQ, Hybrid Automatic Repeat Request) technology.

The HARQ technology is a technology formed by combining forward error correction encoding (Forward Error Correction, FEC) and an automatic repeat request (Automatic Repeat Request, ARQ).

For example, in the HARQ technology, after receiving data from a transmit end, a receive end may determine whether the data is correctly decoded. If the data cannot be correctly decoded, the receive end may feed back negative-acknowledgment (Negative-acknowledge, NACK) information to the transmit end, so that the transmit end can determine, based on the NACK information, that the receive end does not correctly receive the data, and can perform retransmission. If the data can be correctly decoded, the receive end may feed back acknowledgement (Acknowledge, ACK) information to the transmit end, so that the transmit end can determine, based on the ACK information, that the receive end correctly receives the data, and can determine that data transmission is completed.

That is, in the embodiments of this application, when decoding succeeds, the receive end may feed back ACK information to the transmit end, and when decoding fails, the receive end may feed back NACK information to the transmit end.

As an example rather than a limitation, in the embodiments of this application, the uplink control information may include the ACK information or the NACK information in the HARQ technology.

It should be understood that the foregoing enumerated content included in the feedback information is merely an example for description, and this application is not limited thereto. Other information that can indicate a status of receiving downlink data by the terminal device shall fall within the protection scope of this application. For example, the feedback information may further include discontinuous transmission (DTX, Discontinuous Transmission) information, and the DTX information may be used to indicate that the terminal device does not receive the downlink data.

2. Channel Quality Indicator (Channel Quality Indicator, CQI) Information

In the embodiments of this application, the CQI may be used to reflect channel quality of a physical downlink shared channel (Physical Downlink Shared Channel, PDSCH). As an example rather than a limitation, in the embodiments of this application, 0 to 15 may be used to represent channel quality of the PDSCH. 0 indicates the worst channel quality, and 15 indicates the best channel quality.

In the embodiments of this application, the terminal device may send CQI information to the network device on a physical uplink control channel (Physical Uplink Control Channel, PUCCH) or a physical uplink shared channel (Physical Uplink Shared Channel, PUSCH). The network device may determine a radio channel condition of a current PDSCH or PUSCH based on the CQI information, so as to complete scheduling for the PDSCH. For example, in the embodiments of this application, the network device may determine adaptive modulation and coding (Adaptive Modulation and Coding, AMC), a modulation and coding scheme (Modulation and Coding Scheme, MCS), a bit rate or a data amount of uplink transmission or downlink transmission, or the like based on the CQI information.

3. Rank Indication (Rank Indication, RI) Information

In the embodiments of this application, the RI information may be used to indicate a quantity of valid data layers of a PDSCH, or the RI information may be used to indicate a quantity of code words (Code Word, CW) that currently can be supported by the terminal device.

4. Precoding Matrix Indicator (Precoding Matrix Indicator, PMI) Information

In the embodiments of this application, the PMI information may be used to indicate an index (index) of a codebook set. That is, in a multi-antenna technology such as a multi-input multiple-output (Multiple-Input Multiple-Output, MIMO) technology, precoding processing (precoding) based on a precoding matrix is performed in baseband processing of a physical layer of a PDSCH. The terminal device may indicate the precoding matrix by using the PMI information, so that signal quality of the PDSCH can be improved.

It should be noted that, in the embodiments of this application, the uplink control information may also be referred to as feedback information.

In the embodiments of this application, sending an uplink channel may be sending data or information carried on the uplink channel. The data or the information may be channel-encoded data or information.

Figure 2:
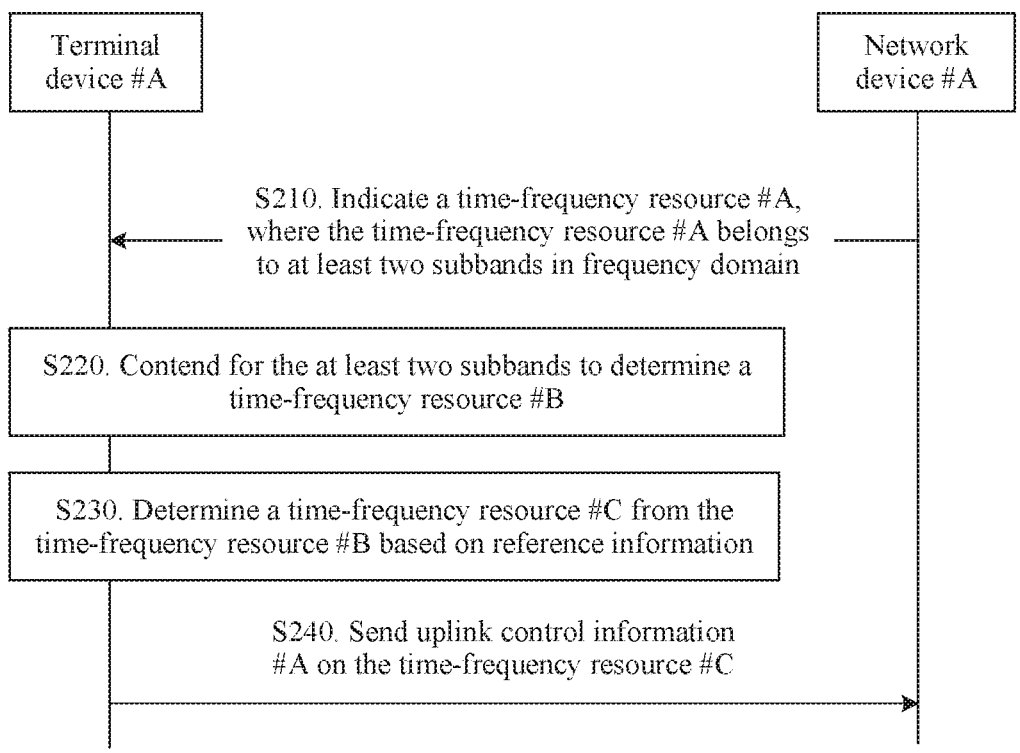
FIG. 2 is a schematic interaction diagram of an example of a transmission process of uplink control information according to an embodiment of this application.

With reference to FIG. 2, the following describes in detail a method 200 for transmitting uplink control information in an embodiment of this application.

FIG. 2 schematically shows a process of transmitting uplink control information #A (namely, an example of uplink control information, such as one or more of feedback information, CQI information, RI information, or PMI information) between a terminal device #A (namely, an example of a terminal device) and a network device #A (namely, an example of a network device).

As shown in FIG. 2, in S210, the network device #A may allocate, to the terminal device #A from the foregoing system time-frequency resource, a time-frequency resource used to transmit uplink transmission (for example, transmit uplink control information).

There may be a plurality of time-frequency resources. A time-frequency resource #A (namely, an example of a first time-frequency resource) in the plurality of time-frequency resources is a time-frequency resource allocated by the network device #A to carry an uplink channel #A. The uplink channel #A includes the uplink control information #A.

It should be noted that in this embodiment of this application, the network device #A may schedule, for the terminal device #A, a plurality of uplink channels including the uplink channel #A, or the network device #A may allocate, to the terminal device a plurality of time-frequency resources including the time-frequency resource #A. Each time-frequency resource may carry one uplink channel. For ease of understanding and description, the following uses a processing process performed based on the time-frequency resource #A as an example for description without loss of generality.

A method and a process of determining the time-frequency resource #A by the network device may be the same as those in the prior art. To avoid repetition, detailed description thereof is omitted herein.

In addition, in this embodiment of this application, the network device #A may instruct, by using scheduling information #A (namely, an example of scheduling information such as downlink control information), the terminal device #A to perform uplink transmission by using the time-frequency resource #A.

In this embodiment of this application, a use manner of the time-frequency resource #A may be a scheduling-based mode, or may be a scheduling-free mode. This is not particularly limited in this application.

For example, when the use manner of the time-frequency resource #A may be the scheduling-based mode, the time-frequency resource #A may be allocated to the terminal device #A after the network device #A determines that the terminal device #A needs to perform uplink transmission (for example, transmit uplink control information). In addition, the scheduling information #A may be sent to the terminal device #A after the network device #A determines that the terminal device #A needs to perform uplink transmission.

For another example, when the use manner of the time-frequency resource #A may be the scheduling-free mode, the time-frequency resource #A may be allocated to the terminal device #A before the network device #A determines that the terminal device #A needs to perform uplink transmission (for example, transmit uplink control information). In addition, the scheduling information #A may be sent to the terminal device #A before the network device #A determines that the terminal device #A needs to perform uplink transmission.

As an example rather than a limitation, in this embodiment of this application, the scheduling information #A may indicate a size of the time-frequency resource #A. For example, the scheduling information #A may indicate the size of the time-frequency resource #A. For example, the scheduling information #A may indicate a quantity of time-frequency resource blocks (Resource Block, RB) included in the time-frequency resource #A. For ease of understanding and description, the quantity of time-frequency resource blocks is denoted as an RB quantity #A. Alternatively, the scheduling information #A may indicate a size (or a bandwidth) of a frequency-domain resource corresponding to the time-frequency resource #A. For example, the scheduling information #A may indicate a quantity of subcarriers included in the time-frequency resource #A. Alternatively, the scheduling information #A may indicate a size of a time-domain resource corresponding to the time-frequency resource #A. For example, the scheduling information #A may indicate a quantity of symbols included in the time-frequency resource #A.

As an example rather than a limitation, in this embodiment of this application, the scheduling information #A may further indicate a frequency-domain location of the frequency-domain resource corresponding to the time-frequency resource #A. For example, the scheduling information #A may indicate a location, of the frequency-domain resource corresponding to the time-frequency resource #A, in a system bandwidth (namely, a frequency-domain resource corresponding to the system time-frequency resource).

As an example rather than a limitation, in this embodiment of this application, the scheduling information #A may further indicate a time-domain location of the time-domain resource corresponding to the time-frequency resource #A.

As an example rather than a limitation, in this embodiment of this application, the scheduling information #A may further indicate a modulation and coding scheme (Modulation and Coding Scheme, MCS) used by the terminal device when using the frequency-domain resource #A to perform uplink transmission. For ease of understanding and description, the modulation and coding scheme is denoted as an MCS #A.

It should be understood that the foregoing enumerated functions (or indicated content) of the scheduling information #A are merely examples for description. This is not particularly limited in this application. The functions of the scheduling information #A may be similar to functions of information (for example, downlink control information or resource scheduling information) used to indicate a related parameter of uplink transmission in the prior art. For example, the scheduling information #A may alternatively be information used to indicate a related parameter used when the terminal device performs uplink transmission in the prior art.

In this embodiment of this application, the time-frequency resource #A occupies at least two (namely, M) subbands in frequency domain, or RBs included in the time-frequency resource #A are located on at least two subbands in frequency domain, or subcarriers included in the time-frequency resource #A are located on at least two subbands in frequency domain.

It should be noted that in this embodiment of this application, "the time-frequency resource #A occupies at least two (namely, M) subbands in frequency domain" may mean that the frequency-domain resource corresponding to the time-frequency resource #A is distributed on the M subbands.

Specifically, in this embodiment of this application, each subband may include a plurality of frequency-domain resources.

In addition, in this embodiment of this application, the time-frequency resource #A may include a plurality of frequency-domain resources.

The plurality of frequency-domain resources in the time-frequency resource #A include frequency-domain resources on all of the M subbands.

For example, the time-frequency resource #A may include some frequency-domain resources on each of the M subbands.

Alternatively, the time-frequency resource #A may include all frequency-domain resources on each of the M subbands.

Alternatively, frequency-domain resources, included in the time-frequency resource #A, on a subband m in the M subbands may be some of frequency-domain resources on the subband m, and m $\in$[1, M].

Alternatively, frequency-domain resources, included in the time-frequency resource #A, on a subband m in the M subbands may be all frequency-domain resources on the subband in, andmÅ [1, M].

That is, in this embodiment of this application, that the time-frequency resource #A occupies at least two subbands may mean that the time-frequency resource #A occupies all resources on the at least two subbands. Alternatively, that the time-frequency resource #A occupies at least two subbands may mean that the time-frequency resource #A occupies some resources on the at least two subbands.

As an example rather than a limitation, in this embodiment of this application, one piece of scheduling information #A may be used to indicate the size (or a quantity of included subbands) and the location of the time-frequency resource #A.

Alternatively, in this embodiment of this application, P (at least two) pieces of scheduling information #A may be used to indicate the size (or a quantity of included subbands) and the location of the time-frequency resource #A.

In this case, time-frequency resources indicated by all of the P pieces of scheduling information #A form the time-frequency resource #A, or subbands occupied by (or included in) time-frequency resources indicated by all of the P pieces of scheduling information #A form subbands occupied by (or included in) the time-frequency resource #A.

As an example rather than a limitation, in this embodiment of this application, time-frequency resources indicated by any two of the P pieces of scheduling information #A may not overlap each other in frequency domain. That is, the time-frequency resource #A may be divided into P parts in frequency domain, and each of the P pieces of scheduling information #A indicates one of the P parts.

Alternatively, in this embodiment of this application, time-frequency resources indicated by the M pieces of scheduling information #A may have a nested structure in frequency domain. For example, one of the P pieces of scheduling information #A may indicate the entire time-frequency resource #A (or all subbands occupied by the time-frequency resource #A), and another one of the P pieces of scheduling information #A may indicate a part of the time-frequency resource #A (or some subbands occupied by the time-frequency resource #A).

It should be noted that in this embodiment of this application, if a time-frequency resource indicated by scheduling information $\#A_i$ in the P pieces of scheduling information #A is a time-frequency resource i, the scheduling information $\#A_i$ may further indicate a transmission parameter used when data is transmitted by using the time-frequency resource i, where i $\in$[1, P].

As an example rather than a limitation, the transmission parameter may include but is not limited to the following:

a modulation and coding scheme used when data is transmitted by using the time-frequency resource i, a transport block size used when data is transmitted by using the time-frequency resource i, a modulation order used when data is transmitted by using the time-frequency resource i, a bit rate used when data is transmitted by using the time-frequency resource i, a redundancy version (Redundancy version, RV) used when data is transmitted by using the time-frequency resource i, a retransmission process used when data is transmitted by using the time-frequency resource i, and the like.

Without loss of generality, in the following, for ease of understanding and description, it is assumed that a bandwidth of the time-frequency resource #A is 80 MHz in frequency domain, and the time-frequency resource #A includes four (namely, an example of M) subbands (denoted as a subband #1 to a subband #4 in the following for ease of understanding and description), and a bandwidth of each subband is 20 MHz.

In this embodiment of this application, the time-frequency resource #A may include a time-frequency resource used to carry uplink data (the time-frequency resource used to carry uplink data is denoted as a time-frequency resource #E in the following for ease of understanding and differentiation). In addition, the time-frequency resource #A may include a time-frequency resource used to carry uplink control information (the time-frequency resource used to carry uplink control information is denoted as a time-frequency resource #D in the following for ease of understanding and differentiation).

As an example rather than a limitation, for example, when the uplink control information includes feedback information, there may be a correspondence between a size of the time-frequency resource #D and a size of the time-frequency resource #E; or the size of the time-frequency resource #D may be determined based on the size of the time-frequency resource #E; or the size of the time-frequency resource #D may be determined based on a bit rate of data transmitted on the time-frequency resource #E and a bit rate of feedback information transmitted on the time-frequency resource #D; or the size of the time-frequency resource #D may be determined by using a function using the size of the time-frequency resource #E as a variable.

Alternatively, as an example rather than a limitation, for example, when the uplink control information includes feedback information, there may be a correspondence between a size of the time-frequency resource and a size of the time-frequency resource #A; or the size of the time-frequency resource #D may be determined based on the size of the time-frequency resource #A; or the size of the time-frequency resource #D may be determined based on a bit rate of data transmitted on the time-frequency resource #A and a bit rate of feedback information transmitted on the time-frequency resource #A; or the size of the time-frequency resource #D may be determined by using a function using the size of the time-frequency resource #A as a variable.

In this embodiment of this application, the size of the time-frequency resource #D (for example, a size of a channel resource occupied by the feedback information or a quantity of modulation symbols of the feedback information) may be determined by using a bit rate of uplink data transmission and a preset parameter (namely, an example of a first coefficient; the preset parameter is denoted as a coefficient $\beta$ in the following for ease of understanding and differentiation) configured by a higher layer. The coefficient $\beta$ may be used to indicate a ratio of the bit rate of the uplink control information to the bit rate of the uplink data.

It should be understood that the foregoing enumerated resource used as the time-frequency resource #D is merely an example for description. This is not particularly limited in this application. The time-frequency resource #D may be a sum of resources that carry each type of information included in the uplink control information, or the time-frequency resource #D may be a resource that carries any type of information included in the uplink control information, or the time-frequency resource #D may be a resource that carries any two or more types of information included in the uplink control information.

In this embodiment of this application, there may be a mapping relationship between the size of the time-frequency resource #D and both of the bit rate of uplink data transmission and the parameter $\beta$. For example, the mapping relationship may mean that the size of the time-frequency resource #D may be determined based on a function using the bit rate of uplink data transmission as a variable, and the parameter $\beta$ may be a constant in the function. For another example, the mapping relationship may mean that a mapping relationship entry may be preset, and the mapping relationship entry may record a one-to-one mapping relationship between a plurality of resource size values and a plurality of bit rates (or a combination of the bit rate and the parameter $\beta$).

As an example rather than a limitation, the size of the time-frequency resource #D may be determined based on Formula 1, which falls within the protection scope of this application. Therefore, the protection scope of this application shall be subject to the protection scope of the claims.

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right)$$ Formula 1

In Formula 1, Q' represents the size of the time-frequency resource #D (or a quantity of REs obtained after the feedback information is encoded and modulated). O represents a quantity of original bits of the feedback information.

$$\sum_{r=0}^{C-1} K_r$$

represents a quantity of effective information bits of an uplink channel (or uplink data) such as a PUSCH (for example, a sum of an original bit and a cyclic redundancy check (Cyclic Redundancy Check, CRC) bit). $M_{so}^{PUSCH\text{-}initial}$ represents a frequency-domain resource allocated to the uplink channel (or the uplink data) such as a PUSCH (for example, the frequency-domain resource corresponding to the time-frequency resource #A; for example, the quantity of subcarriers corresponding to the time-frequency resource #A). $N_{symb}^{PUSCH\text{-}initial}$ represents a time-domain symbol allocated to the uplink channel (or the uplink data) such as a PUSCH (for example, the time-domain resource corresponding to the time-frequency resource #A; for example, the quantity of symbols corresponding to the time-frequency resource #A). That is $M_{so}^{PUSCH\text{-}initial} \cdot N_{symb}^{PUSCH\text{-}initial}$ represents a size (for example, the quantity of REs corresponding to the time-frequency resource #A) of total time-frequency resources (for example, the time-frequency resource #A) allocated to the uplink channel (or the uplink data) such as a PUSCH. $4 \cdot M_{so}^{PUSCH}$ represents a maximum value of the time-frequency resource #D (namely, a resource allocated to the feedback information (namely, the uplink control information)). $\beta_{offset}^{PUSCH}$ represents the coefficient β.

As an example rather than a limitation, $M_{sc}^{PUSCH}$ may represent a size or a quantity of frequency-domain resources (for example, subcarriers) that are actually used by the terminal device #A to carry an uplink channel.

It should be noted that values and/or meanings of $M_{sc}^{PUSCH\text{-}initial}$ and $M_{sc}^{PUSCH}$ may be the same. For example, $M_{sc}^{PUSCH\text{-}initial}$ and $M_{sc}^{PUSCH}$ represent a frequency-domain resource allocated to a transport block corresponding to the uplink data during the first-time transmission. Alternatively, $M_{sc}^{PUSCH\text{-}initial}$ and $M_{sc}^{PUSCH}$ represent a frequency-domain resource allocated to the transport block corresponding to the uplink data during current transmission. The values and/or the meanings of $M_{sc}^{PUSCH\text{-}initial}$ and $M_{sc}^{PUSCH}$ may alternatively be different. For example, $M_{sc}^{PUSCH\text{-}initial}$ represents a frequency-domain resource allocated to a transport block corresponding to the uplink data during the first-time transmission, and $M_{sc}^{PUSCH}$ represents the frequency-domain resource allocated to the transport block corresponding to the uplink data during current transmission.

Because modulation orders used are the same when a same time-frequency resource (for example, the time-frequency resource #A or the time-frequency resource #E) is multiplexed for the uplink control information and the uplink data to perform transmission, it can be learned from Formula 1 that a ratio of a bit rate of the feedback information to a bit rate of the uplink data may be $\beta_{offset}^{PUSCH}$. That is, in this embodiment of this application, the size of the time-frequency resource #D may be the smaller one of $$\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil$$

and $4 \cdot M_{sc}^{PUSCH}$.

It should be understood that the foregoing enumerated manner of determining the size of the time-frequency resource #D by the terminal device #A is merely an example for description. This application is not limited thereto. All other methods that can be used to estimate, from a time-frequency resource allocated by the network device based on the time-frequency resource, a size of a time-frequency resource used to carry uplink control information fall within the protection scope of this application.

Therefore, in S210, the terminal device #A may determine a frequency-domain resource #A used to perform uplink transmission (for example, uplink control information and/or uplink data). Specifically, the terminal device #A may determine a size (or a bandwidth) and a location of the frequency-domain resource #A, and a quantity and locations of subbands included in the frequency-domain resource #A.

In S220, the terminal device #A may perform detection on (or contend for or listen on) the time-frequency resource #A (specifically, the subbands included in the time-frequency resource #A, for example, the subband #1 to the subband #4), so as to determine a subband that can be used by the terminal device in the subband #1 to the subband #4. As an example rather than a limitation, the "detection" may include clear channel assessment (Clear Channel Assessment, CCA), or the "detection" may include LBT.

It should be noted that in this embodiment of this application, the terminal device #A may perform detection on a subband basis. That is, in this embodiment of this application, the terminal device #A may detect, in one detection process, whether one subband is available.

Alternatively, in this embodiment of this application, the terminal device #A may detect, in one detection process, whether a plurality of (at least two) subbands are available.

Alternatively, in this embodiment of this application, the terminal device #A may detect, in one detection process, whether all subbands included in the time-frequency resource #A are available.

As an example rather than a limitation, in this embodiment of this application, the terminal device #A may perform the foregoing detection (or contending or listening) based on the CCA manner or the LBT manner. In addition, the process may be similar to that in the prior art. To avoid repetition, detailed description thereof is omitted herein.

Therefore, in S220, the terminal device #A can determine, from the time-frequency resource #A (specifically, the subbands included in the time-frequency resource #A, for example, the subband #1 to the subband #4), a time-frequency resource that can be used by the terminal device #A (namely, an example of a second time-frequency resource; the time-frequency resource is denoted as a time-frequency resource #B in the following for ease of understanding and description). In frequency domain, the time-frequency resource #B may be corresponding to at least one (namely, K) subband that can be used by the terminal device #A in the subband #1 to the subband #4. The subband is denoted as a subband #A in the following for ease of understanding and differentiation. In addition, the subband. #A may include one (namely, an example of K) subband, or may include a plurality of (namely, another example of K) subbands. This is not particularly limited in this application.

As an example rather than a limitation, for example, in this embodiment of this application, when the frequency-domain resources indicated by the P pieces of scheduling information #A have a nested structure, the time-frequency resource #A may be indicated by one (namely, an example of the Q pieces of scheduling information) of the P pieces of scheduling information #A.

For another example, in this embodiment of this application, when frequency-domain resources indicated by any two of the P pieces of scheduling information #A may not overlap each other, the time-frequency resource #A may be indicated by two or more (namely, another example of the Q pieces of scheduling information) of the P pieces of scheduling information #A. For example, the time-frequency resource #A may include Q parts, the Q parts may have a one-to-one correspondence with the Q pieces of scheduling information, and each part is indicated by corresponding scheduling information.

In S230, the terminal device #A may determine, from the time-frequency resource #B, a time-frequency resource (namely, an example of a third time-frequency resource; the time-frequency resource is denoted as a time-frequency resource #C in the following for ease of understanding and differentiation) that is used to carry the uplink control information #A.

The following describes in detail a method and a process of determining the time-frequency resource #C.

As an example rather than a limitation, in this embodiment of this application, the terminal device #A may determine a size of the time-frequency resource #C by using any one of the following methods.

Method 1

Optionally, in this embodiment of this application, the terminal device #A may determine the time-frequency resource #C based on the size (for example, a product of a size of the time-frequency resource #A in frequency domain and a size of the time-frequency resource #A in time domain) of the time-frequency resource (namely, the time-frequency resource #A) that is allocated by the network device to the terminal device #A by using the scheduling information #A and that is used to carry the uplink channel, and the coefficient β used when the terminal device #A determines the time-frequency resource #D based on the time-frequency resource #A.

Alternatively, optionally, in this embodiment of this application, the terminal device #A may determine the time-frequency resource #C based on the size (for example, a product of a size of the time-frequency resource #E in frequency domain and a size of the time-frequency resource #E in time domain) of the time-frequency resource (namely, the time-frequency resource #E) that is allocated by the network device to the terminal device #A by using the scheduling information #A and that is used to carry the uplink data, and the coefficient β used when the terminal device #A determines the time-frequency resource #D based on the time-frequency resource #E.

In this embodiment of this application, there may be a mapping relationship between the size of the time-frequency resource #C and both of the bit rate of uplink data transmission (or the size of the time-frequency resource #A) and the parameter β. For example, the mapping relationship may mean that the size of the time-frequency resource #C may be determined based on a function using the bit rate of uplink data transmission (or the size of the time-frequency resource #A) as a variable, and the parameter β may be a constant in the function. For another example, the mapping relationship may mean that a mapping relationship entry may be preset, and the mapping relationship entry may record a one-to-one mapping relationship between a plurality of resource size values and a plurality of bit rates (or a combination of the bit rate and the parameter β).

As an example rather than a limitation, the terminal device #A may determine the time-frequency resource #C based on Formula 1.

Specifically, the terminal device #A may determine the size of the time-frequency resource #C based on each parameter used (or used to determine the time-frequency resource #D) in Formula 1.

That is, in this embodiment of this application, assuming that the size of the time-frequency resource #C is Q, $$Q = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right)$$

Therefore, when a broadband (or a quantity of included subbands) of a time-frequency resource that can be actually used by the terminal device for uplink transmission is narrower than a bandwidth of a time-frequency resource that is scheduled by the network device for uplink transmission, in the formula used to determine the time-frequency resource #C, a size of a time-frequency resource actually obtained by the terminal device #A through contention is not used, but the size of the time-frequency resource #A (or the time-frequency resource #E) indicated in the scheduling information #A is used, thereby ensuring transmission reliability of the uplink control information.

As an example rather than a limitation, $M_{sc}^{PUSCH}$ may represent a size or a quantity of frequency-domain resources (for example, subcarriers) that are actually used by the terminal device #A to carry an uplink channel.

It should be noted that values and/or meanings of $M_{sc}^{PUSCH\text{-}initial}$ and $M_{sc}^{PUSCH}$ may be the same. For example, $M_{sc}^{PUSCH\text{-}initial}$ and $M_{sc}^{PUSCH}$ represent a frequency-domain resource allocated to a transport block corresponding to the uplink data during the first-time transmission. Alternatively, $M_{sc}^{PUSCH\text{-}initial}$ and $M_{sc}^{PUSCH\text{-}initial}$ represent a frequency-domain resource allocated to the transport block corresponding to the uplink data during current transmission. Alternatively, $M_{sc}^{PUSCH\text{-}initial}$ and $M_{sc}^{PUSCH}$ represent a frequency-domain resource, of the transport block corresponding to the uplink data, actually used to carry the uplink channel during the current transmission. Values and/or meanings of $M_{sc}^{PUSCH\text{-}initial}$ and $M_{sc}^{PUSCH}$ may alternatively be different. For example, $M_{sc}^{PUSCH\text{-}initial}$ represents a frequency-domain resource allocated to a transport block corresponding to the uplink data during the first-time transmission, and $M_{sc}^{PUSCH}$ represents a frequency-domain resource, of the transport block corresponding to the uplink data, actually used to carry the uplink channel during current transmission.

It should be understood that the foregoing enumerated method for determining the time-frequency resource #C by the terminal device #A is merely an example for description. This is not particularly limited in this application. For example, the value of $N_{symb}^{PUSCH\text{-}initial}$ in Formula 1 may alternatively be a fixed value. In addition, the value of $N_{symb}^{PUSCH\text{-}initial}$ may be determined by the network device in advance and indicated to the terminal device #A, or the value of $N_{symb}^{PUSCH\text{-}initial}$ may be specified by the communications system, or $N_{symb}^{PUSCH\text{-}initial}$ represents a time-domain resource allocated to the transport block corresponding to the uplink data during the first-time transmission.

For another example, $M_{sc}^{PUSCH\text{-}initial}$ represents the frequency-domain resource allocated to the transport block corresponding to the uplink data during the first-time transmission. Alternatively, $M_{sc}^{PUSCH\text{-}initial}$ may indicate the quantity (for example, the quantity M) of subbands occupied by the time-frequency resource #A. Alternatively, the value of $M_{sc}^{PUSCH\text{-}initial}$ may be a value determined based on the quantity (for example, the quantity M) of subbands occupied by the time-frequency resource #A. For example, $M_{sc}^{PUSCH\text{-}initial}$ may be a function value of a function using the value of M as a variable.

For another example, a value of $M_{sc}^{PUSCH\text{-}initial} \cdot N_{symb}^{PUSCH\text{-}initial}$ may be a quantity of REs allocated to the transport block corresponding to the uplink data during the first-time transmission. Alternatively, a value of $M_{sc}^{PUSCH\text{-}initial} \cdot N_{symb}^{PUSCH\text{-}initial}$ may be a value specified by the communications system. Alternatively, a value of $M_{sc}^{PUSCH\text{-}initial} \cdot N_{symb}^{PUSCH\text{-}initial}$ may be a value determined by the network device. In addition, the network device may notify the terminal device #A of the value of $M_{sc}^{PUSCH\text{-}initial} \cdot N_{symb}^{PUSCH\text{-}initial}$ by using, for example, RRC signaling.

For another example, $M_{sc}^{PUSCH\text{-}initial}$ represents a part of a frequency-domain resource (for example, the frequency-domain resource corresponding to the time-frequency resource #A) allocated to the uplink channel (or the uplink data) such as a PUSCH.

For another example, $N_{symb}^{PUSCH\text{-}initial}$ represents some of time-domain symbols (for example, the time-domain resource corresponding to the time-frequency resource #A) allocated to the uplink data (or the PUSCH).

That is, in this embodiment of this application, $M_{sc}^{PUSCH\text{-}initial} \cdot N_{symb}^{PUSCH\text{-}initial}$ represents a part of a total time-frequency resource (for example, the time-frequency resource #A) allocated to the uplink data (or the PUSCH).

It should be understood that the foregoing enumerated Formula 1 is only an example of a mapping relationship between the size of the time-frequency resource #C and the size of the time-frequency resource #A. This embodiment of this application is not limited thereto. For example, in this embodiment of this application, the size of the time-frequency resource #C may alternatively not be limited by the parameter $4 \cdot M_{sc}^{PUSCH}$. For example, the size of the time-frequency resource #C may alternatively be determined based on Formula 2.

$$Q = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil \quad \text{Formula 2}$$

Meanings of same symbols or characters in Formula 2 and Formula 1 may be the same. To avoid repetition, detailed description thereof is omitted herein.

As an example rather than a limitation, $M_{sc}^{PUSCH\text{-}initial} \cdot N_{symb}^{PUSCH\text{-}initial}$ represents a size value of a time-frequency resource that occupies L subbands of M subbands and that is in a total time-frequency resource (for example, the time-frequency resource #A) allocated to the uplink data (or the PUSCH). A value of L is a value specified by the communications system, or a value of L may be a value determined by the network device. In addition, the network device may notify the terminal device #A of the value of L by using, for example, RRC signaling. In addition, locations of the L subbands in the M subbands are specified by the communications system, or the locations of the L subbands in the M subbands may be values determined by the network device. In addition, the network device may notify the terminal device #A of the locations of the L subbands in the M subbands by using, for example, RRC signaling.

Method 2

In this embodiment of this application, a mapping relationship between a plurality of parameter groups and a plurality of coefficients may be stored in the terminal device #A. Each parameter group includes one size value of a time-frequency resource (for example, a quantity of REs) and a value of one coefficient.

For any two parameter groups, assuming that the two parameter groups are a parameter group #A and a parameter group #B, the following relationship exists between the parameter group #A and the parameter group #B.

It is assumed that a size value of a time-frequency resource included in the parameter group #A (for example, a quantity of REs included in the parameter group #A) is a1, a size value of a time-frequency resource included in the parameter group #A is a2, a size value of a time-frequency resource included in the parameter group #B (for example, a quantity of REs included in the parameter group #B) is b1, and a size value of a time-frequency resource included in the parameter group #B is b2. Then, $a1 \times a2 \approx b1 \times b2$; or $|a1 \times a2 - b1 \times b2| = Z$, and Z may be a preset value.

In this embodiment of this application, the size value of the time-frequency resource #E and a value of the coefficient β may belong to a same parameter group.

Alternatively, the size value of the time-frequency resource #A and a value of the coefficient β may belong to a same parameter group.

In addition, in this embodiment of this application, the terminal device #A may determine a parameter group to which the size value of the time-frequency resource #B belongs (the parameter group is denoted as a parameter group #1 in the following for ease of understanding and differentiation).

Alternatively, the terminal device #A may determine a time-frequency resource (namely, a size of a sixth time-frequency resource; the time-frequency resource is denoted as a time-frequency resource #F in the following for ease of understanding and differentiation), used to carry the uplink data, in the time-frequency resource #B. In this case, the parameter group #1 may alternatively be a parameter group to which a size value of the time-frequency resource #F belongs.

Therefore, the terminal device #A may determine a coefficient in the parameter group #1 (namely, an example of a second coefficient; the coefficient is denoted as a coefficient β' in the following for ease of understanding and differentiation).

Further, terminal device #A may determine the size of the time-frequency resource #C based on the size of the time-frequency resource #F and the coefficient β'.

That is, in this embodiment of this application, assuming that the size of the time-frequency resource #C is Q, $$Q = \min\left(\left\lceil \frac{O \cdot M'^{PUSCH\text{-}initial}_{sc} \cdot N'^{PUSCH\text{-}initial}_{symb} \cdot \beta'^{PUSCH}_{offset}}{\sum_{r=0}^{C-1} K_r} \right\rceil, 4 \cdot M^{PUSCH}_{sc}\right)$$

$M'^{PUSCH\text{-}initial}_{sc}$ represents a size or a quantity of frequency-domain resources (for example, a frequency-domain resource corresponding to the time-frequency resource #B, for example, a subcarrier), used to carry the uplink data (or the PUSCH), in the time-frequency resource obtained by the terminal device through contention. $N'^{PUSCH\text{-}initial}_{symb}$ represents a size or a quantity of time-domain resources (for example, a time-domain resource corresponding to the time-frequency resource #B, for example, a symbol), used to carry the uplink data (or the PUSCH), in the time-frequency resource obtained by the terminal device through contention. That is, $M'^{PUSCH\text{-}initial}_{sc} \cdot N'^{PUSCH\text{-}initial}_{symb}$ represents a size or a quantity of total time-frequency resources (for example, the time-frequency resource #B, or REs corresponding to the time-frequency resource #B), used to carry the uplink data (or the PUSCH), in the time-frequency resource obtained by the terminal device through contention. $\beta^{PUSCH}_{offset}$ represents the coefficient β'.

$4 \cdot M^{PUSCH}_{sc}$ represents a maximum value of the time-frequency resource #D (namely, a resource allocated to the feedback information (namely, the uplink control information)).

As an example rather than a limitation, $M^{PUSCH}_{sc}$ may represent a size or a quantity of frequency-domain resources (for example, subcarriers) that are actually used by the terminal device #A to carry an uplink channel. For example, values of $M^{PSUCH}_{sc}$ and $M'^{PUSCH\text{-}initial}_{sc}$ may be the same.

It should be understood that the foregoing enumerated method for determining the time-frequency resource #C by the terminal device #A is merely an example for description. This is not particularly limited in this application. For example, the value of $N'^{PUSCH\text{-}initial}_{symb}$ may alternatively be a fixed value. In addition, the value of $N'^{PUSCH\text{-}initial}_{symb}$ may be determined by the network device in advance and indicated to the terminal device #A. Alternatively, the value of $N'^{PUSCH\text{-}initial}_{symb}$ may be specified by the communications system.

For another example, $M^{PUSCH\text{-}initial}_{sc}$ may alternatively represent a quantity (for example, the quantity K) of subbands occupied by the time-frequency resource #B. Alternatively, a value of $M'^{PUSCH\text{-}initial}_{sc}$ may be a value determined based on a quantity (for example, the quantity K) of subbands occupied by the time-frequency resource #B. For example, $M'^{PUSCH\text{-}initial}_{sc}$ may be a function value of a function using the value of K as a variable.

For another example, the value of $M'^{PUSCH\text{-}initial}_{sc} \cdot N'^{PUSCH\text{-}initial}_{symb}$ may be a value specified by the communications system. Alternatively, the value of $M'^{PUSCH\text{-}initial}_{sc} \cdot N'^{PUSCH\text{-}initial}_{symb}$ may be a value determined by the network device. In addition, the network device may notify the terminal device #A of the value of $M'^{PUSCH\text{-}initial}_{sc} \cdot N'^{PUSCH\text{-}initial}_{symb}$ by using, for example, RRC signaling.

For another example, $N'^{PUSCH\text{-}initial}_{symb}$ represents a part of a frequency-domain resource obtained by the terminal device through contention (for example, the frequency-domain resource corresponding to the time-frequency resource #B).

For another example, $N'^{PUSCH\text{-}initial}_{symb}$ represents some of time-domain symbols obtained by the terminal device through contention (for example, the time-domain resource corresponding to the time-frequency resource #B).

That is, in this embodiment of this application, $M'^{PUSCH\text{-}initial}_{sc} \cdot N'^{PUSCH\text{-}initial}_{symb}$ represents a part of a total time-frequency resource (for example, the time-frequency resource #B) obtained by the terminal device through contention.

As an example rather than a limitation, $M'^{PUSCH\text{-}initial}_{sc} \cdot N'^{PUSCH\text{-}initial}_{symb}$ represents a size value of a time-frequency resource that occupies L subbands in K subbands and that is in the total time-frequency resource (for example, the time-frequency resource #B) obtained by the terminal device through contention. A value of L is a value specified by the communications system, or a value of L may be a value determined by the network device. In addition, the network device may notify the terminal device #A of the value of L by using, for example, RRC signaling. In addition, locations of the L subbands in the M subbands are specified by the communications system, or the locations of the L subbands in the M subbands may be values determined by the network device. In addition, the network device may notify the terminal device #A of the locations of the L subbands in the M subbands by using, for example, RRC signaling.

Optionally, in this embodiment of this application, a mapping relationship between a plurality of parameter groups and a plurality of thresholds may be stored in the terminal device #A. Each parameter group includes one size value of a time-frequency resource (for example, a quantity of REs) and one threshold.

Therefore, the terminal device #A may use a threshold in a parameter group to which the size value of the time-frequency resource #B belongs, as the value of $4 \cdot M^{PUSCH}_{sc}$ in the foregoing formula.

As an example rather than a limitation, in this embodiment of this application, the terminal device #A may determine the size of the time-frequency resource #C (for example, a quantity of REs included in the time-frequency resource #C, or a quantity of modulation symbols that can be carried on the time-frequency resource #C) based on the size of the time-frequency resource #D (for example, a quantity of REs included in the time-frequency resource #D, or a quantity of modulation symbols that can be carried on the time-frequency resource #D), so that a difference between the size of the time-frequency resource #C and the size of the time-frequency resource #D falls within a preset range.

Assuming that the size of the time-frequency resource #C is X and that the size of the time-frequency resource #D is Y, in this embodiment of this application, for example, X>Y; or $X=Y$; or $0<Y-X\leq W$.

W may be a preset value. For example, in this embodiment of this application, a value of W may be specified by the communications system, or a value of W may be determined by the network device and pre-indicated to the terminal device by using, for example, radio resource control (Radio Resource Control, RRC) signaling.

Alternatively, W may be determined based on X (or Y) and a preset ratio value Z, that is, W=Y·Z. A value of Z may be specified by the communications system, or a value of Z may be determined by the network device and pre-indicated to the terminal device by using, for example, RRC signaling.

Therefore, when a broadband (or a quantity of included subbands) of a time-frequency resource that can be actually used by the terminal device for uplink transmission is narrower than a bandwidth of a time-frequency resource that is scheduled by the network device for uplink transmission, a size of a time-frequency resource (namely, the time-frequency resource #C) used to carry the uplink control information (for example, HARQ feedback information) is enabled to be the same as or similar to a size of a time-frequency resource (for example, the time-frequency resource #D) scheduled by the network device to carry the uplink control information, thereby ensuring demodulation performance of the uplink control information.

Method 3

Optionally, in this embodiment of this application, the terminal device #A may determine, based on the scheduling information #A sent by the network device, a bit rate (namely, a bit rate #A) of uplink data scheduled by the scheduling information #A, and the terminal device may determine the time-frequency resource #C based on the bit rate #A and the coefficient β.

The coefficient β may be a parameter configured by a higher layer, or the coefficient β indicated by the network device by using physical layer signaling, or the coefficient β is specified by the communications system.

The coefficient β may be used to indicate a ratio of the bit rate of the uplink control information to the bit rate of the uplink data.

Therefore, in S230, the terminal device #A can determine the size of the time-frequency resource #C used to carry the uplink control information #A.

In addition, in S230, the terminal device #A may further determine a specific location of the time-frequency resource #C (specifically, an RE included in the time-frequency resource #C) from the time-frequency resource #B based on the determined size of the time-frequency resource #C.

As an example rather than a limitation, in this embodiment of this application, the terminal device #A may determine a symbol corresponding to the time-frequency resource #C (the symbol is denoted as a symbol #2 in the following for ease of understanding and description) based on a location of a symbol (denoted as a symbol #1 in the following for ease of understanding and description), used to carry a reference signal, in the time-frequency resource #B.

For example, in this embodiment of this application, the terminal device #A may use a symbol adjacent to the symbol #1 as the symbol #2.

In addition, when a total quantity of REs on a symbol adjacent to the symbol #1 is less than the determined size of the time-frequency resource (namely, the quantity of REs included in the time-frequency resource #C), the terminal device may further use a symbol whose offset with the symbol #1 is less than or equal to a preset threshold K (the symbol is denoted as a symbol #3 in the following for ease of understanding and description), as the symbol #2.

For example, the terminal device may use consecutive K+1 symbols adjacent to the symbol #1 as symbols #2.

In addition, as an example rather than a limitation, in this embodiment of this application, the terminal device #A may preferably use a time-frequency resource at a location with a relatively low frequency in the time-frequency resource B as the time-frequency resource #C.

Figure 3:
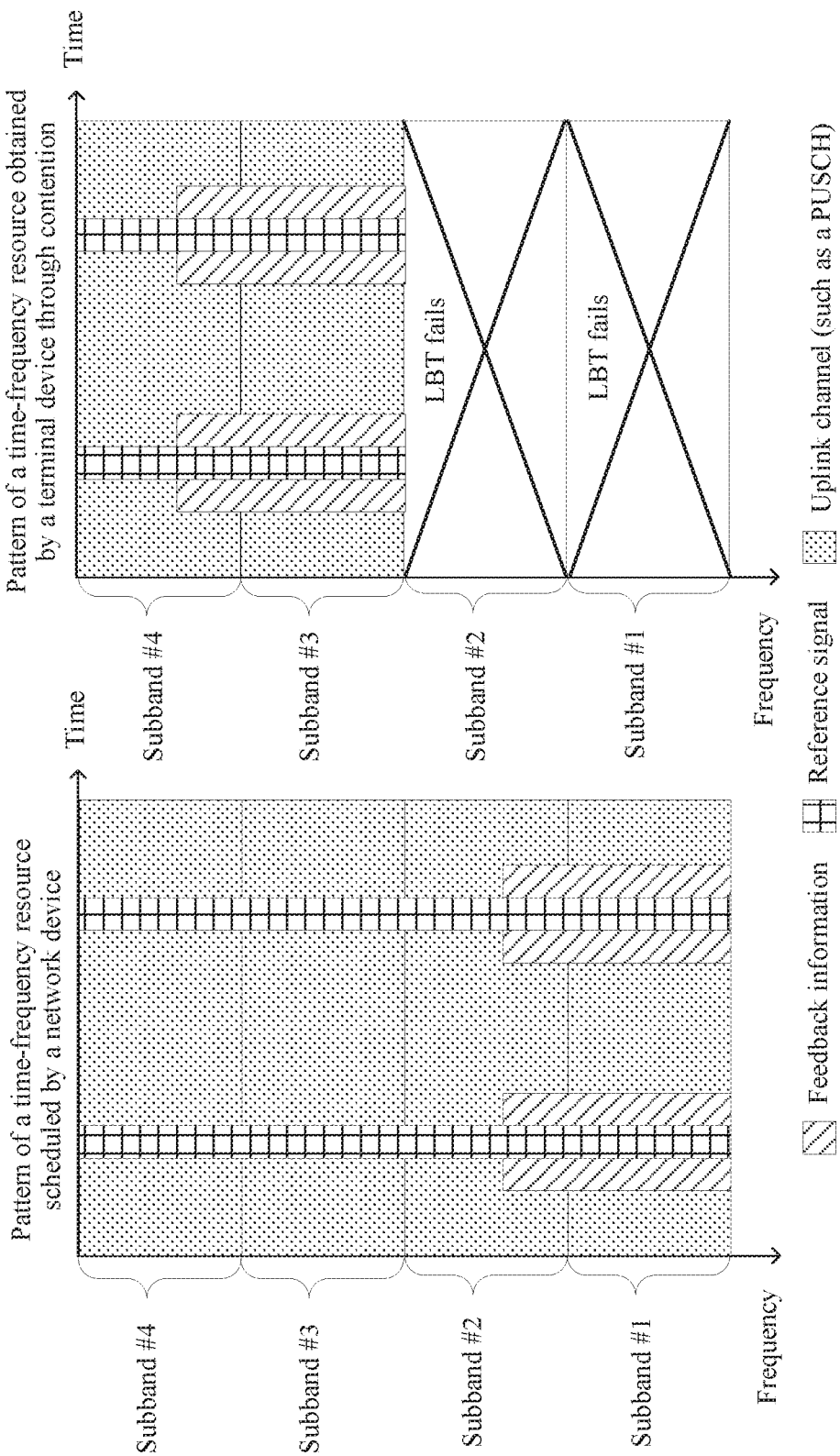
FIG. 3 is a schematic diagram of an example of a pattern of a time-frequency resource that carries uplink control information according to an embodiment of this application.

FIG. 3 shows a pattern of a time-frequency resource (namely, the time-frequency resource #D) that is used to carry the uplink control information and that is in the time-frequency resource #A allocated by the network device #A to the terminal device #A, and a pattern of a time-frequency resource (namely, the time-frequency resource #E) that is used to carry the uplink data and that is in the time-frequency resource #A allocated by the network device #A to the terminal device #A. In addition, FIG. 3 shows a pattern of a time-frequency resource (namely, the time-frequency resource #C) that is used to carry the uplink control information and that is in the time-frequency resource #B actually obtained by the terminal device #A through contention, and a pattern of a time-frequency resource (namely, the time-frequency resource #F) that is used to carry the uplink data and that is in the time-frequency resource #B actually obtained by the terminal device #A through contention.

As shown in FIG. 3, a location relationship of a symbol of the time-frequency resource #C relative to a symbol of a reference signal may be corresponding to a location relationship of a symbol of the time-frequency resource #D relative to the symbol of the reference signal. In addition, a frequency-domain location of the time-frequency resource #C in the time-frequency resource #B is corresponding to a frequency-domain location of the time-frequency resource #D in the time-frequency resource #A. For example, the time-frequency resource C is located at a frequency-domain location with a relatively low frequency of the time-frequency resource #B.

In addition, as shown in FIG. 3, a size of the time-frequency resource may be the same as a size of the time-frequency resource #D. For example, a quantity of subbands occupied by the time-frequency resource #C may be the same as a quantity of subbands occupied by the time-frequency resource #D. In addition, a quantity of symbols occupied by the time-frequency resource #C may be the same as a quantity of symbols occupied by the time-frequency resource #D.

Figure 4:
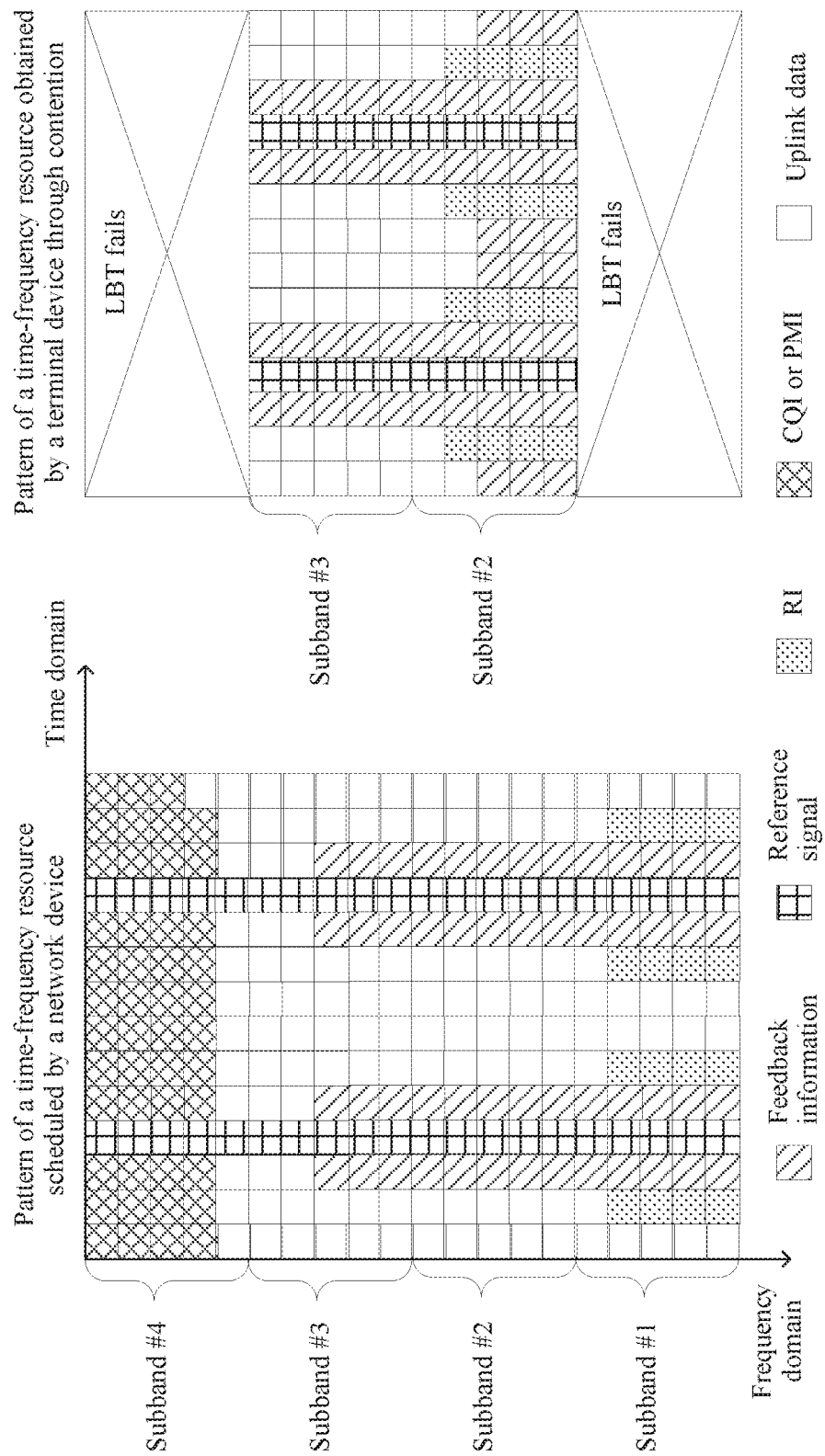
FIG. 4 is a schematic diagram of another example of a pattern of a time-frequency resource that carries uplink control information according to an embodiment of this application.

It should be understood that a location, enumerated in FIG. 3, of the time-frequency resource #C in the time-frequency resource #B is merely an example for description. This application is not limited thereto. For example, as shown in FIG. 4, in this embodiment of this application, a quantity of subbands occupied by the time-frequency resource #C may be less than a quantity of subbands occupied by the time-frequency resource #D. In this case, symbols occupied by the time-frequency resource #C may be greater than symbols occupied by the time-frequency resource #D.

It should be understood that subbands obtained by the terminal device through contention shown in FIG. 3 and FIG. 4 are merely example description. This is not particularly limited in this application.

In S240, the terminal device #A may perform uplink transmission with the network device #A by using the time-frequency resource #B, that is, the terminal device #A may send the uplink control information #A to the network device #A by using the time-frequency resource #C.

In addition, as an example rather than a limitation, the terminal device #A may further send uplink data (denoted as data #A in the following for ease of understanding and description) to the network device #A by using the time-frequency resource #F. The data #A may be all uplink data that is scheduled to be transmitted by the terminal device #A by using the time-frequency resource #A, or the data #A may be a part of uplink data that is scheduled to be transmitted by the terminal device #A by using the time-frequency resource #A. This is not particularly limited in this application.

In this embodiment of this application, the terminal device #A may further store a mapping relationship table. The mapping relationship table may be used to indicate a mapping relationship between a plurality of parameter groups and a plurality of transport block sizes (Transport Block Size, TBS), and each parameter group includes one RB quantity value and one MCS value.

In addition, as described above, the scheduling information may be further used to indicate the RB quantity #A and the MCS #A, so that the terminal device #A can search, based on the RB quantity #A and the MCS #A the mapping relationship table for a TBS (denoted as a TBS #A in the following for ease of understanding and description) corresponding to a parameter group to which the RB quantity #A and the MCS #A belong.

That is, the TBS #A may be a TBS that is allocated by the network device #A to the terminal device #A and that is used to perform uplink transmission.

For example, the terminal device #A may send the data #A and the uplink control information #A to the network device #A based on the TBS #A and the MCS #A by using the time-frequency resource #B. The process may be similar to a method and a process of transmitting data based on a TBS and an MCS by a communications device (a network device or a terminal device) in the prior art. To avoid repetition, detailed description thereof is omitted herein.

For another example, the terminal device #A may send the data #A and the uplink control information #A to the network device #A based on the TBS #A and a re-determined MCS (denoted as an MCS #A' in the following for ease of understanding and differentiation) by using the time-frequency resource #B.

That is, in this embodiment of this application, a quantity of RBs (denoted as an RB quantity #A' in the following for ease of understanding and description) included in the time-frequency resource #B is less than the quantity of RBs (namely, the RB quantity #A) included in the time-frequency resource #A. That is, a quantity of resources that can be used in an uplink transmission process of the terminal device #A is reduced. Therefore, the terminal device #A may increase a modulation order for uplink transmission (that is, a modulation order corresponding to the MCS #A' is used, and is denoted as a modulation order #A' in the following for ease of understanding and description), so that a bit rate used when the terminal device #A performs uplink transmission by using the time-frequency resource #B and the MCS #A' is lower than a bit rate used when the terminal device #A performs uplink transmission by using the time-frequency resource #B and the MCS #A.

In this case, the terminal device #A may further send indication information of the modulation order #A' to the network device #A, so that the network device #A can determine the modulation order #A', and parse, based on the modulation order #A' and the TBS #A, a signal received by using the subband #A, so as to obtain the data #A. The process may be similar to a method and a process in which a communications device (the network device or the terminal device) parses a signal based on a TBS and a modulation order to obtain data in the prior art. To avoid repetition, detailed description thereof is omitted herein.

Optionally, in this embodiment of this application, the terminal device #A may further determine the quantity of RBs included in the time-frequency resource #B. The quantity of RBs is denoted as an RB quantity #A' in the following for ease of understanding and description.

In addition, the terminal device #A may search, based on the MCS #A and the RB quantity #A', the mapping relationship table for a TBS (denoted as a TBS #A' in the following for ease of understanding and description) corresponding to a parameter group to which the RB quantity #A' and the MCS #A belong.

Therefore, in this embodiment of this application, the terminal device #A may perform uplink transmission with the network device #A based on the TBS #A' by using the time-frequency resource #B.

In this case, the terminal device #A may further send indication information of the TBS #A' to the network device #A, so that the network device #A can determine the TBS #A', and parse, based on the TBS #A', a signal received by using the subband #A, so as to obtain the data #A. The process may be similar to a method and a process in which a communications device (the network device or the terminal device) parses a signal based on a TBS to obtain data in the prior art. To avoid repetition, detailed description thereof is omitted herein.

It should be noted that, in this embodiment of this application, when the TBS #A' is used to transmit the data #A, a modulation order used may be the modulation order #A, or may be a modulation order that is determined based on the TBS #A' and that is different from the modulation order #A. This is not particularly limited in this application.

As an example rather than a limitation, the terminal device #A may transmit the uplink control information #A to the network device #A by using the time-frequency resource and based on the following manner 1 or manner 2.

Manner 1

In this embodiment of this application, the terminal device #A may send information #1 (namely, an example of indication information of the third time-frequency resource) to the network device #A. As an example rather than a limitation, in this embodiment of this application, the information #1 may be used to indicate a quantity of subbands corresponding to the time-frequency resource #C, and the information #1 may be used to indicate a location of a subband corresponding to the time-frequency resource #C.

Therefore, the network device #A can determine, based on the information #1, a subband, in the frequency-domain resource #A, that carries uplink control information (namely, the uplink control information #A) sent by the terminal device #A.

Further, the network device #A may receive, only on the subband indicated by the information #1, the uplink control information sent by the terminal device #A, thereby reducing processing burden of the network device. Herein, a method and a process of receiving control information by using a resource by the network device #A may be similar to those in the prior art. To avoid repetition, detailed description thereof is omitted herein.

As an example rather than a limitation, in this embodiment of this application, the terminal device #A may send the information #1 to the network device #A by using the time-frequency resource #B (for example, the time-frequency resource #C).

Alternatively, in this embodiment of this application, the terminal device #A may send both the information #1 and the uplink control information #A to the network device #A in a piggyback manner by using the time-frequency resource #B.

The "sending in a piggyback manner" may mean: In this embodiment of this application, the time-frequency resource #B (for example, the time-frequency resource #C) may be corresponding to a plurality of time-frequency resource elements (Resource Element, RE). The terminal device #A may send the uplink control information #A by using a part of the plurality of REs, and the terminal device #A may send the information #1 by using another part of the plurality of REs.

It should be understood that the foregoing enumerated resource used by the terminal device #A to send the information #1 to the network device #A is merely an example for description. This is not particularly limited in this application. For example, in this embodiment of this application, a reserved resource may be further set in the communications system, and the reserved resource is prohibited for data transmission; or the reserved resource may be used only for signaling transmission between the network device and the terminal device. Therefore, the terminal device #A may send the information #1 to the network device #A by using a part or all of the reserved resource.

Manner 2

The terminal device #A may send the uplink control information #A and the reference signal #A by using the time-frequency resource #B. For example, each subband in the time-frequency resource #B carries a reference signal #A.

Therefore, the network device #A can determine, by performing detection on the reference signal #A, a frequency-domain resource, in the frequency-domain resource #A, that carries the uplink control information #A sent by the terminal device #A, that is, a subband included in the time-frequency resource #B.

Further, the network device #A may parse, only on the subband included in the time-frequency resource #B, information sent by the terminal device thereby reducing processing burden of the network device. Herein, a method and a process of parsing data by the network device #A based on the reference signal may be similar to those in the prior art. To avoid repetition, detailed description thereof is omitted herein.

Manner 3

When the time-frequency resource #A is indicated by P (at least two) pieces of scheduling information #A, the terminal device #A may determine information that is in the P pieces of scheduling information #A and that is used to indicate the time-frequency resource #C (the information is denoted as information #A_1 in the following for ease of understanding). In addition, the terminal device #A, may report indication information (namely, an example of third indication information) of the information #A_1 to the network device #A, so that the network device #A can determine, based on the indication information of the information #A_1, that the terminal device #A uses the time-frequency resource indicated by the information #A_1 (or a subband to which the time-frequency resource indicated by the information #A_1 belongs) to transmit the uplink control information.

Similarly, in this embodiment of this application, the terminal device #A may further send information #2 (namely, an example of indication information of the second time-frequency resource) to the network device #A. As an example rather than a limitation, in this embodiment of this application, the information #2 may be used to indicate a quantity of subbands corresponding to the time-frequency resource #B, and the information #2 may be used to indicate a location of a subband corresponding to the time-frequency resource #B.

Therefore, the network device #A can determine, based on the information #2, a subband, in the frequency-domain resource #A, that carries uplink information (for example, uplink control information and/or uplink data) sent by the terminal device #A.

Further, the network device #A may receive, only on the subband indicated by the information #2, the uplink information sent by the terminal device #A, thereby reducing processing burden of the network device. Herein, a method and a process of receiving information by using a resource by the network device #A may be similar to those in the prior art. To avoid repetition, detailed description thereof is omitted herein.

As an example rather than a limitation, in this embodiment of this application, the terminal device #A may send the information #2 to the network device #A by using the time-frequency resource #B.

Alternatively, in this embodiment of this application, the terminal device #A may send both the information #2 and the uplink information to the network device #A in a piggyback manner by using the time-frequency resource #B.

The "sending in a piggyback manner" may mean: in this embodiment of this application, the time-frequency resource #B may be corresponding to a plurality of time-frequency resource elements REs, the terminal device #A may send the uplink information by using a part of the plurality of RFs, and the terminal device #A may send the information #2 by using another part of the plurality of REs.

It should be understood that the foregoing enumerated resource used by the terminal device #A to send the information #2 to the network device #A is merely an example for description. This is not particularly limited in this application. For example, in this embodiment of this application, a reserved resource may be further set in the communications system, and the reserved resource is prohibited for data transmission; or the reserved resource may be used only for signaling transmission between the network device and the terminal device. Therefore, the terminal device may send the information #2 to the network device by using a part or all of the reserved resource.

According to the method for transmitting uplink control information in this embodiment of this application, the system frequency-domain resource used based on the contention mechanism is divided into a plurality of subbands. In addition, after determining the first frequency-domain resource allocated by the network device, before uplink transmission needs to be performed, the terminal device performs detection on at least two subbands included in the first frequency-domain resource, so that the terminal device can determine, from the at least two subbands, a second frequency-domain resource that can be used by the terminal device, and transmit uplink data by using the second uplink frequency-domain resource. That is, in comparison with the prior art, the terminal device can use the first frequency-domain resource to perform wireless communication with no need to determine that resources in a full-bandwidth range of the first frequency-domain resource are used. Therefore, this can improve a possibility of using, by the terminal device, the first frequency-domain resource (specifically, some subbands of the first frequency-domain resource) to perform wireless communication, thereby improving communication efficiency, reducing a service transmission latency, and improving user experience.

In addition, a size of a time-frequency resource, used to carry uplink control information, in the second time-frequency resource is determined based on a size of the second time-frequency resource (or a time-frequency resource, used to carry uplink data, in the second time-frequency resource). Therefore, when the second time-frequency resource is a part of the first time-frequency resource, in the prior art, the size of the time-frequency resource, used to carry uplink control information, in the second time-frequency resource is less than a size of a time-frequency resource, used to carry uplink control information, in the first resource. In contrast, according to the method for transmitting uplink control information in this embodiment of this application, the size of the third time-frequency resource, used to carry uplink control information, in the second time-frequency resource is determined based on a size of the first time-frequency resource, that is, a difference between the size of the third time-frequency resource and a size of a time-frequency resource, used to carry uplink control information, in the first time-frequency resource falls within a preset range. That is, in comparison with the prior art, increasing the size of the time-frequency resource used to carry uplink control information in this embodiment of this application can ensure transmission reliability of the uplink control information.

In addition, in this embodiment of this application, the time-frequency resource #B may be corresponding to at least one TTI (denoted as a TTI #A in the following for ease of understanding and description).

In this embodiment of this application, the TTI #A may include at least two time-domain start points: denoted as a time-domain start point #A and a time-domain start point #B in the following for ease of understanding and description.

In this embodiment of this application, a time-domain start point of the time-frequency resource #B may be located at the time-domain start point #A, or a time-domain start point of the time-frequency resource #B may be located at the time-domain start point #B.

In addition, in this embodiment of this application, a time-domain location of the time-frequency resource #C may be located between the time-domain start point #A and the time-domain start point #B, or a time-domain location of the time-frequency resource #C may be located after the time-domain start point #B.

Figure 5:
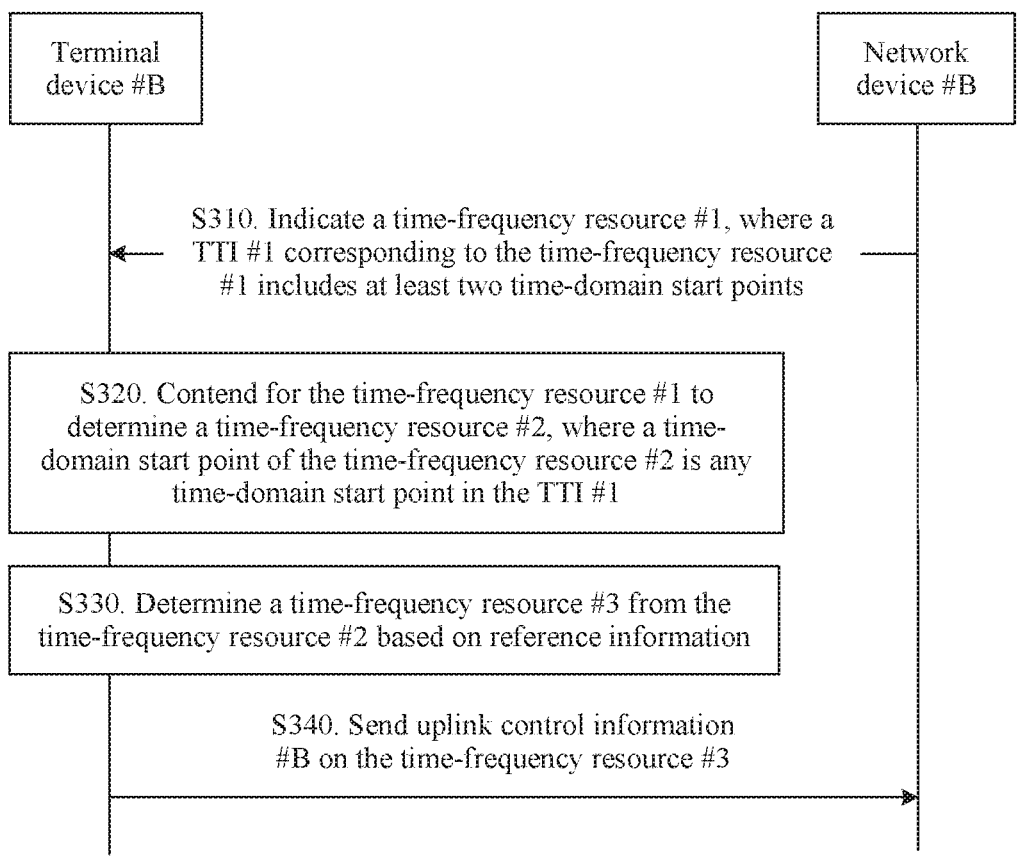
FIG. 5 is a schematic interaction diagram of another example of a transmission process of uplink control information according to an embodiment of this application.

With reference to FIG. 5, the following describes in detail a method 300 for transmitting uplink control information in an embodiment of this application.

FIG. 5 schematically shows a process of transmitting uplink control information #B (namely, an example of uplink control information, such as one or more of feedback information, CQI information, RI information, or PMI information) between a terminal device #B (namely, an example of a terminal device) and a network device #B (namely, an example of a network device).

As shown in FIG. 5, in 310, the network device #B may allocate, to the terminal device #B from the foregoing system time-frequency resource, a time-frequency resource #1 used to transmit uplink transmission (for example, transmit uplink control information).

As an example rather than a limitation, the time-frequency resource #1 may be corresponding to at least one TTI in time domain (the TTI is denoted as a TTI #1 in the following for ease of understanding and description).

A method and a process of determining the time-frequency resource #1 by the network device may be the same as those in the prior art. To avoid repetition, detailed description thereof is omitted herein.

In addition, in this embodiment of this application, the network device #B may instruct, by using scheduling information #B (namely, an example of scheduling information such as downlink control information), the terminal device #B to perform uplink transmission by using the time-frequency resource #1.

In this embodiment of this application, a use manner of the time-frequency resource #1 may be a scheduling-based mode, or may be a scheduling-free mode. This is not particularly limited in this application.

For example, when the use manner of the time-frequency resource #1 may be the scheduling-based mode, the time-frequency resource #1 may be allocated to the terminal device #B after the network device #B determines that the terminal device #B needs to perform uplink transmission (for example, transmit uplink control information). In addition, the scheduling information #B may be sent to the terminal device #B after the network device #B determines that the terminal device #B needs to perform uplink transmission.

For another example, when the use manner of the time-frequency resource #1 may be the scheduling-free mode, the time-frequency resource #1 may be allocated to the terminal device #B before the network device #B determines that the terminal device #B needs to perform uplink transmission (for example, transmit uplink control information). In addition, the scheduling information #B may be sent to the terminal device #B before the network device #B determines that the terminal device #B needs to perform uplink transmission.

As an example rather than a limitation, in this embodiment of this application, the scheduling information #B may indicate a size of the time-frequency resource #1. For example, the scheduling information #B may indicate the size of the time-frequency resource #1. For example, the scheduling information #B may indicate a quantity of RBs included in the time-frequency resource #1. For ease of understanding and description, the quantity of RBs is denoted as an RB quantity #1. Alternatively, the scheduling information #B may indicate a size (or a bandwidth) of a frequency-domain resource corresponding to the time-frequency resource #1. For example, the scheduling information #B may indicate a quantity of subcarriers included in the time-frequency resource #1. Alternatively, the scheduling information #B may indicate a size of a time-domain resource corresponding to the time-frequency resource #1. For example, the scheduling information #B may indicate a quantity of symbols included in the time-frequency resource #1. Alternatively, the scheduling information #B may indicate a TTI corresponding to the time-frequency resource #1.

As an example rather than a limitation, in this embodiment of this application, the scheduling information #B may further indicate a frequency-domain location of the frequency-domain resource corresponding to the time-frequency resource #1.

As an example rather than a limitation, in this embodiment of this application, the scheduling information #B may further indicate a tune-domain location of the time-domain resource corresponding to the time-frequency resource #1.

As an example rather than a limitation, in this embodiment of this application, the scheduling information #B may further indicate a modulation and coding scheme (Modulation and Coding Scheme, MCS) used by the terminal device when using the frequency-domain resource #1 to perform uplink transmission. For ease of understanding and description, the modulation and coding scheme is denoted as an MCS #1.

It should be understood that the foregoing enumerated functions (or indicated content) of the scheduling information #B are merely examples for description. This is not particularly limited in this application. The functions of the scheduling information #B may be similar to functions of information (for example, downlink control information or resource scheduling information) used to indicate a related parameter of uplink transmission in the prior art. For example, the scheduling information #B may alternatively be information used to indicate a related parameter used when the terminal device performs uplink transmission in the prior art.

In this embodiment of this application, the TTI #1 includes at least two time-domain start points (denoted as a time-domain start point lint and #α time-domain start point #β in the following for ease of understanding and description).

Optionally, in this embodiment of this application, the time-frequency resource #1 includes at least two (namely, M) subbands in frequency domain.

That is, in this embodiment of this application, the TTI #1 includes two candidate time-frequency resources. The two candidate time-frequency resources are the time-frequency resource #1 or a time-frequency resource #2, a time-domain start point of the time-frequency resource #1 is the time-domain start point #α, a time-domain start point of the time-frequency resource #2 is the time-domain start point #β, and a time-domain start point #β of the time-frequency resource #2 is later than a time-domain start point #α of the time-frequency resource #1.

Optionally, the time-frequency resource #2 is a part, of the time-frequency resource #1.

As an example rather than a limitation, the time-domain start point #α is located in the TTI #1. For example, the time-domain start point #α is one of the following four cases: a moment corresponding to a start boundary of a symbol #0, a moment that is in a symbol #0 and whose time length away from a start boundary of the symbol #0 is a preset value #1 (for example, 25 microseconds (μs)), a moment that is in a symbol #0 and whose time length away from a start boundary of the symbol #0 is a preset value #2 (for example, a sum of 25 μs and a length of a timing advance (timing advance, TA)), and a moment corresponding to a start boundary of a symbol #1. Optionally, the scheduling information #B may further indicate a location of the time-domain start point #α of the terminal device.

As an example rather than a limitation, the time-domain start point #β is located in the TTI #1. For example, the time-domain start point #β is a moment corresponding to a start boundary of a symbol #7.

Optionally, in this embodiment of this application, the time-frequency resource #1 includes one subband in frequency domain.

As an example rather than a limitation, in this embodiment of this application, one piece of scheduling information #B may be used to indicate the size (or a quantity of included subbands) and the location of the frequency-domain resource #1.

Alternatively, in this embodiment of this application, P (at least two) pieces of scheduling information #B may be used to indicate the size (or a quantity of included subbands) and the location of the frequency-domain resource #1.

In this case, frequency-domain resources indicated by all of the P pieces of scheduling information #B form the frequency-domain resource #1, or subbands to which (or corresponding to) frequency-domain resources indicated by all of the P pieces of scheduling information #B belong form subbands to which (or corresponding to) the frequency-domain resource #1 belongs.

As an example rather than a limitation, in this embodiment of this application, frequency-domain resources indicated by any two of the P pieces of scheduling information #B may not overlap each other. That is, the frequency-domain resource #1 may be divided into P parts, and each of the P pieces of scheduling information #B indicates one of the P parts.

Alternatively, in this embodiment of this application, frequency-domain resources indicated by M pieces of scheduling information #B may have a nested structure. For example, one of the P pieces of scheduling information #B may indicate the entire frequency-domain resource #1 (or all subbands to which the frequency-domain resource #1 belongs), and another one of the P pieces of scheduling information #B may indicate a part of the frequency-domain resource #1 (or some subbands to which the frequency-domain resource #B belongs).

It should be noted that in this embodiment of this application, if a time-frequency resource indicated by scheduling information #B$_i$ in the P pieces of scheduling information #B is a time-frequency resource i, the scheduling information #B$_i$ may further indicate a transmission parameter used when data is transmitted by using the time-frequency resource i, where i ∈[1, P].

As an example rather than a limitation, the transmission parameter may include but is not limited to the following:

a modulation and coding scheme used when data is transmitted by using the time-frequency resource i, a transport block size used when data is transmitted by using the time-frequency resource i, a modulation order used when data is transmitted by using the time-frequency resource i, a bit rate used when data is transmitted by using the time-frequency resource i, an RV used when data is transmitted by using the time-frequency resource i, a retransmission process used when data is transmitted by using the time-frequency resource i, and the like.

In this embodiment of this application, the time-frequency resource #1 may include a time-frequency resource (denoted as a time-frequency resource #5 in the following for ease of understanding and differentiation) used to carry uplink data, and the time-frequency resource #1 may include a time-frequency resource (denoted as a time-frequency resource #4 in the following for ease of understanding and differentiation) used to carry uplink control information.

Optionally, in this embodiment of this application, a method and a process of determining, by the network device or the terminal device, the time-frequency resource #4 used to carry uplink control information may be the same as a method and a process of determining, by the network device or the terminal device, a time-frequency resource used to carry uplink control information, when uplink data information and uplink control information are multiplexed on an uplink shared channel PUSCH for transmission in the prior art. Alternatively, a method and a process of determining, by the network device or the terminal device, the time-frequency resource #4 used to carry uplink control information may be the same as a method and a process of determining, by the network device or the terminal device, a time-frequency resource used to carry uplink control information, when only uplink control information is multiplexed on an uplink shared channel PUSCH for transmission in the prior art.

Optionally, in this embodiment of this application, the time-frequency resource #4 is a part or all of the time-frequency resource #1.

Optionally, in this embodiment of this application, the time-frequency resource #4 is a part or all of the time-frequency resource #2.

Optionally, in this embodiment of this application, the time-frequency resource #4 is a part or all of the time-frequency resource #1, and the time-frequency resource #4 is a part or all of the time-frequency resource #2.

Optionally, in this embodiment of this application, a method for determining, by the network device or the terminal device, a size of the time-frequency resource #4 used to carry uplink control information may be the same as or similar to a method for determining, by the network device or the terminal device, a size of a time-frequency resource used to carry uplink control information, when uplink data information and uplink control information are multiplexed on an uplink shared channel PUSCH for transmission in the prior art. Alternatively, a method for determining, by the network device or the terminal device, a size of the time-frequency resource #4 used to carry uplink control information may be the same as or similar to a method for determining, by the network device or the terminal device, a size of a time-frequency resource used to carry uplink control information, when only uplink control information is multiplexed on an uplink shared channel PUSCH for transmission in the prior art.

it should be noted that in the prior art, when different uplink control information is transmitted by using a PUSCH, or when transmission modes of uplink control information transmitted by using a PUSCH are different (the uplink control information and the uplink data information are multiplexed for transmission, or the uplink control information is separately transmitted), the network device or the terminal device may determine, by using different methods, a size of a time-frequency resource used to carry the uplink control information.

As an example rather than a limitation, in this embodiment of this application, there may be a correspondence between the size of the time-frequency resource #4 and the size of the time-frequency resource #1; or the size of the time-frequency resource #4 may be determined based on the size of the time-frequency resource #1; or the size of the time-frequency resource #4 may be determined based on a bit rate of data transmitted on the time-frequency resource #1 and a bit rate of uplink control information transmitted on the time-frequency resource #1; or the size of the time-frequency resource #4 may be determined by using a function using the size of the time-frequency resource #1 as a variable. The uplink control information includes at least one of hybrid automatic repeat request HARQ feedback information, channel quality indicator information CQI, rank indication information RI, and precoding matrix indicator information PMI. Optionally, the CQI information and the PMI information may be jointly encoded, or may be independently encoded.

As an example rather than a limitation, in this embodiment of this application, when the uplink control information includes the CQI information and/or the PMI information, and the uplink control information further includes at least one of the hybrid automatic repeat request HARQ feedback information and the RI information a size of a time-frequency resource used to transmit the HARQ feedback information or the RI information may be determined based on a bit rate of the CQI information and/or the PMI information transmitted on the time-frequency resource #1 and a bit rate of the HARQ feedback information or the RI information transmitted on the time-frequency resource #1.

As an example rather than a limitation, for example, when the uplink control information includes the feedback information, there may be a correspondence between the size of the time-frequency resource #4 and a size of the time-frequency resource #5; or the size of the time-frequency resource #4 may be determined based on the size of the time-frequency resource #5; or the size of the time-frequency resource #4 may be determined based on a bit rate of data transmitted on the time-frequency resource #5 and a bit rate of the feedback information transmitted on the time-frequency resource #4; or the size of the time-frequency resource #4 may be determined by using a function using the size of the time-frequency resource #5 as a variable.

Alternatively, as an example rather than a limitation, for example, when the uplink control information includes the feedback information, there may be a correspondence between the size of the time-frequency resource #4 and the size of the time-frequency resource #1; or the size of the time-frequency resource #4 may be determined based on the size of the time-frequency resource #1; or the size of the time-frequency resource #4 may be determined based on a bit rate of data transmitted on the time-frequency resource #1 and a bit rate of feedback information transmitted on the time-frequency resource #1; or the size of the time-frequency resource #4 may be determined by using a function using the size of the time-frequency resource #1 as a variable.

In this embodiment of this application, the size of the time-frequency resource #4 (or a size of a channel resource occupied by the feedback information or a quantity of modulation symbols of the feedback information) may be determined by using a bit rate of uplink data transmission and a preset parameter (namely, an example of a first coefficient; the preset parameter is denoted as a coefficient β in the following for ease of understanding and differentiation) configured by a higher layer. The coefficient β may be used to indicate a ratio of the bit rate of the uplink control information to the bit rate of the uplink data.

As an example rather than a limitation, the size of the time-frequency resource #4 may be determined based on Formula A:

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right) \quad \text{Formula A}$$

In Formula A, Q' represents the size of the time-frequency resource #4 (or a quantity of symbols obtained after the feedback information is encoded and modulated). O represents a quantity of original bits of the feedback information.

$$\sum_{r=0}^{C-1} K_r$$

represents a quantity of effective information bits of uplink data (or a PUSCH) (for example, a sum of an original bit and a cyclic redundancy check (Cyclic Redundancy Check, CRC) bit). $M_{sc}^{PUSCH\text{-}initial}$ represents a frequency-domain resource allocated to the uplink data (or the PUSCH) (for example, the frequency-domain resource corresponding to the time-frequency resource #1; for example, the quantity of subcarriers corresponding to the time-frequency resource #1). $N_{symb}^{PUSCH\text{-}initial}$ represents a time-domain symbol allocated to the uplink data (or the PUSCH) (for example, the time-domain resource corresponding to the time-frequency resource #1; for example, the quantity of symbols corresponding to the time-frequency resource #1). That is, $M_{sc}^{PUSCH\text{-}initial} \cdot N_{symb}^{PUSCH\text{-}initial}$ represents a size (for example, the quantity of REs corresponding to the time-frequency resource #1) of a total time-frequency resource (for example, the time-frequency resource #1) allocated to the uplink data (or the PUSCH). 4 $M_{sc}^{PUSCH}$ represents a maximum value of the time-frequency resource #4 (namely, a resource allocated to the feedback information (namely, the uplink control information)). $\beta_{offset}^{PUSCH}$ represents the coefficient β.

As an example rather than a limitation, $M_{sc}^{PUSCH}$ may represent a size or a quantity of frequency-domain resources (for example, subcarriers) that are actually used by the terminal device #B to carry an uplink channel.

It should be noted that values and/or meanings of $M_{sc}^{PUSCH\text{-}initial}$ and $M_{sc}^{PUSCH}$ may be the same. For example, $M_{sc}^{PUSCH\text{-}initial}$ and and $M_{sc}^{PUSCH}$ represent a frequency-domain resource allocated to a transport block corresponding to the uplink data during the first-time transmission. Alternatively, $M_{sc}^{PUSCH\text{-}initial}$ and $M_{sc}^{PUSCH}$ represent a frequency-domain resource allocated to the transport block corresponding to the uplink data during current transmission. Alternatively, $M_{sc}^{PUSCH\text{-}initial}$ and $M_{sc}^{PUSCH}$ represent a frequency-domain resource, of the transport block corresponding to the uplink data, actually used to carry the uplink channel during the current transmission. Values and/or meanings of $M_{sc}^{PUSCH\text{-}initial}$ and $M_{sc}^{PUSCH}$ may alternatively be different. For example, $M_{sc}^{PUSCH\text{-}initial}$ represents a frequency-domain resource allocated to a transport block corresponding to the uplink data during the first-time transmission, and $M_{sc}^{PUSCH}$ represents a frequency-domain resource, of the transport block corresponding to the uplink data, actually used to carry the uplink channel during current transmission.

Because modulation orders used are the same when a same time-frequency resource (for example, the time-frequency resource #1) is multiplexed for the uplink control information and the uplink data to perform transmission, it can be learned from Formula A that a ratio of a bit rate of the feedback information to a bit rate of the uplink data may be $\beta_{offset}^{PUSCH}$. That is, in this embodiment of this application, the size of the time-frequency resource #4 may be the smaller one of $$\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil$$

and $4 \cdot M_{sc}^{PUSCH}$.

It should be understood that the foregoing enumerated manner of determining the size of the time-frequency resource #4 by the terminal device #B is merely an example for description. This application is not limited thereto. All other methods that can be used to estimate, from a time-frequency resource allocated by the network device based on the time-frequency resource, a size of a time-frequency resource used to carry uplink control information fall within the protection scope of this application.

Therefore, in S310, the terminal device #B may determine a frequency-domain resource (denoted as the frequency-domain resource #1) occupied by the time-frequency resource #1 used to perform uplink transmission (for example, the uplink control information and/or the uplink data). Specifically, the terminal device #B may determine a size (or a bandwidth) and a location of the frequency-domain resource #1, and a quantity and locations of subbands included in the frequency-domain resource #1.

In addition, in S310, the terminal device #B may determine a time-domain resource occupied by the time-frequency resource #1 used to perform uplink transmission (for example, uplink control information and/or uplink data), for example, the TTI #1. Specifically, the terminal device #B may determine a time-domain location of the TTI #1.

In addition, in S310 or before S310, the terminal device #B may generate an encoded data packet, and the data packet may include encoded uplink data. In addition, in S310 or before S310, the terminal device #B may generate uplink control information.

In S320, the terminal device #B may perform detection on (or contend for or listen on) the time-frequency resource #1 (specifically, subbands included in the frequency-domain resource #1, for example, the subband #1 to the subband #4), so as to determine a subband that can be used by the terminal device #B in the subband #1 to the subband #4. As an example rather than a limitation, the "detection" may include clear channel assessment (Clear Channel Assessment, CCA), or the "detection" may include LBT.

It should be noted that in this embodiment of this application, the terminal device #B may perform detection on a subband basis. That is, in this embodiment of this application, the terminal device #B may detect, in one detection process, whether one subband is available.

Alternatively, in this embodiment of this application, the terminal device #B may detect, in one detection process, whether a plurality of (at least two) subbands are available.

Alternatively, in this embodiment of this application, the terminal device #B may detect, in one detection process, whether all subbands included in the time-frequency resource #1 are available.

As an example rather than a limitation, in this embodiment of this application, the terminal device #B may perform the foregoing detection (or contending or listening) based on the CCA manner or the LBT manner. In addition, the process may be similar to that in the prior art. To avoid repetition, detailed description thereof is omitted herein.

Therefore, in S320, the terminal device #B can determine, from the time-frequency resource #1 (specifically, the subbands included in the time-frequency resource #1, for example, the subband #1 to the subband #4), a time-frequency resource that can be used by the terminal device #B (the time-frequency resource is denoted as a time-frequency resource #2 in the following for ease of understanding and description). In frequency domain, the time-frequency resource #2 may be corresponding to at least one (namely, K) subband that can be used by the terminal device #B in the subband #1 to the subband #4. The subband is denoted as a subband #A in the following for ease of understanding and differentiation. In addition, the subband #A may include one (namely, an example of K) subband, or may include a plurality of (namely, another example of K) subbands. This is not particularly limited in this application.

As an example rather than a limitation, for example, in this embodiment of this application, when the frequency-domain resources indicated by the P pieces of scheduling information #B have a nested structure, the time-frequency resource #1 may be indicated by one (namely, an example of the Q pieces of scheduling information) of the P pieces of scheduling information #B.

For another example, in this embodiment of this application, when frequency-domain resources indicated by any two of the P pieces of scheduling information #B may not overlap each other, the time-frequency resource #1 may be indicated by two or more (namely, another example of the Q pieces of scheduling information) of the P pieces of scheduling information #B. For example, the time-frequency resource #1 may include Q parts, the Q parts may have a one-to-one correspondence with the Q pieces of scheduling information, and each part is indicated by corresponding scheduling information.

In this embodiment of this application, the time-domain start point of the time-frequency resource #2 may be a time-domain start point that is in the time-domain start points of the #1, that is before a time-domain start point of the time-frequency resource obtained by the terminal device through contention, and that is closest to the time-domain start point of the time-frequency resource obtained by the terminal device #B through contention.

In addition, in this embodiment of this application, the time-domain start point of the time-frequency resource #2 may be located at any time-domain start point of the TTI #1.

Figure 6:
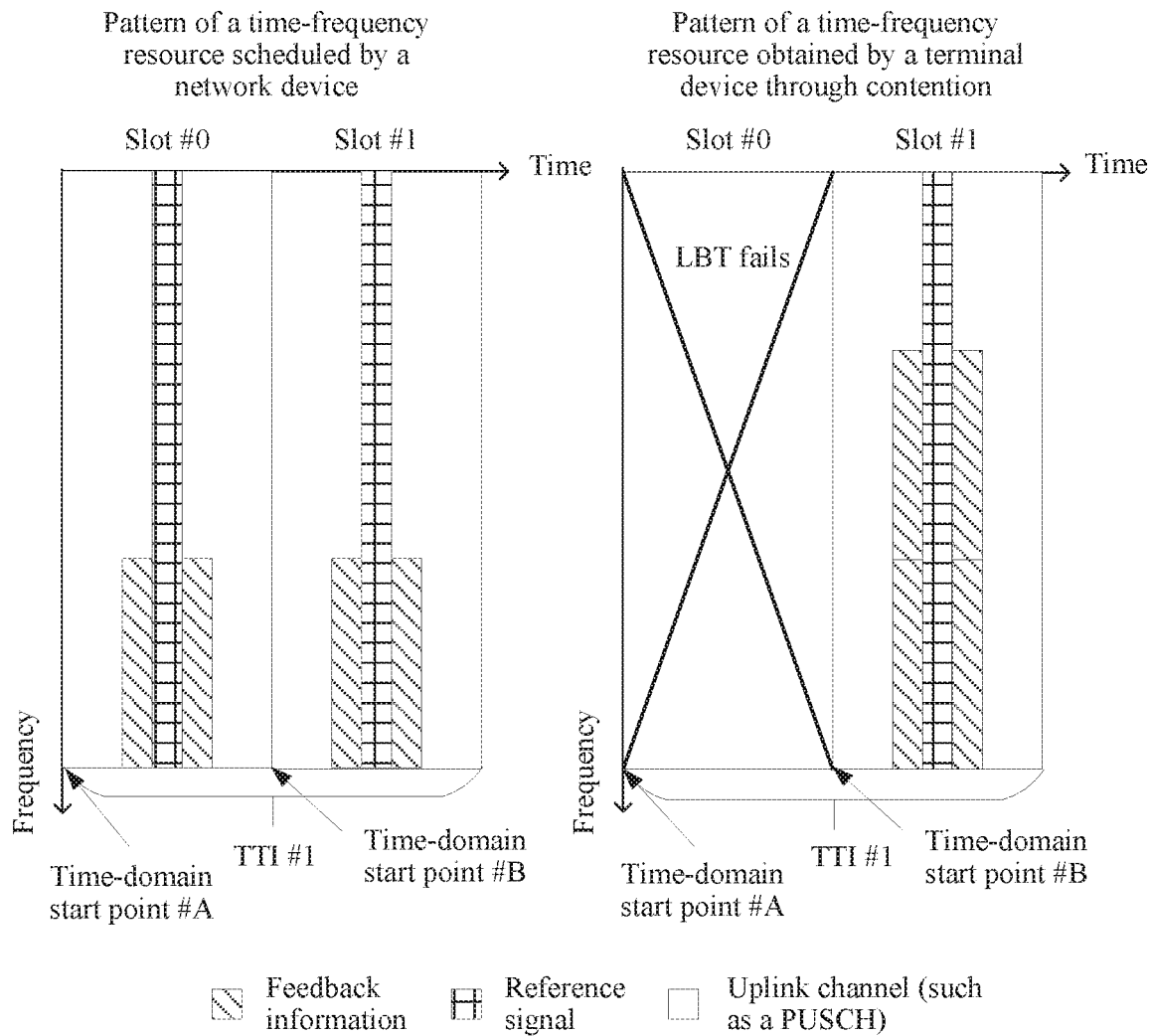
FIG. 6 is a schematic diagram of a pattern of a time-frequency resource that carries uplink control information according to an embodiment of this application.

For example, as shown in FIG. 6, the time-frequency resource #2 may be a time-frequency resource in a slot #1 in the TTI #1.

Optionally, in S320, the terminal device #B may perform detection on (or contend for or listen on) the candidate time-frequency resource (specifically, two candidate time-domain start points included in the TTI #1, for example, the time-domain start point #α or the time-domain start point #β), and determine the time-domain start point #α or the time-domain start point #β based on a result of the detection, so as to determine a candidate time-frequency resource (for example, the time-frequency resource #1 or the time-frequency resource #2) that can be used by the terminal device #B. As an example rather than a limitation, the "detection" may include clear channel assessment (Clear Channel Assessment, CCA), or the "detection" may include LBT.

Optionally, that the terminal device #B determines, based on the result of the detection, the candidate time-frequency resource that can be used includes: When the terminal device #B determines, before the time-domain start point #α, that a carrier in which the candidate time-frequency resource is located is in a sendable state, the terminal device determines that the time-frequency resource #1 can be used.

Optionally, that the terminal device #B determines, based on the result of the detection, the candidate time-frequency resource that can be used includes: When the terminal device #B determines, before the time-domain start point #α, that a carrier in which the candidate time-frequency resource is located is not in a sendable state, and the terminal device #B determines, before the time-domain start point #β, that the carrier in which the candidate time-frequency resource is located is in a sendable state, the terminal device determines that the time-frequency resource #2 can be used.

In S330, the terminal device #B may determine, from the time-frequency resource #2, a time-frequency resource used to carry the uplink control information #B (the time-frequency resource is denoted as a time-frequency resource #3 in the following for ease of understanding and differentiation).

The following describes in detail a method and a process of determining the time-frequency resource #3.

As an example rather than a limitation, in this embodiment of this application, the terminal device #B may determine a size of the time-frequency resource #3 by using any one of the following methods.

Method A

Optionally, in this embodiment of this application, the terminal device #B may determine the time-frequency resource #3 based on a size of a time-frequency resource (for example, the time-frequency resource #1 or the time-frequency resource #5) that is allocated by the network device to the terminal device #B by using the scheduling information #B and that is used to carry an uplink channel, and the coefficient β used when the terminal device #B determines the time-frequency resource #4 based on the time-frequency resource #1 (or the time-frequency resource #5).

As an example rather than a limitation, the terminal device #B may determine the time-frequency resource #3 based on Formula. A.

Specifically, the terminal device #B may determine the size of the time-frequency resource #3 based on each parameter used (or used to determine the time-frequency resource #4) in Formula A.

That is, in this embodiment of this application, if the size of the time-frequency resource #3 is Q, $$Q = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right)$$

Therefore, when a broadband (or a quantity of included subbands) of a time-frequency resource that can be actually used by the terminal device for uplink transmission is narrower than a bandwidth of a time-frequency resource that is scheduled by the network device for uplink transmission, in the formula used to determine the time-frequency resource #3, a size of a time-frequency resource actually obtained by the terminal device #B through contention is not used, but the size of the time-frequency resource #E indicated in the scheduling information #B is used, thereby ensuring transmission reliability of the uplink control information.

Alternatively, when a quantity of symbols in a time-frequency resource that can be actually used by the terminal device for uplink transmission is less than a quantity of symbols in a time-frequency resource that is scheduled by the network device for uplink transmission, in the formula used to determine the time-frequency resource #3, a size of the time-frequency resource actually obtained by the terminal device #B through contention is not used, but the size of the time-frequency resource #1 indicated in the scheduling information #B is used, thereby ensuring transmission reliability of the uplink control information.

As an example rather than a limitation, $M_{sc}^{PUSCH}$ may represent a size or a quantity of frequency-domain resources (for example, subcarriers) that are actually used by the terminal device #B to carry an uplink channel.

It should be noted that values and/or meanings of $M_{sc}^{PUSCH\text{-}initial}$ and $M_{sc}^{PUSCH}$ may be the same. For example, $M_{sc}^{PUSCH\text{-}initial}$ and $M_{sc}^{PUSCH}$ represent a frequency-domain resource allocated to a transport block corresponding to the uplink data during the first-time transmission. Alternatively, $M_{sc}^{PUSCH\text{-}initial}$ and $M_{sc}^{PUSCH}$ represent a frequency-domain resource allocated to the transport block corresponding to the uplink data during current transmission. Values and/or meanings of $M_{sc}^{PUSCH\text{-}initial}$ and $M_{sc}^{PUSCH}$ may alternatively be different. For example, $M_{sc}^{PUSCH\text{-}initial}$ represents a frequency-domain resource allocated to a transport block corresponding to the uplink data during the first-time transmission, and $M_{sc}^{PUSCH}$ represents the frequency-domain resource allocated to the transport block corresponding to the uplink data during current transmission.

It should be understood that the foregoing enumerated method for determining the time-frequency resource #3 by the terminal device #B is merely an example for description. This is not particularly limited in this application. For example, the value of $N_{symb}^{PUSCH\text{-}initial}$ in Formula A may alternatively be a fixed value. In addition, the value of $N_{symb}^{PUSCH\text{-}initial}$ may be determined by the network device in advance and indicated to the terminal device #B, or the value of $N_{symb}^{PUSCH\text{-}initial}$ may be specified by the communications system, or $N_{symb}^{PUSCH\text{-}initial}$ represents a time-domain resource allocated to the transport block corresponding to the uplink data during the first-time transmission.

For another example, $M_{sc}^{PUSCH\text{-}initial}$ represents the frequency-domain resource allocated to the transport block corresponding to the uplink data during the first-time transmission. Alternatively, $M_{sc}^{PUSCH\text{-}initial}$ may indicate the quantity (for example, the quantity M) of subbands occupied by the time-frequency resource #1 (or the time-frequency resource #5). Alternatively, the value of $M_{sc}^{PUSCH\text{-}initial}$ may be a value determined based on the quantity (for example, the quantity M) of subbands occupied by the time-frequency resource #1 (or the time-frequency resource #5). For example, $M_{sc}^{PUSCH\text{-}initial}$ may be a function value of a function using the value of M as a variable.

For another example, a value of $M_{sc}^{PUSCH\text{-}initial} \cdot N_{symb}^{PUSCH\text{-}initial}$ may be a quantity of REs allocated to the transport block corresponding to the uplink data during the first-time transmission. Alternatively, a value of $M_{sc}^{PUSCH\text{-}initial} \cdot N_{symb}^{PUSCH\text{-}initial}$ may be communications system. Alternatively, a value of $M_{sc}^{PUSCH\text{-}initial} \cdot N_{symb}^{PUSCH\text{-}initial}$ may be a value determined by the network device. In addition, the network device may notify the terminal device #B of the value of $M_{sc}^{PUSCH\text{-}initial} \cdot N_{symb}^{PUSCH\text{-}initial}$ by using, for example, RRC signaling.

For another example, $M_{sc}^{PUSCH\text{-}initial}$ represents a part of a frequency-domain resource (for example, the frequency-domain resource corresponding to the time-frequency resource #1) allocated to the uplink data (or the PUSCH).

For another example, $N_{symb}^{PUSCH\text{-}initial}$ represents some of time-domain symbols (for example, the time-domain resource corresponding to the time-frequency resource #1) allocated to the uplink data (or the PUSCH).

That is, in this embodiment of this application, $M_{sc}^{PUSCH\text{-}initial} \cdot N_{symb}^{PUSCH\text{-}initial}$ represents a part of a total time-frequency resource (for example, the time-frequency resource #1) allocated to the uplink data (or the PUSCH).

As an example rather than a limitation, $M_{sc}^{PUSCH\text{-}initial} \cdot N_{symb}^{PUSCH\text{-}initial}$ represents a size value of a time-frequency resource that occupies L subbands of M subbands and that is in a total time-frequency resource (for example, the time-frequency resource #1) allocated to the uplink data (or the PUSCH). A value of L is a value specified by the communications system, or a value of L may be a value determined by the network device. In addition, the network device may notify the terminal device #B of the value of L by using, for example, RRC signaling. In addition, locations of the L subbands in the M subbands are specified by the communications system, or locations of the L subbands in the M subbands may be values determined by the network device. In addition, the network device may notify the terminal device #B of the locations of the L subbands in the M subbands by using, for example, RRC signaling.

It should be understood that the foregoing enumerated Formula A is only an example of a mapping relationship between the size of the time-frequency resource #3 and the size of the time-frequency resource #1. This embodiment of this application is not limited thereto. For example, in this embodiment of this application, the size of the time-frequency resource #3 may alternatively not be limited by the parameter $4 \cdot M_{sc}^{PUSCH}$. For example, the size of the time-frequency resource #3 may alternatively be determined based on Formula B.

$$Q = \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil \quad \text{Formula B}$$

Meanings of same symbols or characters in Formula 2 and Formula 1 may be the same. To avoid repetition, detailed description thereof is omitted herein.

Method B

In this embodiment of this application, a mapping relationship between a plurality of parameter groups and a plurality of coefficients may be stored in the terminal device #B. Each parameter group includes one size value of a time-frequency resource (or a quantity of REs) and a value of one coefficient.

For any two parameter groups, assuming that the two parameter groups are a parameter group #A and a parameter group #B, the following relationship exists between the parameter group #A and the parameter group #B.

It is assumed that a size value of a time-frequency resource included in the parameter group #A (for example, a quantity of REs included in the parameter group #A) is a1, a size value of a time-frequency resource included in the parameter group #A is a2, a size value of a time-frequency resource included in the parameter group #B (for example, a quantity of REs included in the parameter group #B) is b1, and a size value of a time-frequency resource included in the parameter group #B is b2. Then, $a1 \times a2 \approx b1 \times b2$; or $|a1 \times a2 - b1 \times b2| = Z$, and Z may be a preset value.

In this embodiment of this application, the size value of the time-frequency resource #5 and a value of the coefficient β may belong to a same parameter group.

In addition, in this embodiment of this application, the terminal device #B may determine a parameter group to which the size value of the time-frequency resource #2 belongs (the parameter group is denoted as a parameter group #1 in the following for ease of understanding and differentiation).

Alternatively, the size value of the time-frequency resource #1 and a value of the coefficient β may belong to a same parameter group.

Alternatively, the terminal device #B may determine a time-frequency resource (namely, a size of a sixth time-frequency resource; the time-frequency resource is denoted as a time-frequency resource #6 in the following for ease of understanding and differentiation), used to carry the uplink data, in the time-frequency resource #2. In addition, the parameter group #1 may be a parameter group to which a size value of the time-frequency resource #6 belongs.

Therefore, the terminal device #B may determine a coefficient in the parameter group #1 (namely, an example of a second coefficient; the coefficient is denoted as a coefficient β' in the following for ease of understanding and differentiation).

Further, the terminal device #B may determine the size of the time-frequency resource #3 based on the size of the time-frequency resource #2 (or the time-frequency resource #6) and the coefficient β'.

That is, in this embodiment of this application, if the size of the time-frequency resource #3 is β', $$Q = \min\left(\left\lceil \frac{O \cdot M_{sc}^{'PUSCH\text{-}initial} \cdot N_{symb}^{'PUSCH\text{-}initial} \cdot \beta_{offset}^{'PUSCH}}{\sum_{r=0}^{C-1} K_r} \right\rceil, 4 \cdot M_{sc}^{PUSCH}\right)$$

$M_{sc}^{'PUSCH\text{-}initial}$ represents a size or a quantity of frequency-domain resources (for example, the frequency-domain resource corresponding to the time-frequency resource #2, for example, a subcarrier), used to carry the uplink data (or the PUSCH), in the time-frequency resource obtained by the terminal device through contention. $N_{symb}^{'PUSCH\text{-}initial}$ represents a size or a quantity of time-domain resources (for example, the time-domain resource corresponding to the time-frequency resource #2, for example, a symbol), used to carry the uplink data (or the PUSCH), in the time-frequency resource obtained by the terminal device through contention. That is, $M_{sc}^{'PUSCH\text{-}initial} \cdot N_{symb}^{'PUSCH\text{-}initial}$ represents a size or a quantity of total time-frequency resources (for example, the time-frequency resource #2, or REs corresponding to the time-frequency resource #2), used to carry the uplink data (or the PUSCH), in the time-frequency resource obtained by the terminal device through contention. $\beta_{offset}^{'PUSCH}$ represents the coefficient β'.

$4 \cdot M_{sc}^{PUSCH}$ represents a maximum value of the time-frequency resource #4 (namely, a resource allocated to the feedback information (namely, the uplink control information)).

It should be understood that the foregoing enumerated method for determining the time-frequency resource #3 by the terminal device #B is merely an example for description. This is not particularly limited in this application. For example, the value of $N_{symb}^{'PUSCH\text{-}initial}$ may alternatively be a fixed value. In addition, the value of $N_{symb}^{'PUSCH\text{-}initial}$ may be determined by the network device in advance and indicated to the terminal device #B. Alternatively, the value of $N_{symb}^{'PUSCH\text{-}initial}$ may be specified by the communications system.

For another example, $M_{sc}^{'PUSCH\text{-}initial}$ may alternatively represent a quantity (for example, the quantity M) of subbands occupied by the time-frequency resource #2. Alternatively, the value of $M_{sc}^{'PUSCH\text{-}initial}$ may be a value determined based on a quantity (for example, the quantity M) of subbands occupied by the time-frequency resource #2. For example, $M_{sc}^{'PUSCH\text{-}initial}$ may be a function value of a function using the value of M as a variable.

For another example, the value of $M_{sc}^{'PUSCH\text{-}initial} \cdot N_{symb}^{'PUSCH\text{-}initial}$ may be a value specified by the communications system. Alternatively, the value of $M_{sc}^{'PUSCH\text{-}initial} \cdot N_{symb}^{'PUSCH\text{-}initial}$ may be a value determined by the network device. In addition, the network device may notify the terminal device #B of the value of $M_{sc}^{'PUSCH\text{-}initial} \cdot N_{symb}^{'PUSCH\text{-}initial}$ by using, for example, RRC signaling.

For another example, $M_{sc}^{'PUSCH\text{-}initial}$ represents a part of a frequency-domain resource (for example, the frequency-domain resource corresponding to the time-frequency resource #1) allocated to the uplink data (or the PUSCH).

For another example, $N_{symb}^{'PUSCH\text{-}initial}$ represents some of time-domain symbols (for example, the time-domain resource corresponding to the time-frequency resource #1) allocated to the uplink data (or the PUSCH).

That is, in this embodiment of this application, $M_{sc}^{'PUSCH\text{-}initial} \cdot N_{symb}^{'PUSCH\text{-}initial}$ represents a part of a total time-frequency resource (for example, the time-frequency resource #2) allocated to the uplink data (or the PUSCH).

As an example rather than a limitation, $M_{sc}^{'PUSCH\text{-}initial} \cdot N_{symb}^{'PUSCH\text{-}initial}$ represents a size value of a time-frequency resource that occupies L subbands of M subbands and that is in a total time-frequency resource (for example, the time-frequency resource #2) allocated to the uplink data (or the PUSCH). A value of L is a value specified by the communications system, or a value of L may be a value determined by the network device. In addition, the network device may notify the terminal device #B of the value of L by using, for example, RRC signaling. In addition, locations of the L subbands in the M subbands are specified by the communications system, or locations of the L subbands in the M subbands may be values determined by the network device. In addition, the network device may notify the terminal device #B of the locations of the L subbands in the M subbands by using, for example, RRC signaling.

Optionally, in this embodiment of this application, a mapping relationship between a plurality of parameter groups and a plurality of thresholds may be stored in the terminal device #B. Each parameter group includes one size value of a time-frequency resource (for example, a quantity of REs) and one threshold.

Therefore, the terminal device #B may use a threshold in a parameter group to which the size value of the time-frequency resource #2 belongs, as the value of $4 \cdot M_{sc}^{PUSCH}$ in the foregoing formula.

In this embodiment of this application, the terminal device #B may determine the size of the time-frequency resource #3 (for example, a quantity of REs included in the time-frequency resource #3, or a quantity of modulation symbols that can be carried on the time-frequency resource #3) based on the size of the time-frequency resource #4 (for example, a quantity of REs included in the time-frequency resource #4, or a quantity of modulation symbols that can be carried on the time-frequency resource #4), so that a difference between the size of the time-frequency resource #3 and the size of the time-frequency resource #4 falls within a preset range.

Assuming that the size of the time-frequency resource #3 is X and that the size of the time-frequency resource #4 is Y in this embodiment of this application, for example, X>Y; or X=Y; or

0<Y−X≤W.

W may be a preset value. For example, in this embodiment of this application, a value of W may be specified by the communications system, or a value of W may be determined by the network device and pre-indicated to the terminal device by using, for example, radio resource control (Radio Resource Control, RRC) signaling.

Alternatively, W may be determined based on X (or Y) and a preset ratio value Z, that is, W=Y·Z. A value of Z may be specified by the communications system, or a value of Z may be determined by the network device and pre-indicated to the terminal device by using, for example, RRC signaling.

Therefore, when a broadband (or a quantity of included subbands) of a time-frequency resource that can be actually used by the terminal device for uplink transmission is narrower than a bandwidth of a time-frequency resource that is scheduled by the network device for uplink transmission, a size of a time-frequency resource (namely, the time-frequency resource #3) used to carry the uplink control information (for example, HARQ feedback information) is enabled to be the same as or similar to a size of a time-frequency resource (for example, the time-frequency resource #4) scheduled by the network device to carry the uplink control information, thereby ensuring demodulation performance of the uplink control information.

Method C

Optionally, in this embodiment of this application, the terminal device #B may determine, based on the scheduling information #B sent by the network device, a bit rate (denoted as a bit rate #1) of uplink data scheduled by the scheduling information #B, and the terminal device may determine the time-frequency resource #3 based on the bit rate #1 and the coefficient β.

The coefficient β may be a parameter configured by a higher layer, or the coefficient β is indicated by the network device by using physical layer signaling, or the coefficient β is specified by the communications system.

The coefficient β may be used to indicate a ratio of the bit rate of the uplink control information to the bit rate of the uplink data.

Therefore, in S330, the terminal device #B can determine the size of the time-frequency resource #3 used to carry the uplink control information #B.

In addition, in S330, the terminal device #B may further determine a specific location of the time-frequency resource #3 (specifically, an RE included in the time-frequency resource #3) from the time-frequency resource #2 based on the determined size of the time-frequency resource #3.

As an example rather than a limitation, in this embodiment of this application, the terminal device #B may determine a symbol corresponding to the time-frequency resource #3 (the symbol is denoted as a symbol #2 in the following for ease of understanding and description) based on a location of a symbol (denoted as a symbol #1 in the following for ease of understanding and description), used to carry a reference signal, in the time-frequency resource #2.

For example, in this embodiment of this application, the terminal device #B may use a symbol adjacent to the symbol #1 as the symbol #2.

In addition, when a total quantity of REs on a symbol adjacent to the symbol #1 is less than the determined size of the time-frequency resource #3 (namely, the quantity of REs included in the time-frequency resource #3), the terminal device may further use a symbol whose offset with the symbol #1 is less than or equal to a preset threshold K (the symbol is denoted as a symbol #3 in the following for ease of understanding and description), as the symbol #2.

For example, the terminal device may use consecutive K+1 symbols adjacent to the symbol #1 as symbols #2.

In addition, as an example rather than a limitation, in this embodiment of this application, the terminal device #B may preferably use a time-frequency resource at a location with a relatively low frequency in the time-frequency resource B as the time-frequency resource #3.

FIG. 6 shows a pattern of a time-frequency resource (namely, the time-frequency resource #4) that is in the time-frequency resource #1 allocated by the network device #B to the terminal device #B and that is used to carry uplink control information. In addition, FIG. 6 shows a pattern of a time-frequency resource (namely, the time-frequency resource #3) that is in the time-frequency resource #2 actually obtained by the terminal device #B through contention and that is used to carry uplink control information. As shown in FIG. 5, the size of the time-frequency resource #3 may be the same as the size of the time-frequency resource #4. In addition, as shown in FIG. 6, a location relationship of a symbol of the time-frequency resource #3 relative to a symbol of a reference signal may be corresponding to a location relationship of a symbol of the time-frequency resource #4 relative to the symbol of the reference signal. In addition, a frequency-domain location of the time-frequency resource #3 in the time-frequency resource #2 is corresponding to a frequency-domain location of the time-frequency resource #4 in the time-frequency resource #1. For example, the time-frequency resource 3 is located at a frequency-domain location with a relatively low frequency of the time-frequency resource #2.

It should be understood that subbands obtained by the terminal device through contention shown in FIG. 6 are merely example description. This is not particularly limited in this application.

In S340, the terminal device #B may perform uplink transmission with the network device #B by using the time-frequency resource #1, that is, the terminal device #B may send the uplink control information #B to the network device #B by using the time-frequency resource #4.

Alternatively, in S340, the terminal device #B may perform uplink transmission with the network device #B by using the time-frequency resource #2, that is, the terminal device #B may send the uplink control information #B to the network device #B by using the time-frequency resource #3.

Optionally, that the terminal device #B sends the uplink channel on the candidate time-frequency resource based on the result of the detection includes: When the terminal device #B determines, before the time-domain start point #α, that the carrier in which the time-frequency resource #1 is located is in a sendable state, the terminal device #B sends the uplink control information by using the time-frequency resource #4 in the time-frequency resource #1; or when the terminal device #B determines, before the time-domain start point #α, that the carrier in which the candidate time-frequency resource is located is not in a sendable state, and the terminal device #B determines, before the time-domain start point that the carrier in which the candidate time-frequency resource is located is in a sendable state, the terminal device #B sends the uplink control information by using the time-frequency resource #3 in the time-frequency resource #2.

It may be understood that the terminal device performs detection on the carrier in which the candidate time-frequency resource is located, and selects, based on the result of the detection, the time-frequency resource #1 or the time-frequency resource #2 to send the uplink channel. In this process, an encoded uplink data packet generated by the terminal device matches the time-frequency resource #1. When the result of the detection is the time-frequency resource #1, the terminal device sends the uplink data packet on the time-frequency resource #1. When the result of the detection is the time-frequency resource #2, limited by a capability, the terminal device cannot regenerate another encoded uplink data packet that matches the time-frequency resource #2. Therefore, the terminal device discards a part that is in the uplink data packet and that cannot match the time-frequency resource #2, that is, punctures the uplink data packet to match the time-frequency resource #2, and transmits, on the time-frequency resource #2, a part obtained after the uplink data packet is punctured. Usually, the uplink control information is transmitted only once, and a transport block corresponding to the uplink data may be transmitted for a plurality of times. When the uplink channel includes the uplink control information and the uplink data information, transmission performance of the uplink data may be ensured through retransmission. Therefore, in one uplink transmission, if uplink control information is included, transmission performance of the uplink control information needs to be preferably ensured.

Optionally, the size (for example, a quantity of occupied REs) of the time-frequency resource #3 is less than the size of the time-frequency resource #4.

Optionally, the size (for example, a quantity of occupied REs) of the time-frequency resource #3 is the same as the size of the time-frequency resource #4.

Optionally, the time-frequency resource #3 is a part or all of the time-frequency resource #2, and the time-frequency resource #2 is a part of the time-frequency resource #1. That is, the terminal device maps the uplink control information to the time-frequency resource #2. When the terminal device sends the uplink channel by using the time-frequency resource #1, the terminal device sends the uplink control information by using the time-frequency resource #3 on the time-frequency resource #2 in the time-frequency resource #1.

Optionally, a location of the time-frequency resource #3 is the same as a location of the time-frequency resource #4 in the TTI #1. The time-frequency resource #2 is a part of the time-frequency resource #1. That is, the terminal device maps the uplink control information to the time-frequency resource #2. Regardless of whether the terminal device sends the uplink channel by using the time-frequency resource #1 or the time-frequency resource #2, the uplink control information can be sent. Further, optionally, when the terminal device maps the uplink control information to the time-frequency resource #2, mapping may be similar to mapping of the uplink control information in the prior art, and details are not described herein.

For example, in this embodiment of this application, one TTI may include a plurality of (for example, two) slots, and it may be specified that uplink control information is mapped starting from a preset slot in the TTI. The preset slot may be at least one slot other than the initial slot in the TTI. For example, the preset slot may be the last slot in the TTI.

The "uplink control information is mapped starting from a preset slot in the TTI" may mean transmitting the uplink control information only in the preset slot when a size of a resource that is used to carry control information and that is in the preset slot can meet a transmission requirement of the uplink control information.

Alternatively, the "uplink control information is mapped starting from a preset slot in the TTI" may mean carrying a part of the uplink control information in the preset slot (for example, a part of uplink control information that can be carried to a maximum extent in the preset slot), and carrying a remaining part in another slot, when a size of a resource that is used to carry control information and that is in the preset slot cannot meet a transmission requirement of the uplink control information. For example, the another slot may be the initial slot in the TTI.

Alternatively, the "uplink control information is mapped starting from a preset slot in the TTI" may mean carrying a part of the uplink control information in the preset slot (for example, a part of uplink control information that can be carried to a maximum extent in the preset slot), and discarding a remaining part, when a size of a resource that is used to carry control information and that is in the preset slot cannot meet a transmission requirement of the uplink control information.

Optionally, a part of the uplink control information may be a front part in a bit stream output after the uplink control information is encoded (for example, a plurality of bits starting from the first bit in the bit stream output after the uplink control information is encoded).

Alternatively, the "uplink control information is mapped starting from a preset slot in the TTI" may mean prohibiting using the first slot of the TTI to carry control information.

Figure 8:
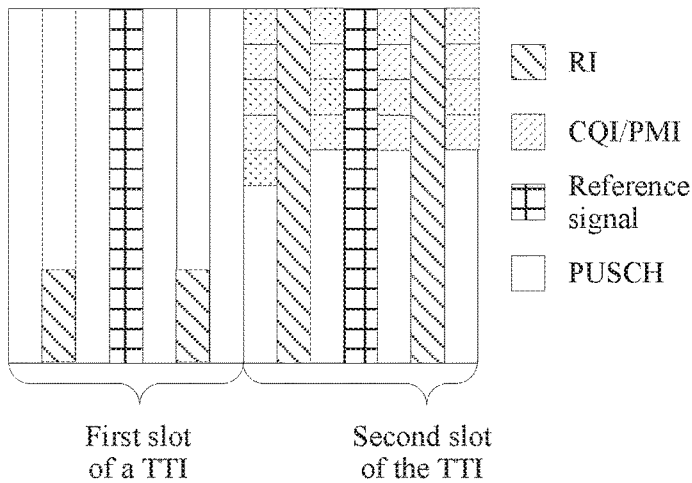
FIG. 8 is a schematic diagram of a pattern of a time-frequency resource that carries uplink control information according to an embodiment of this application.
Figure 8:
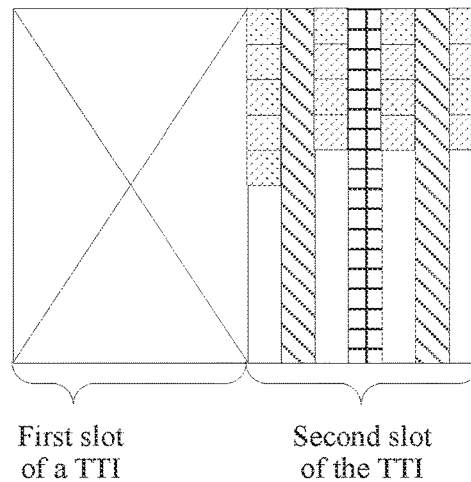
Figure 9:
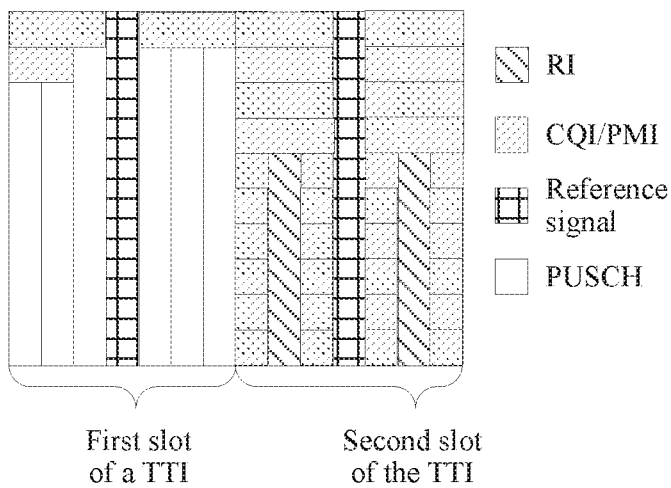
FIG. 9 is a schematic diagram of a pattern of a time-frequency resource that carries uplink control information according to an embodiment of this application.
Figure 9:
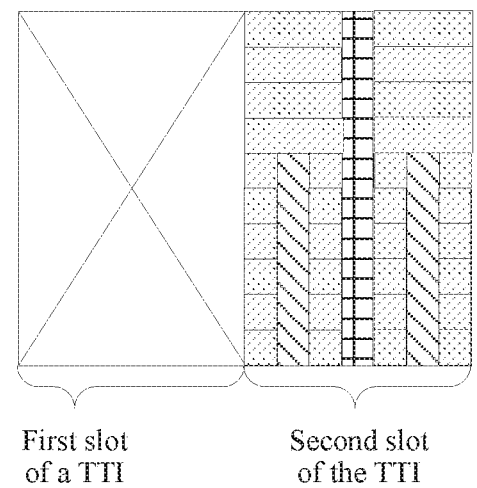

Optionally, the time-frequency resource #3 is a part or all of the time-frequency resource #4, and the time-frequency resource #4 includes a part or all of the time-frequency resource #2, where the time-frequency resource #2 is a part of the time-frequency resource #1. It should be understood that, when the time-frequency resource used to transmit the uplink channel is reduced, a size of the resource used to transmit the uplink control information may be unchanged. Therefore, the following case may occur: A resource that can be used to transmit the uplink control information and that is in the time-frequency resource #2 is less than a resource that can be used to transmit the uplink control information and that is in the time-frequency resource #1. In this case, the terminal device may first map the uplink control information to the time-frequency resource #2, and then map remaining uplink control information to a time-frequency resource other than the time-frequency resource #2 in the time-frequency resource #1, as shown in FIG. 8 or FIG. 9.

Figure 7:
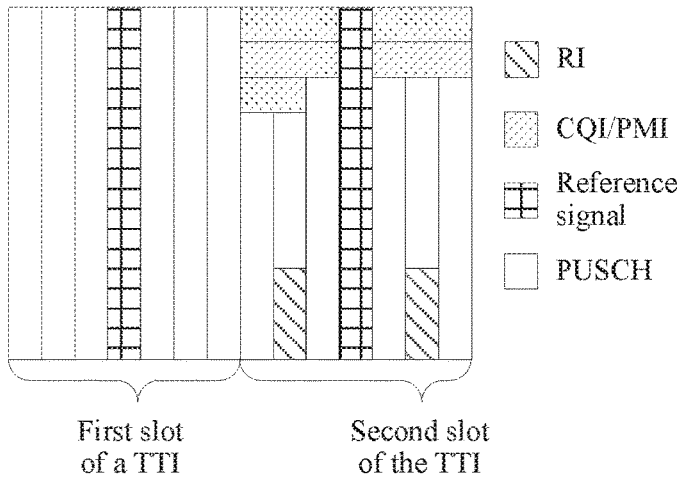
FIG. 7 is a schematic diagram of a pattern of a time-frequency resource that carries uplink control information according to an embodiment of this application.
Figure 7:
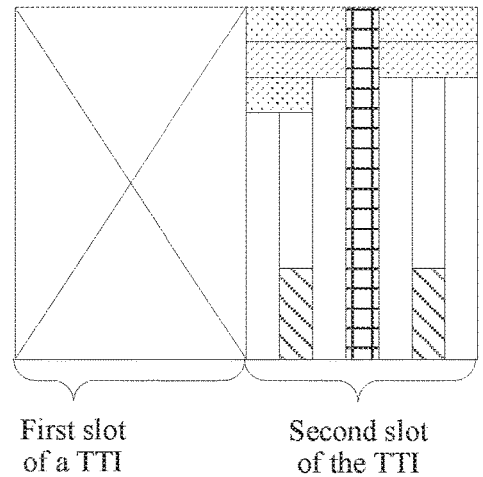

As an example rather than a limitation, in this embodiment of this application, FIG. 7 shows a pattern of a time-frequency resource (namely, the time-frequency resource #4) that is in the time-frequency resource #1 allocated by the network device #B to the terminal device #B and that is used to carry uplink control information (for example, an RI or a CQI/PMI). In addition, FIG. 7 shows a pattern of a time-frequency resource (namely, the time-frequency resource #4 or the time-frequency resource #3) that is in the time-frequency resource #1 or the time-frequency resource #2 actually obtained by the terminal device #B through contention and that is used to carry uplink control information. As shown in FIG. 7, the size of the time-frequency resource #3 may be the same as the size of the time-frequency resource #4. In addition, as shown in FIG. 7, a location of the time-frequency resource #3 is also the same as a location of the time-frequency resource #4 in the TTI #1.

That is, in this embodiment of this application, the time-frequency resource #1 may be corresponding to a plurality of (for example, two) slots. For example, it may be specified in the communications system or the communication protocol that uplink control information is mapped starting from the second slot in the two slots. That is, regardless of whether the first slot in the two slots can be obtained by the terminal device through contention, the terminal device maps the uplink control information starting from the second slot. Specifically, a size of a resource that is used to carry control information and that is in the second slot may be fixed, and the terminal device carries the uplink control information (specifically, a part or all of the uplink control information) only on the resource that is used to carry control information and that is in the second slot.

According to the method for determining a resource used to transmit uplink control information shown in FIG. 7, regardless of whether the terminal device determines, based on a result of channel detection, that a candidate time-frequency resource that can be used for sending a PUSCH is the time-frequency resource #1 or the time-frequency resource #2, uplink control information carried on the PUSCH can be sent, thereby ensuring performance of the uplink control information.

As an example rather than a limitation, in this embodiment of this application, FIG. 8 shows a pattern of a time-frequency resource (namely, the time-frequency resource #4) that is in the time-frequency resource #1 allocated by the network device #B to the terminal device #B and that is used to carry uplink control information (for example, an RI or a CQI/PMI). In addition, FIG. 8 shows a pattern of a time-frequency resource (namely, the time-frequency resource #4 or the time-frequency resource #3) that is in the time-frequency resource #1 or the time-frequency resource #2 actually obtained by the terminal device #B through contention and that is used to carry uplink control information. As shown in FIG. 8, the size of the time-frequency resource #3 is less than the size of the time-frequency resource #4. In addition, as shown in FIG. 8, the time-frequency resource #3 is a part of the time-frequency resource #4, where the time-frequency resource #4 includes a part of the time-frequency resource #2, and the time-frequency resource #2 is a part of the time-frequency resource #1.

In a specific mapping process, the uplink control information is mapped starting from the time-frequency resource #2. As shown in the figure, when a resource occupied by CQI/PMI information (for example, the resource occupied by the CQI/PMI information may be determined based on the size of the time-frequency resource #1) is less than a resource that is used to transmit the CQI/PMI information and that is in the time-frequency resource #2, the terminal device #B maps the CQI/PMI to the time-frequency resource #2. When a resource occupied by RI information (for example, the resource occupied by the RI information may be determined based on the size of the time-frequency resource #1) is greater than a resource that is used to transmit the RI information and that is in the time-frequency resource #2, the terminal device #B maps a first part of the RI to the time-frequency resource #2, and maps a second part of the RI to a resource that can be used for RI mapping and that is in the time-frequency resource #1. The first part of the RI refers to data including consecutive bit streams that are first output after RI encoding, the second part of the RI refers to data including consecutive bit streams that are later output after RI encoding, and an end part of the first part of the RI and a start part of the second part of the RI are consecutive bit streams.

That is, in this embodiment of this application, the time-frequency resource #1 may be corresponding to a plurality of (for example, two) slots. For example, it may be specified in the communications system or the communication protocol that uplink control information is mapped starting from the second slot in the two slots. That is, regardless of whether the first slot in the two slots can be obtained by the terminal device through contention, the terminal device maps the uplink control information starting from the second slot. Because a size of a resource that is used to carry control information and that is in the second slot is fixed, when the size of the resource that is used to carry control information and that is in the second slot cannot meet a transmission requirement of the uplink control information, the terminal device may add uplink control information that cannot be transmitted by using the second slot, to a resource of the first slot.

As an example rather than a limitation, in this embodiment of this application, FIG. 9 shows a pattern of a time-frequency resource (namely, the time-frequency resource #4) that is in the time-frequency resource #1 allocated by the network device #B to the terminal device #B and that is used to carry uplink control information (for example, an RI or a CQI/PMI). In addition, FIG. 9 shows a pattern of a time-frequency resource (namely, the time-frequency resource #4 or the time-frequency resource #3) that is in the time-frequency resource #1 or the time-frequency resource #2 actually obtained by the terminal device #B through contention and that is used to carry uplink control information. As shown in FIG. 9, the size of the time-frequency resource #3 is less than the size of the time-frequency resource #4. In addition, as shown in FIG. 9, the time-frequency resource #3 is a part of the time-frequency resource #4, where the time-frequency resource #4 includes the entire time-frequency resource #2, and the time-frequency resource #2 is a part of the time-frequency resource #1.

In a specific mapping process, uplink control information is mapped starting from the time-frequency resource #2. As shown in the figure, when a resource occupied by RI information (for example, the resource occupied by the RI information may be determined based on the size of the time-frequency resource #1) is less than a resource that is used to transmit the RI information and that is in the time-frequency resource #2, the terminal device #B maps the RI to the time-frequency resource #2. When a resource occupied by CQI/PMI information (for example, the resource occupied by the CQI/PMI information may be determined based on the size of the time-frequency resource #1) is greater than a resource that is used to transmit the CQI/PMI information and that is in the time-frequency resource #2, the terminal device #B maps a first part of the CQI/PMI to the time-frequency resource #2, and maps a second part of the CQI/PMI to a resource that can be used for CQI/PMI mapping and that is in the time-frequency resource #1. The first part of the CQI/PMI refers to data including consecutive bit streams that are first output after CQI/PMI encoding, the second part of the CQI/PMI refers to data including consecutive bit streams that are later output after CQI/PMI encoding, and an end part of the first part of the CQI/PMI and a start part of the second part of the CQI/PMI are consecutive bit streams.

That is, in this embodiment of this application, the time-frequency resource #1 may be corresponding to a plurality of (for example, two) slots. For example, it may be specified in the communications system or the communication protocol that uplink control information is mapped starting from the second slot in the two slots. That is, regardless of whether the first slot in the two slots can be obtained by the terminal device through contention, the terminal device maps the uplink control information starting from the second slot. Because a size of a resource that is used to carry control information and that is in the second slot is fixed, when the size of the resource that is used to carry control information and that is in the second slot cannot meet a transmission requirement of the uplink control information, the terminal device may add uplink control information that cannot be transmitted by using the second slot, to a resource of the first slot.

Optionally, that the terminal device #B determines, based on the result of the detection, to send the uplink channel on the time-frequency resource #1 includes: The terminal device #B sends the uplink channel on the time-frequency resource #1 based on a modulation order M #1 and a TBS #1 that are determined based on the MCS #1 and the time-frequency resource #1 that are indicated by the scheduling information #B.

Optionally, that the terminal device #B determines, based on the result of the detection, to send the uplink channel on the time-frequency resource #2 includes: The terminal device #B sends the uplink channel on the time-frequency resource #2 based on a modulation order M #1 and a TBS #1 that are determined based on the MCS #1 and the time-frequency resource #1 that are indicated by the scheduling information #B.

It should be noted that in this embodiment of this application, the step of determining, by the terminal device, the available time-frequency resource based on the channel result and the step of mapping, by the terminal device, the uplink control information starting from the second time-frequency resource may be performed not based on a specific sequence. The step of determining the available resource may be performed before the step of resource mapping. Alternatively, the step of resource mapping may be performed before the step of determining the available resource. Alternatively, the two steps may be performed simultaneously.

In addition, as an example rather than a limitation, the terminal device #B may further send uplink data (denoted as data #A in the following for ease of understanding and description) to the network device #B by using a time-frequency resource #6. The data #A may be all uplink data that is scheduled to be transmitted by the terminal device #B by using the time-frequency resource #1, or the data #A may be a part of uplink data that is scheduled to be transmitted by the terminal device #B by using the time-frequency resource #1. This is not particularly limited in this application.

In this embodiment of this application, the terminal device #B may further store a mapping relationship table. The mapping relationship table may be used to indicate a mapping relationship between a plurality of parameter groups and a plurality of transport block sizes (Transport Block Size, TBS), and each parameter group includes one RB quantity value and one MCS value.

In addition, as described above, the scheduling information may be further used to indicate an RB quantity #A and an MCS #A, so that the terminal device #B can search, based on the RB quantity and the MCS #A, the mapping relationship table for a TBS (denoted as a TBS #A in the following for ease of understanding and description) corresponding to a parameter group to which the RB quantity #A and the MCS #A belong.

That is, the TBS #A may be a TBS that is allocated by the network device #B to the terminal device #B and that is used to perform uplink transmission.

For example, the terminal device #B may send the data #A and the uplink control information #B to the network device #B based on the TBS #A and the MCS #A by using the time-frequency resource #2. The process may be similar to a method and a process of transmitting data based on a TBS and an MCS by a communications device (a network device or a terminal device) in the prior art. To avoid repetition, detailed description thereof is omitted herein.

For another example, the terminal device #B may send the data #A and the uplink control information #B to the network device #B based on the TBS #A and a re-determined MCS (denoted as an MCS #A in the following for ease of understanding and differentiation) by using the time-frequency resource #2.

That is, in this embodiment of this application, a quantity of RBs (denoted as an RB quantity #A in the following for ease of understanding and description) included in the time-frequency resource #2 is less than the quantity of RBs (namely, the RB quantity #A) included in the time-frequency resource #1. That is, a quantity of resources that can be used in an uplink transmission process of the terminal device #B is reduced. Therefore, the terminal device #B may increase a modulation order for uplink transmission (that is, a modulation order corresponding to the MCS #A' is used, and is denoted as a modulation order #A' in the following for ease of understanding and description), so that a bit rate used when the terminal device #B performs uplink transmission by using the time-frequency resource #2 and the MCS #A' is lower than a bit rate used when the terminal device #B performs uplink transmission by using the time-frequency resource #2 and the MCS #A.

In this case, the terminal device #B may further send indication information of the modulation order #A' to the network device #B, so that the network device #B can determine the modulation order #A', and parse, based on the modulation order #A' and the TBS #A, a signal received by using the subband #A, so as to obtain the data #A. The process may be similar to a method and a process in which a communications device (the network device or the terminal device) parses a signal based on a TBS and a modulation order to obtain data in the prior art. To avoid repetition, detailed description thereof is omitted herein.

Optionally, in this embodiment of this application, the terminal device #B may further determine the quantity of RBs included in the time-frequency resource #2. The quantity of RBs is denoted as an RB quantity #A' in the following for ease of understanding and description.

In addition, the terminal device #B may search, based on the MCS #A and the RB quantity #A', the mapping relationship table for a TBS (denoted as a TBS #A' in the following for ease of understanding and description) corresponding to a parameter group to which the RB quantity #A' and the MCS #A belong.

Therefore, in this embodiment of this application, the terminal device #B may perform uplink transmission with the network device #B based on the TBS #A' by using the time-frequency resource #2.

In this case, the terminal device #B may further send indication information of the TBS #A' to the network device #B, so that the network device #B can determine the TBS #A', and parse, based on the TBS #A', a signal received by using the subband #A, so as to obtain the data #A. The process may be similar to a method and a process in which a communications device (the network device or the terminal device) parses a signal based on a TBS to obtain data in the prior art. To avoid repetition, detailed description thereof is omitted herein.

It should be noted that, in this embodiment of this application, when the TBS #A' is used to transmit the data #A, a modulation order used may be the modulation order #A, or may be a modulation order that is determined based on the TBS #A' and that is different from the modulation order #A. This is not particularly limited in this application.

As an example rather than a limitation, the terminal device #B may transmit the uplink control information #B to the network device #B by using the time-frequency resource #3 in the following manner 1 or manner 2.

Manner 1

In this embodiment of this application, the terminal device #B may send information #1 (namely, an example of indication information of the third time-frequency resource) to the network device #B. As an example rather than a limitation, in this embodiment of this application, the information #1 may be used to indicate a quantity of subbands corresponding to the time-frequency resource #3, and the information #1 may be used to indicate a location of a subband corresponding to the time-frequency resource #3.

Therefore, the network device #B can determine, based on the information #1, a subband, in the frequency-domain resource #A, that carries uplink control information (namely, the uplink control information #B) sent by the terminal device #B.

Further, the network device #B may receive, only on the subband indicated by the information #1, the uplink control information sent by the terminal device #B, thereby reducing processing burden of the network device. Herein, a method and a process of receiving control information by using a resource by the network device #B may be similar to those in the prior art. To avoid repetition, detailed description thereof is omitted herein.

As an example rather than a limitation, in this embodiment of this application, the terminal device #B may send the information #1 to the network device #B by using the time-frequency resource #2 (for example, the time-frequency resource #3).

Alternatively, in this embodiment of this application, the terminal device #B may send both the information #1 and the uplink control information #B to the network device #B in a piggyback manner by using the time-frequency resource #2.

The "sending in a piggyback manner" may mean: In this embodiment of this application, the time-frequency resource #2 (for example, the time-frequency resource #3) may be corresponding to a plurality of time-frequency resource elements (Resource Element. RE). The terminal device #B may send the uplink control information #B by using a part of the plurality of REs, and the terminal device #B may send the information #1 by using another part of the plurality of REs.

It should be understood that the foregoing enumerated resource used by the terminal device #B to send the information #1 to the network device #B is merely an example for description. This is not particularly limited in this application. For example, in this embodiment of this application, a reserved resource may be further set in the communications system, and the reserved resource is prohibited for data transmission; or the reserved resource may be used only for signaling transmission between the network device and the terminal device. Therefore, the terminal device #B may send the information #1 to the network device #B by using a part or all of the reserved resource.

Manner 2

The terminal device #B may send the uplink control information #B and the reference signal #A by using the time-frequency resource #2. For example, each subband in the time-frequency resource #2 carries a reference signal #A.

Therefore, the network device #B can determine, by performing detection on the reference signal #A, a frequency-domain resource, in the frequency-domain resource #A, that carries the uplink control information #B sent by the terminal device #B, that is, a subband included in the time-frequency resource #2.

Further, the network device #B may parse, only on the subband included in the time-frequency resource #2, information sent by the terminal device #B, thereby reducing processing burden of the network device. Herein, a method and a process of parsing data by the network device #B based on the reference signal may be similar to those in the prior art. To avoid repetition, detailed description thereof is omitted herein.

Manner C

When the time-frequency resource #1 is indicated by P (at least two) pieces of scheduling information #B, the terminal device #B may determine information that is in the P pieces of scheduling information #B and that is used to indicate the time-frequency resource #3 (the information is denoted as information #A_1 in the following for ease of understanding). In addition, the terminal device #B may report indication information (namely, an example of third indication information) of the information #A_1 to the network device #B, so that the network device #B can determine, based on the indication information of the information #A_1, that the terminal device #B uses the time-frequency resource indicated by the information #A_1 (or a subband to which the time-frequency resource indicated by the information #A_1 belongs) to transmit the uplink control information.

Similarly, in this embodiment of this application, the terminal device #B may further send information #2 (namely, an example of indication information of the second time-frequency resource) to the network device #B. As an example rather than a limitation, in this embodiment of this application, the information #2 may be used to indicate a quantity of subbands corresponding to the time-frequency resource #2, and the information #2 may be used to indicate a location of a subband corresponding to the time-frequency resource #2.

Therefore, the network device #B can determine, based on the information #2, a subband, in the frequency-domain resource #A, that carries uplink information (for example, uplink control information and/or uplink data) sent by the terminal device #B.

Further, the network device #B may receive, only on the subband indicated by the information #2, the uplink information sent by the terminal device #B, thereby reducing processing burden of the network device. Herein, a method and a process of receiving information by using a resource by the network device #B may be similar to those in the prior art. To avoid repetition, detailed description thereof is omitted herein.

As an example rather than a limitation, in this embodiment of this application, the terminal device #B may send the information #2 to the network device #B by using the time-frequency resource #2.

Alternatively, in this embodiment of this application, the terminal device #B may send both the information #2 and the uplink information to the network device #B in a piggyback manner by using the time-frequency resource #2.

The "sending in a piggyback manner" may mean: In this embodiment of this application, the time-frequency resource #2 may be corresponding to a plurality of time-frequency resource elements REs, the terminal device #B may send the uplink information by using a part of the plurality of REs, and the terminal device #B may send the information #2 by using another part of the plurality of REs.

It should be understood that the foregoing enumerated resource used by the terminal device #B to send the information #2 to the network device #B is merely an example for description. This is not particularly limited in this application. For example, in this embodiment of this application, a reserved resource may be further set in the communications system, and the reserved resource is prohibited for data transmission; or the reserved resource may be used only for signaling transmission between the network device and the terminal device. Therefore, the terminal device #B may send the information #2 to the network device #B by using a part or all of the reserved resource.

Optionally, that the terminal device #B sends the uplink channel on the candidate time-frequency resource based on the result of the detection includes: When the terminal device #B determines, before the time-domain start point #α, that the carrier in which the time-frequency resource #1 is located is in a sendable state, the terminal device #B sends the uplink data packet by using the time-frequency resource #5 in the time-frequency resource #1; or when the terminal device #B determines, before the time-domain start point #α, that the carrier in which the candidate time-frequency resource is located is not in a sendable state, and the terminal device #B determines, before the time-domain start point #β, that the carrier in which the candidate time-frequency resource is located is in a sendable state, the terminal device #B sends the uplink data packet by using the time-frequency resource #6 in the time-frequency resource #2.

It may be understood that the terminal device performs detection on the carrier in which the candidate time-frequency resource is located, and selects, based on the result of the detection, the time-frequency resource #1 or the time-frequency resource #2 to send the uplink channel. In this process, an encoded uplink data packet generated by the terminal device matches the time-frequency resource #1. When the result of the detection is the time-frequency resource #1, the terminal device sends the uplink data packet on the time-frequency resource #1. When the result of the detection is the time-frequency resource #2, limited by a capability, the terminal device cannot regenerate another encoded uplink data packet that matches the time-frequency resource #2. Therefore, the terminal device discards a part that is in the uplink data packet and that cannot match the time-frequency resource #2, that is, punctures the uplink data packet to match the time-frequency resource #2, and transmits, on the time-frequency resource #2, a part obtained after the uplink data packet is punctured.

Generally, a plurality of front bits of the uplink data packet are used to carry relatively important information (for example, system bits). The system hit may be a hit other than a check hit in the uplink data packet.

That is, during in-advance packet assembly, if a front bit in the uplink data packet is mapped to the front time-frequency resource #1 in time domain, and a back bit in the uplink data packet is mapped to the back time-frequency resource #2 in time domain, when the terminal device sends the uplink channel by using the time-frequency resource #2 (or the terminal device fails to contend for the time-frequency resource #1), the relatively important system hit may be discarded.

In view of the foregoing case, in this embodiment of this application, the terminal device may map the uplink data packet starting from the time-frequency resource #2. That is, the terminal device may map some front bits in the uplink data packet (for example, a plurality of bits starting from the first hit of the uplink data packet) to the time-frequency resource #2 (specifically, the time-frequency resource #6 in the time-frequency resource #2), and map some back bits in the uplink data packet to the time-frequency resource #1 (specifically, the time-frequency resource #5 in the time-frequency resource #1).

Optionally, a size (for example, a quantity of occupied REs) of the time-frequency resource #6 is less than a size of the time-frequency resource #5.

Optionally, a size (for example, a quantity of occupied REs) of the time-frequency resource #6 is the same as a size of the time-frequency resource #5.

Optionally, the time-frequency resource #6 is a part or all of the time-frequency resource #2, and the time-frequency resource #2 is a part of the time-frequency resource #1.

Optionally, that the terminal device may map the uplink data packet starting from the time-frequency resource #2 includes: The terminal device maps some front bits in the uplink data packet to the time-frequency resource #2 in the time-frequency resource #1, and the terminal device maps some back hits in the uplink data packet to a time-frequency resource other than the time-frequency resource #2 in the time-frequency resource #1.

Optionally, a location of the time-frequency resource #6 is the same as a location of the time-frequency resource #5 in the TTI #1. The time-frequency resource #2 is a part of the time-frequency resource #1.

When the terminal device maps the uplink data packet starting from the time-frequency resource #2, regardless of whether the terminal device sends the uplink channel by using the time-frequency resource #1 or the time-frequency resource #2, the relatively important system bit in the uplink data packet can be sent. Further, optionally, when the terminal device maps the uplink data packet to the time-frequency resource #2, mapping may be similar to mapping of the uplink data packet in the prior art, and details are not described herein.

For example, in this embodiment of this application, one TTI may include a plurality of (for example, two) slots. In addition, it may be specified that data #X in an uplink data packet (for example, a part corresponding to a system bit in the uplink data packet) is mapped starting from a preset slot in the TTI. The preset slot may be a slot other than the initial slot in the TTI. For example, the preset slot may be the last slot in the TTI.

That is, in this embodiment of this application, the time-frequency resource #1 may be corresponding to a plurality of (for example, two) slots. For example, it may be specified in the communications system or the communication protocol that a plurality of front bits (for example, system bits) in the uplink data packet are mapped starting from the second slot in the two slots. That is, regardless of whether the first slot in the two slots can be obtained by the terminal device through contention, the terminal device maps the plurality of front bits (for example, system bits) in the uplink data packet starting from the second slot.

Optionally, that the terminal device #B determines, based on the result of the detection, to send the uplink channel on the time-frequency resource #1 includes: The terminal device #B sends the uplink data packet on the time-frequency resource #1 based on the modulation order M #1 and the TBS #1 that are determined based on the MCS #1 and the time-frequency resource #1 that are indicated by the scheduling information #B.

Optionally, that the terminal device #B determines, based on the result of the detection, to send the uplink channel on the time-frequency resource #2 includes: The terminal device #B sends the uplink data packet on the time-frequency resource #2 based on the modulation order M #1 and the TBS #1 that are determined based on the MCS #1 and the time-frequency resource #1 that are indicated by the scheduling information #B.

According to the method for transmitting uplink control information in this embodiment of this application, the system frequency-domain resource used based on the contention mechanism is divided into one or more subbands. In addition, after determining the first frequency-domain resource allocated by the network device, if the first frequency-domain resource includes at least two subbands, before uplink transmission needs to be performed, the terminal device performs detection on the at least two subbands included in the first frequency-domain resource, so that the terminal device can determine, from the at least two subbands, the second frequency-domain resource that can be used by the terminal device, and transmit uplink data by using the second uplink frequency-domain resource. That is, in comparison with the prior art, the terminal device can use the first frequency-domain resource to perform wireless communication with no need to determine that resources in a full-bandwidth range of the first frequency-domain resource are used. Therefore, this can improve a possibility of using, by the terminal device, the first frequency-domain resource (specifically, some subbands of the first frequency-domain resource) to perform wireless communication, thereby improving communication efficiency, reducing a service transmission latency, and improving user experience.

In addition, a size of a time-frequency resource, used to carry uplink control information, in the second time-frequency resource is determined based on a size of the second time-frequency resource (or a time-frequency resource, used to carry uplink data, in the second time-frequency resource). Therefore, when the second time-frequency resource is a part of the first time-frequency resource, in the prior art, the size of the time-frequency resource, used to carry uplink control information, in the second time-frequency resource is less than a size of a time-frequency resource, used to carry uplink control information, in the first resource. In contrast, according to the method for transmitting uplink control information in this embodiment of this application, the size of the third time-frequency resource, used to carry uplink control information, in the second time-frequency resource is determined based on a size of the first time-frequency resource, that is, a difference between the size of the third time-frequency resource and a size of a time-frequency resource, used to carry uplink control information, in the first time-frequency resource falls within a preset range. That is, in comparison with the prior art, increasing the size of the time-frequency resource used to carry uplink control information in this embodiment of this application can ensure transmission reliability of the uplink control information.

In addition, the terminal device performs detection on the carrier in which the candidate time-frequency resource is located, and selects, based on the result of the detection, the first time-frequency resource or the second time-frequency resource to send the uplink channel. In this process, the encoded uplink data packet generated by the terminal device matches the first time-frequency resource. When the result of the detection is the first time-frequency resource, the terminal device sends the uplink data packet on the first time-frequency resource. When the result of the detection is the second time-frequency resource, limited by a capability, the terminal device cannot regenerate another encoded uplink data packet that matches the second time-frequency resource. Therefore, the terminal device discards a part that is in the uplink data packet and that cannot match the second time-frequency resource, that is, punctures the uplink data packet to match the second time-frequency resource, and transmits, on the second time-frequency resource, a part obtained after the uplink data packet is punctured. Usually, the uplink control information is transmitted only once, and a transport block corresponding to the uplink data may be transmitted for a plurality of times. When the uplink channel includes the uplink control information and the uplink data information, transmission performance of the uplink data may be ensured through retransmission. Therefore, in one uplink transmission, if uplink control information is included, transmission performance of the uplink control information needs to be preferably ensured.

According to the method for determining a resource used for transmitting uplink control information in this embodiment of this application, regardless of whether the terminal device determines, based on a result of channel detection, that the candidate time-frequency resource that can be used for sending the uplink channel is the first time-frequency resource or the second time-frequency resource, uplink control information carried on the uplink channel can be sent, thereby ensuring performance of the uplink control information.

In addition, in this embodiment of this application, the time-frequency resource #2 may be corresponding to at least one TTI (denoted as a TTI #1 in the following for ease of understanding and description).

In this embodiment of this application, the TTI #1 may include at least two time-domain start points.

Optionally, in this embodiment of this application, a time-domain location of the time-frequency resource #3 may be located between two time-domain start points, or a time-domain location of the time-frequency resource #3 may be located after the last time-domain start point of the at least two time-domain start points included in the TTI #1.

In conclusion, in the embodiments of this application, the TTI #1 corresponding to the time-frequency resource #1 allocated by the network device #B to the terminal device #B may include at least two time-frequency resources (namely, the first time-frequency resource and the second time-frequency resource) that can be used by the terminal device #B. In addition, a time-domain start point of the first time-frequency resource is different from a time-domain start point of the second time-frequency resource, and the time-domain start point of the second time-frequency resource is later than the time-domain start point of the first time-frequency resource.

Therefore, the terminal device #B may perform detection on (for example, LBT detection) a carrier in which the time-frequency resource #1 is located, so as to determine, from the first time-frequency resource and the second time-frequency resource, a time-frequency resource (namely, a candidate time-frequency resource) that can be used by the terminal device #B in the TTI #1.

Subsequently, the terminal device #B may send the uplink channel on the candidate time-frequency resource.

According to the method for transmitting uplink control information in the embodiments of this application, a plurality of time-domain start points are set in a TTI used based on a contention mechanism. In addition, before uplink transmission needs to be performed, the terminal device performs detection on a carrier corresponding to the candidate time-frequency resource, so that the terminal device can determine, from the first time-frequency resource or the second time-frequency resource, the candidate time-frequency resource that can be used by the terminal device, and transmit an uplink channel by using the candidate time-frequency resource. That is, in comparison with the prior art, the terminal device can use the candidate time-frequency resource to perform wireless communication with no need to determine that a time-domain start point of the candidate time-frequency resource is located at a start point of a subframe. Therefore, this improves a probability that the terminal device can use the candidate time-frequency resource to perform wireless communication, thereby improving communication efficiency, reducing a service transmission latency, and improving user experience.

It should be noted that the method 200 and the method 300 may be used separately or jointly. This is not particularly limited in this application.

In addition, in the embodiments of this application, the terminal device #A and the terminal device #B may be a same terminal device, or may be different terminal devices. This is not particularly limited in this application. That is, one terminal device may perform actions of both the terminal devices described in the methods 200 and 300.

In addition, in the embodiments of this application, the network device #A and the network device #B may be a same network device, or may be different network devices. This is not particularly limited in this application. That is, one network device may perform actions of both the network devices described in the methods 200 and 300.

Figure 10:
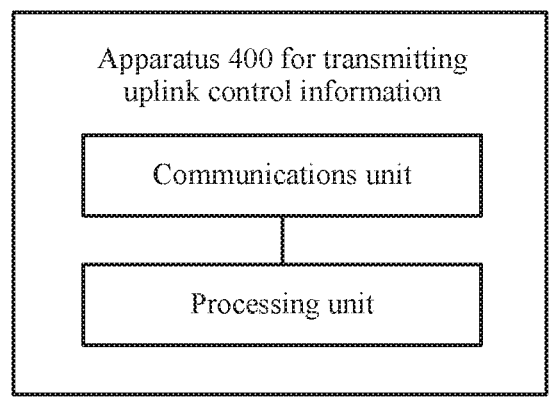
FIG. 10 is a schematic block diagram of an example of an apparatus for transmitting uplink control information according to an embodiment of this application.

FIG. 10 shows a schematic block diagram of an apparatus 400 for transmitting uplink control information according to an embodiment of this application. The apparatus 400 for transmitting uplink control information may be corresponding to (for example, may be configured as or is) the terminal device (for example, the terminal device #A) in the method 100 or the terminal device (for example, the terminal device #B) in the method 200. In addition, modules or units in the apparatus 400 for transmitting uplink control information are separately configured to execute actions or processing processes performed by the terminal device in the method 100 or 200. To avoid repetition, detailed description thereof is omitted herein.

In this embodiment of this application, the apparatus 400 may include a processor and a transceiver, where the processor and the transceiver are communicatively connected. Optionally, the device further includes a memory, where the memory and the processor are communicatively connected. Optionally, the processor, the memory, and the transceiver may be communicatively connected, the memory may be configured to store an instruction, and the processor is configured to execute the instruction stored in the memory, to control the transceiver to send information or a signal.

A transceiver unit in the apparatus 400 shown in FIG. 10 may be corresponding to the transceiver, and a processing unit in the apparatus 400 shown in FIG. 10 may be corresponding to the processor.

Figure 11:
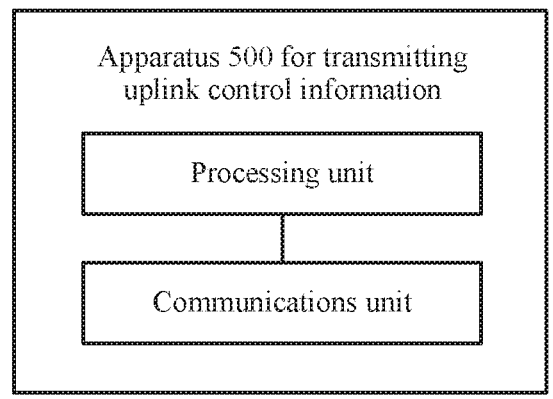
FIG. 11 is a schematic block diagram of another example of an apparatus for transmitting uplink control information according to an embodiment of this application.

FIG. 11 shows a schematic block diagram of an apparatus 500 for transmitting uplink control information according to an embodiment of this application. The apparatus 500 for transmitting uplink control information may be corresponding to (for example, may be configured as or is) the network device (for example, the network device #A) in the method 100 or the network device (for example, the network device #B) in the method 200. In addition, modules or units in the apparatus 500 for transmitting uplink control information are separately configured to execute actions or processing processes performed by the network device in the method 100 or 200. To avoid repetition, detailed description thereof is omitted herein.

In this embodiment of this application, the apparatus 500 may include a processor and a transceiver, where the processor and the transceiver are communicatively connected. Optionally, the device further includes a memory, where the memory and the processor are communicatively connected. Optionally, the processor, the memory, and the transceiver may be communicatively connected, the memory may be configured to store an instruction, and the processor is configured to execute the instruction stored in the memory, to control the transceiver to send information or a signal.

A transceiver unit in the apparatus 500 shown in FIG. 11 may be corresponding to the transceiver, and a processing unit in the apparatus 700 shown in FIG. 11 may be corresponding to the processor.

It should be noted that the foregoing method embodiments may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished through a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these and any memory of another proper type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A method for transmitting uplink control information, comprising:
    generating, by a terminal device, an encoded uplink data packet, wherein the uplink data packet belongs to an uplink channel, wherein the uplink channel is carried on a candidate time-frequency resource in a first time transmission interval (TTI), wherein the candidate time-frequency resource is a first time-frequency resource or a second time-frequency resource, and wherein a second time-domain start point of the second time-frequency resource is later than a first time-domain start point of the first time-frequency resource;
    performing, by the terminal device, detection on a carrier in which the candidate time-frequency resource is located; and
    sending, by the terminal device, the uplink channel on the candidate time-frequency resource based on a result of the detection, wherein the uplink channel comprises the uplink control information and the encoded uplink data packet.

2. The method according to claim 1, wherein the sending, by the terminal device, the uplink channel on the candidate time-frequency resource based on a result of the detection comprises:
    when the terminal device determines, before the first time-domain start point, that the carrier in which the candidate time-frequency resource is located is in a sendable state, sending, by the terminal device, the uplink channel on the first time-frequency resource.

3. The method according to claim 2, wherein the sending, by the terminal device, the uplink channel on the first time-frequency resource comprises:
    determining, by the terminal device, a third time-frequency resource from the first time-frequency resource based on a size value of the first time-frequency resource and a first coefficient; and
    sending, by the terminal device, the uplink control information by using the third time-frequency resource.

4. The method according to claim 1, wherein the sending, by the terminal device, the uplink channel on the candidate time-frequency resource based on a result of the detection comprises:
    when the terminal device determines, before the first time-domain start point, that the carrier in which the candidate time-frequency resource is located is not in a sendable state, and the terminal device determines, before the second time-domain start point, that the carrier in which the candidate time-frequency resource is located is in a sendable state, sending, by the terminal device, the uplink channel on the second time-frequency resource.

5. The method according to claim 4, wherein the sending, by the terminal device, the uplink channel on the second time-frequency resource comprises:
    determining, by the terminal device, a fourth time-frequency resource from the second time-frequency resource based on a size value of the first time-frequency resource and a first coefficient; and sending, by the terminal device, the uplink control information by using the fourth time-frequency resource.

6. The method according to claim 4, wherein the method further comprises:

prohibiting the terminal device from sending the uplink control information on a time-frequency resource other than the second time-frequency resource in the first time-frequency resource.

7. The method according to claim 1, wherein a time-domain resource occupied by the second time-frequency resource is a subset of a time-domain resource occupied by the first time-frequency resource, and wherein a size of a frequency-domain resource occupied by the first time-frequency resource is equal to a size of a frequency-domain resource occupied by the second time-frequency resource.

8. The method according to claim 1, wherein the uplink control information comprises at least one of hybrid automatic repeat request (HARQ) feedback information, downlink channel quality indicator information (CQI), rank indication information (RI), and precoding matrix indicator information (PMI).

9. A method for transmitting uplink control information, comprising:

sending, by a network device, scheduling information to a terminal device, wherein the scheduling information is used to instruct the terminal device to transmit an uplink channel within a first time transmission interval (TTI), wherein the uplink channel comprises at least the uplink control information, wherein the uplink channel is carried on a candidate time-frequency resource in the first TTI, wherein the candidate time-frequency resource is a first time-frequency resource or a second time-frequency resource, and wherein a second time-domain start point of the second time-frequency resource is later than a first time-domain start point of the first time-frequency resource; and receiving, by the network device on the candidate time-frequency resource, the uplink channel sent by the terminal device.

10. An apparatus for transmitting uplink control information, comprising:

at least one processor;

one or more memories coupled to the at least one processor and storing programming instructions for execution by the at least one processor to generate an encoded uplink data packet, wherein the uplink data packet belongs to an uplink channel, wherein the uplink channel is carried on a candidate time-frequency resource in a first time transmission interval (TTI), wherein the candidate time-frequency resource is a first time-frequency resource or a second time-frequency resource, and wherein a second time-domain start point of the second time-frequency resource is later than a first time-domain start point of the first time-frequency resource; and a receiver-transmitter, the receiver-transmitter configured to:

perform detection on a carrier in which the candidate time-frequency resource is located; and send the uplink channel on the candidate time-frequency resource based on a result of the detection, wherein the uplink channel comprises the uplink control information and the encoded uplink data packet.

11. The apparatus according to claim 10, wherein when the apparatus determines, before the first time-domain start point, that the carrier in which the candidate time-frequency resource is located is in a sendable state, the receiver-transmitter is configured to send the uplink channel on the first time-frequency resource.

12. The apparatus according to claim 11, wherein the receiver-transmitter is configured to:

determine a third time-frequency resource from the first time-frequency resource based on a size value of the first time-frequency resource and a first coefficient; and send the uplink control information by using the third time-frequency resource.

13. The apparatus according to claim 12, wherein when the apparatus determines, before the first time-domain start point, that the carrier in which the candidate time-frequency resource is located is not in a sendable state, and the apparatus determines, before the second time-domain start point, that the carrier in which the candidate time-frequency resource is located is in a sendable state, the receiver-transmitter is configured to send the uplink channel on the second time-frequency resource.

14. The apparatus according to claim 13, wherein the receiver-transmitter is configured to:

determine a fourth time-frequency resource from the second time-frequency resource based on the size value of the first time-frequency resource and the first coefficient; and send the uplink control information by using the fourth time-frequency resource.

15. The apparatus according to claim 13, wherein the receiver-transmitter is further configured to prohibit sending of the uplink control information on a time-frequency resource other than the second time-frequency resource in the first time-frequency resource.

16. The apparatus according to claim 10, wherein a time-domain resource occupied by the second time-frequency resource is a subset of a time-domain resource occupied by the first time-frequency resource, and wherein a size of a frequency-domain resource occupied by the first time-frequency resource is equal to a size of a frequency-domain resource occupied by the second time-frequency resource.

17. The apparatus according to claim 10, wherein the uplink control information comprises at least one of hybrid automatic repeat request (HARQ) feedback information, downlink channel quality indicator information (CQI), rank indication information (RI), and precoding matrix indicator information (PMI).

18. An apparatus for transmitting uplink control information, comprising:

at least one processor;

one or more memories coupled to the at least one processor and storing programming instructions for execution by the at least one processor to generate scheduling information, wherein the scheduling information is used to instruct a terminal device to transmit an uplink channel within a first time transmission interval (TTI), wherein the uplink channel comprises at least the uplink control information, wherein the uplink channel is carried on a candidate time-frequency resource in the first TTI, wherein the candidate time-frequency resource is a first time-frequency resource or a second time-frequency resource, and wherein a second time-domain start point of the second time-frequency resource is later than a first time-domain start point of the first time-frequency resource; and a receiver-transmitter, the receiver-transmitter configured to:

sendthescheduling information to the terminal device; and receive, on the candidate time-frequency resource, the uplink channel sent by the terminal device.

19. A communications device, comprising:

at least one processor; and a non-transitory computer-readable storage medium coupled to the at least one processor and storing programming instructions for execution by the at least one processor, wherein the programming instructions instruct the at least one processor to perform operations comprising:

generating an encoded uplink data packet, wherein the uplink data packet belongs to an uplink channel, wherein the uplink channel is carried on a candidate time-frequency resource in a first time transmission interval (TTI), wherein the candidate time-frequency resource is a first time-frequency resource or a second time-frequency resource, and wherein a second time-domain start point of the second time-frequency resource is later than a first time-domain start point of the first time-frequency resource;

performing detection on a carrier in which the candidate time-frequency resource is located; and sending the uplink channel on the candidate time-frequency resource based on a result of the detection, wherein the uplink channel comprises uplink control information and the encoded uplink data packet.

20. A non-transitory computer-readable storage media comprising instructions which, when executed by one or more processors, cause the one or more processors to perform operations comprising:

generating an encoded uplink data packet, wherein the uplink data packet belongs to an uplink channel, wherein the uplink channel is carried on a candidate time-frequency resource in a first time transmission interval (TTI), wherein the candidate time-frequency resource is a first time-frequency resource or a second time-frequency resource, and wherein a second time-domain start point of the second time-frequency resource is later than a first time-domain start point of the first time-frequency resource;

performing detection on a carrier in which the candidate time-frequency resource is located; and sending the uplink channel on the candidate time-frequency resource based on a result of the detection, wherein the uplink channel comprises uplink control information and the encoded uplink data packet.

21. A chip system, comprising a processor, configured to invoke a computer program from a memory and run the computer program, wherein a communications device on which the chip system is installed performs operations comprising:

generating an encoded uplink data packet, wherein the uplink data packet belongs to an uplink channel, wherein the uplink channel is carried on a candidate time-frequency resource in a first time transmission interval (TTI), wherein the candidate time-frequency resource is a first time-frequency resource or a second time-frequency resource, and wherein a second time-domain start point of the second time-frequency resource is later than a first time-domain start point of the first time-frequency resource;

performing detection on a carrier in which the candidate time-frequency resource is located; and sending the uplink channel on the candidate time-frequency resource based on a result of the detection, wherein the uplink channel comprises uplink control information and the encoded uplink data packet.

* * * * *